United States Patent [19]

Mehta et al.

[11] 4,205,203

[45] May 27, 1980

[54] METHODS AND APPARATUS FOR DIGITALLY SIGNALING SOUNDS AND TONES IN A PCM MULTIPLEX SYSTEM

[75] Inventors: Madhu A. Mehta, Alkapuri, India; Satyan G. Pitroda, Villa Park, Ill.; Sagunabalan Vasanthkumar, Kareli Baug, India

[73] Assignee: Wescom Switching, Inc., Downers Grove, Ill.

[21] Appl. No.: 931,876

[22] Filed: Aug. 8, 1978

[51] Int. Cl.$^2$ .............................................. H04J 3/12
[52] U.S. Cl. .................................. 370/110; 179/84 VF
[58] Field of Search .......... 179/15 BY, 15 AT, 84 VF

[56] References Cited

U.S. PATENT DOCUMENTS

| | | | |
|---|---|---|---|
| 3,206,855 | 12/1972 | Pitroda | 179/15 BY |
| 3,801,746 | 4/1974 | Buchner | 179/15 BY |
| 3,870,826 | 3/1975 | Carbrey | 179/15 BY |
| 3,985,965 | 10/1976 | Field | 179/15 BY |
| 4,110,562 | 8/1978 | Moed | 179/15 BY |

OTHER PUBLICATIONS

GTE Automatic Electric Technical Journal, Apr. 1973, "Digital Concepts in Service Circuits", by S. G. Pitroda, pp. 315–322.

IEEE Transactions on Communications Technology, vol. COM-19, No. 5, pp. 588–596; Oct. 1971; "Multifrequency (MF) Tone-Generating System . . . , " by S. G. Pitroda.

IEEE Transactions on Communications Technology, Dec. 1973, pp. 1431–1434, "Progress Tones in PCM Switching Equipment", by Pitroda et al.

Products of Wescom Switching, Inc. (Downers Grove, Ill.), Model 5888 Digital Tone Generator and Model 5889 Digital Generator Control.

*Primary Examiner*—David L. Stewart
*Attorney, Agent, or Firm*—Leydig, Voit, Osann, Mayer & Holt, Ltd.

[57] ABSTRACT

Different ones of a plurality of sounds or tones are digitally signaled selectively in the different time slots of recurring frame cycles by initially storing a group of PCM samples for each sound in addressable memory. As each given time slot recurs one sample of a sound preselected for that time slot is read out to a common bus, and as successive cycles occur the address signals applied to the memory during any given time slot are progressively changed to cause repeated scanning of the samples of the preselected sound. After address signals for one time slot have been pulled from a read/write memory, they are replaced by writing "next sample address" signals into the same location of that memory, the latter having a word location for each time slot and being addressed for reading and writing by control signals which exist during and uniquely identify the successive time slots of each cycle. Different scan sequences for different sounds are created by modifying the formation of "next sample address" signals under the control of characteristic-representing signals stored in a sequence memory and read out by call signals representing the preselected sound for any time slot.

The preselection permits any of the sounds to be placed in any of the time slots or channels, but in the preferred form some of the time slots always carry the same sounds (fixed tones) while others may have their carried tones ("switched" or register tones) changed by commands received asynchronously from a central control unit.

The methods and apparatus utilize ROM (although RAM may be employed) to pair different ones of the several sounds with different ones of several on/off schedules to form a larger plurality of distinctive "tones", any one of which may be digitally signaled in any time slot or channel.

The method and the apparatus permit some of the tones to be "intercept" tones formed by two sounds transmitted alternately with a predetermined duty cycle.

110 Claims, 15 Drawing Figures

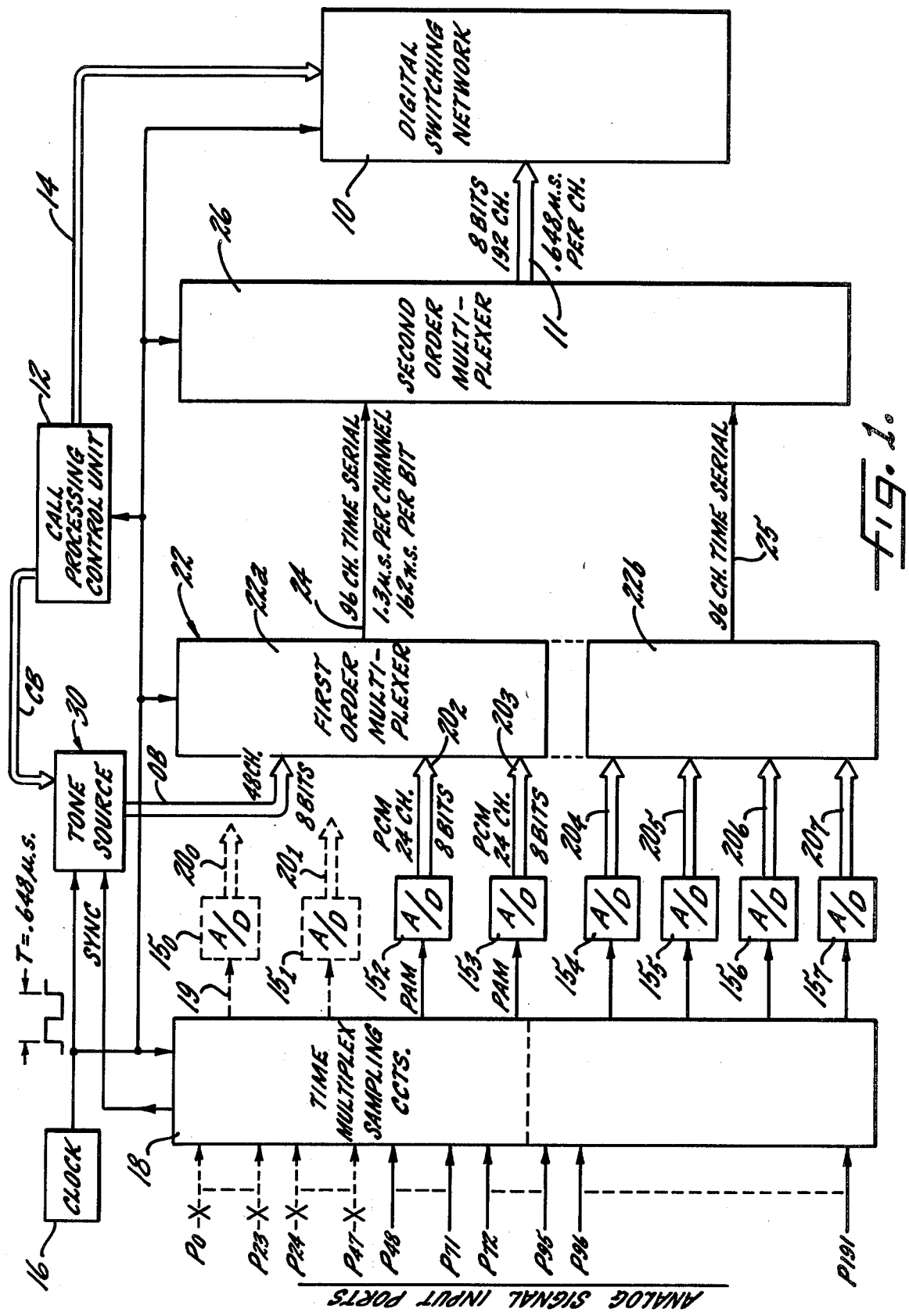

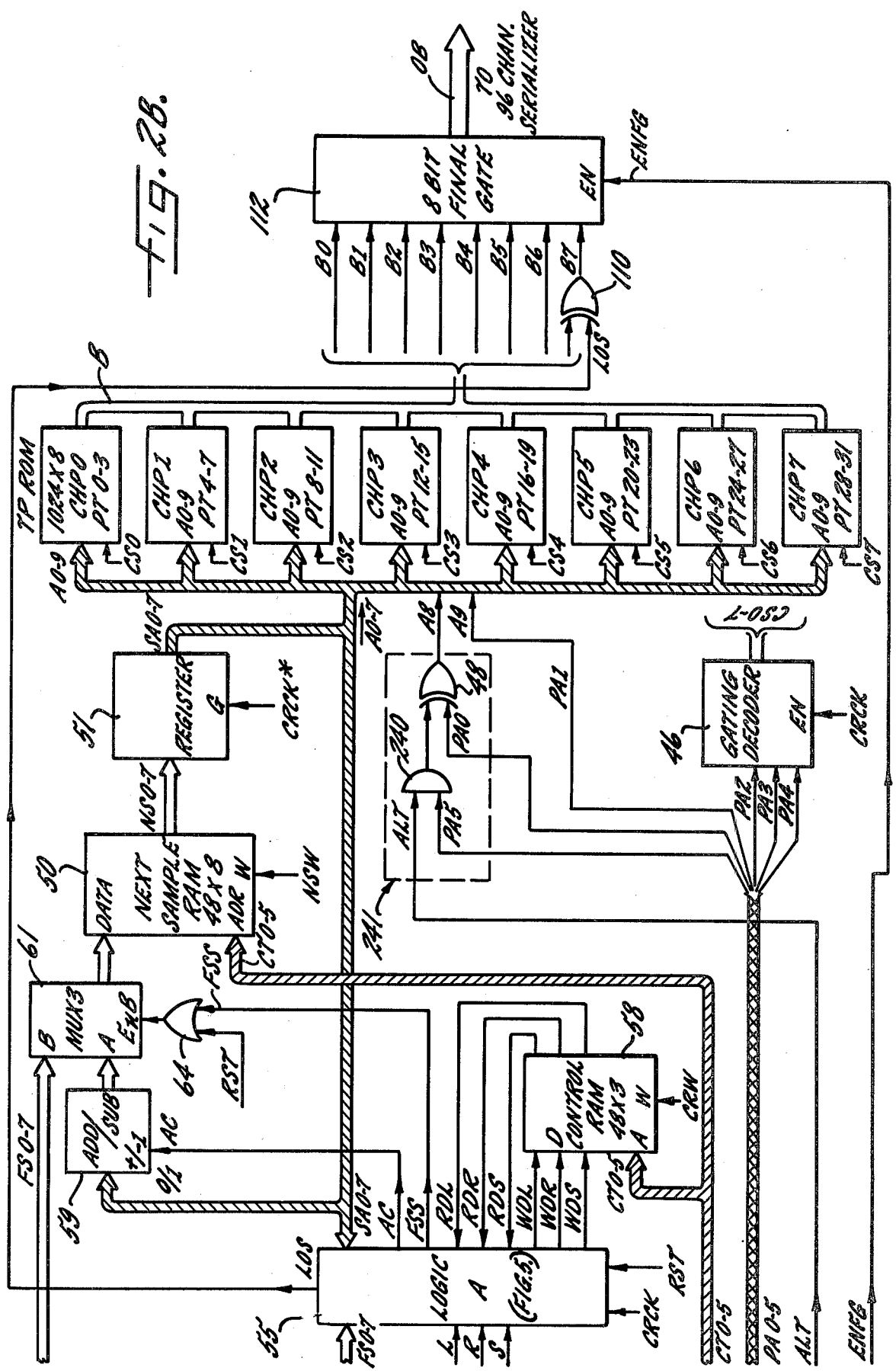

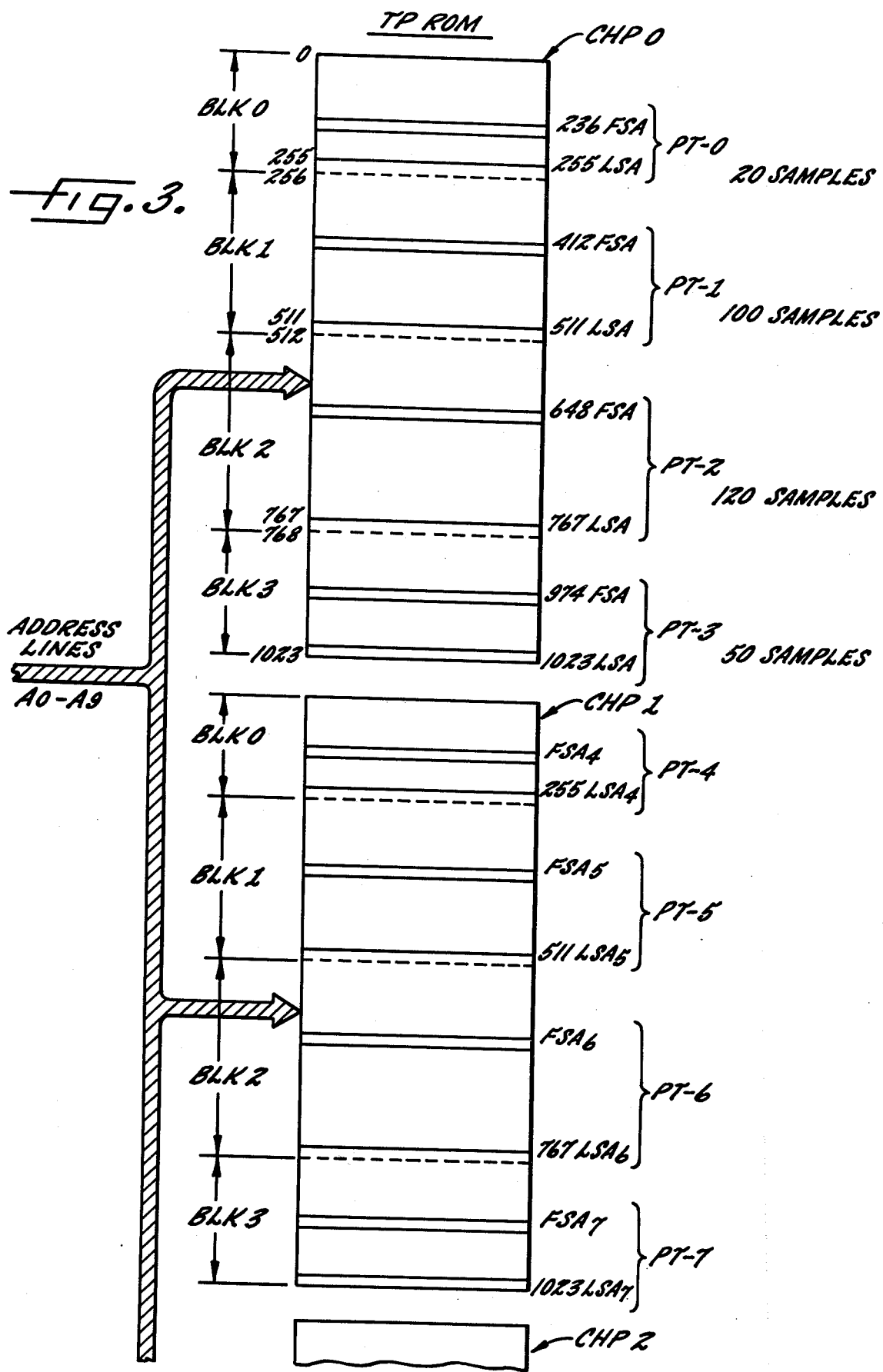

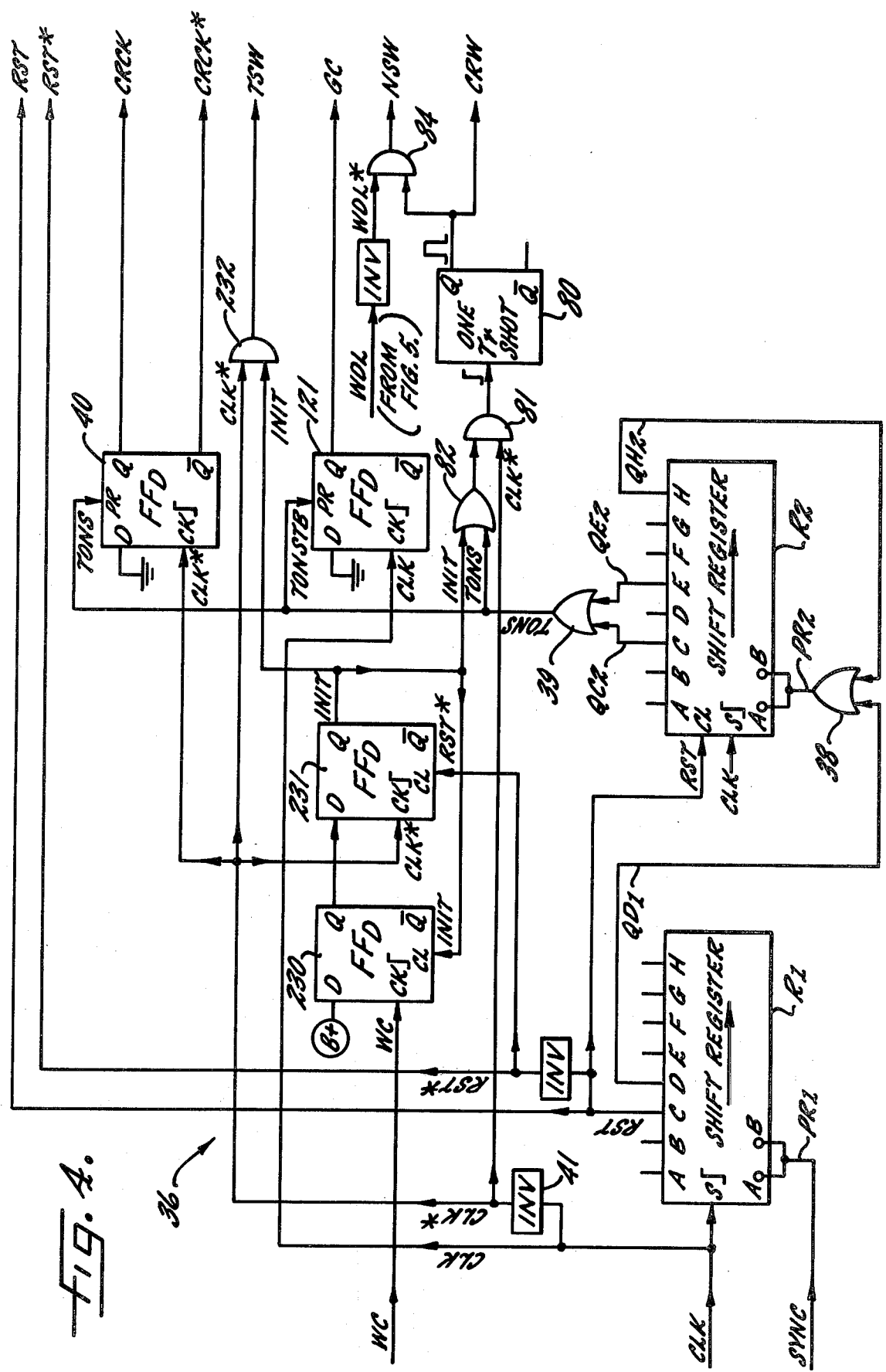

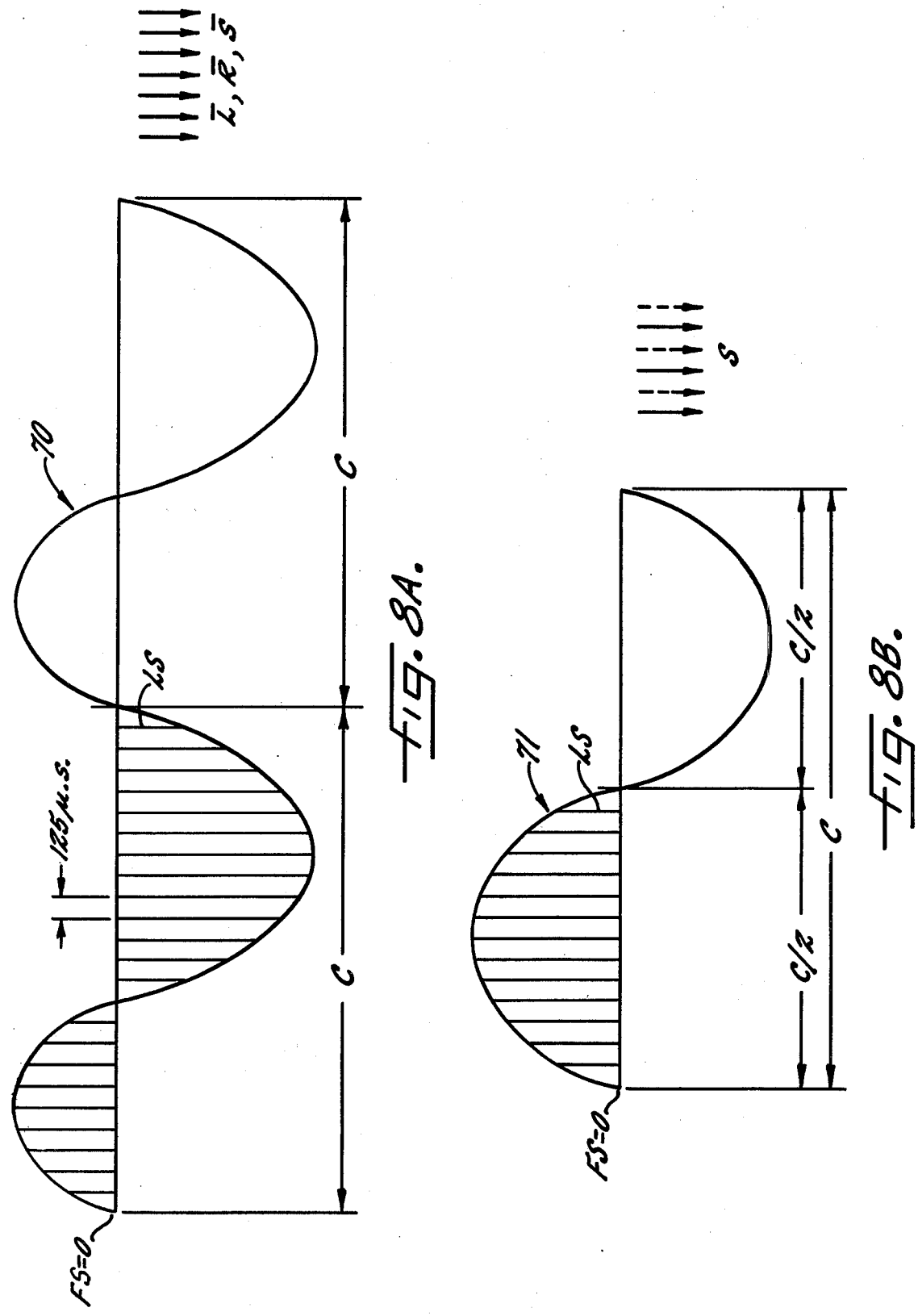

METHODS AND APPARATUS FOR DIGITALLY SIGNALING SOUNDS AND TONES IN A PCM MULTIPLEX SYSTEM

PRIOR ART STATEMENT PURSUANT TO RULE 97

The following are considered to constitute the most relevant items of prior art:
- Ref. 1: U.S. Pat. No. 3,706,855 issued Dec. 19, 1972.
- Ref. 2: "Multifrequency (MF) Tone-Generating System For a Pulse-Code-Modulation (PCM) Digital Exchange" by S. G. Pitroda, IEEE TRANSACTIONS ON COMMUNICATION TECHNOLOGY, VOL. COM-19, No. 5, pages 588-596, October 1971.
- Ref. 3: "Digital Concepts in Service Circuits" by S. G. Pitroda, GTE AUTOMATIC ELECTRIC TECHNICAL JOURNAL, pages 315-322, April 1973.
- Ref. 4: "Progress Tones in PCM Switching Equipment" by Pitroda and Lindsay, IEEE TRANSACTIONS ON COMMUNICATIONS, pages 1431-1434, December 1973.
- Ref. 5: Products of Wescom Switching, Inc. (Downers Grove, Ill.) known as Model 5888, Digital Tone Generator, and Model 5889, Digital Generator Control.

The five identified references, and perhaps others not known to applicants, confirm that it has been known to those skilled in the art that sounds (sometimes called tones) formed by one, two or more sine waves of predetermined frequencies can be produced in PCM systems without actually creating and mixing the analog sine wave signals and then sampling to convert them to PAM (pulse amplitude modulation) form followed by digital-to-analog conversion into PCM samples. Instead, the successive samples (usually taken on the multi-frequency analog wave at an 8 KHz. sampling rate) may be determined once and stored as separate words in suitable memory, a ROM (read-only memory) being sufficient. In the past, a separate ROM has been provided for each multi-frequency tone, and the sample words have been read out simultaneously from all ROM's with sequential scanning, one word per frame being read out and available during essentially the entire frame. To "switch" a tone to a desired destination in a switching network, the output of that tone's ROM was sent into the switching network in one network time slot and connected to the appropriate outgoing channel in the network.

It has also been known to create not only steady or continuous sounds or tones, but also to give certain progress tones predetermined on/off duty cycles. For example, the familiar "busy signal" in telephone systems is commonly a "sound" representable as a combination of 480 Hz. and 620 Hz. sine waves—but interrupted so that it is alternately "on" for 0.5 second and "off" for 0.5 second. In the prior art, an on/off timer has been provided for each distinctive on/off type tone, and associated with the ROM memory holding the PCM samples for the sound to be turned on and off.

SUMMARY OF THE INVENTION

The present invention relates in general to time multiplex PCM (pulse code modulation) communication systems—and is ideally suited, but not restricted, to those of the type employing digital switching. More particularly, the invention relates to sources of sounds and tones, and to methods of creating such sounds and tones, used in such systems and formed by previously established and stored sets of PCM samples, without actually creating multi-frequency analog waves, PAM sampling or repeated synchronous PCM encoding.

It is the general aim of the present invention to provide methods and apparatus for generating any one of a large plurality of tones in any one of many time slots (channels) of the repetitive cycles (frames) in a PCM time multiplex communication system—in a fashion that a single hardware assembly, manufacturable as a single printed circuit board, carries out the method steps to so produce signals digitally representing the desired tones in the desired time slots. This overcomes the prior practice of dedicating considerable hardware to the job of generating each one of many tones—and makes possible the realization of all tone requirements for a central installation (PBX or central office) by apparatus which is less bulky, greatly reduced in cost and which reduces the procedures for switching tones into desired time slots.

It is a coordinate object of the invention to do away with the prior practice of making a digital sample of each of many tones available as a multi-bit word signal during essentially the entire time interval of each multi-channel cycle and switching such word signal into a desired time slot. In contrast, the present invention achieves economy of hardware and efficiency in operational steps by creating a multi-bit signal representing in PCM form a tone sample only during the relatively short time slot of each cycle when such multi-bit signal is needed.

Another important object of the invention is to provide almost unlimited combinations of "sounds" with on/off "schedules" to provide availability of a great number of digitally signaled "tones" in a PCM time multiplex system. For example, any one of a plurality of sounds $SD_o \ldots SD_n$ may be combined with any one of a plurality of schedules $SCH_o \ldots SCH_n$ to provide one of the tones $TN_i$,—the quantity Q of available tones being theoretically equal to X·Y, where X represents the number of sounds and Y represents the number of schedules. In a related aspect, the invention makes it simple and easy to change tones by assigning to them changed combinations of sounds and schedules—merely by changing low-cost ROM's holding different stored data or by writing different data into RAM's or PROM's if the latter are originally employed.

Still another object is to provide methods and apparatus by which simple commands received asynchronously from a central control unit result in the outputting of any desired one of many tones in any desired one of the several time slots within recurring cycles or frames. But a related and advantageous object, in a preferred form of the invention, is to provide a predetermined selection of certain "fixed tones" which are always and invariably outputted in pre-assigned time slots of every cycle, with tones being selectively switchable into the remainder of the time slots.

It is also an object here to output successive PCM samples of a sound in the same time slot of successive cycles (frames), where a limited number of samples for the sound are stored in a main memory for scanning,—and with the advantage that each scan may differ from the previous one by virtue of apparatus and a procedure for generating the "next sample address"

from the nature of the "present sample address". This advantage is achieved through the use of common hardware for all of the sounds which are being respectively transmitted in the plural channels or time slots.

As a corollary to the foregoing, it is an object of the invention to simplify hardware and facilitate operational procedures for scanning a plurality of digital sound samples held in main memory at successive address locations by applying, during one time slot of one cycle, address signals read out of a certain location of a next-sample read/write memory; thereafer writing into that certain location new signals which are incremented or decremented by one in relation to those previously existing, and reading out the new address signals during the same time slot of the ensuing cycle.

An auxillary object of the invention is to simplify apparatus and operating procedures for digital signaling of sounds by storing the successive digital samples of each of a plurality of sounds in separate blocks of addressable main memory with the last sample for each sound at an address numerically representable as a multiple of some constant (such as 256)—with the resulting advantage that as the samples are read one at a time with scanning, the reaching of the last sample for any sound is easily detected from the presence of the same predetermined combination of 1's and 0's in lower order places of the address signals applied to the main memory.

A related object of the invention is to simplify and make possible successive scanning of samples in each of a plurality of sets of samples stored in a main memory by initially storing in an auxiliary "first sample" memory the address location of the first sample for each set, whereby jumping to the first sample to start a new scan or detecting the reaching of the first sample at the end of a scan is easily accomplished.

Still another object of the invention is to control the sequence of successive scans of sets of digital samples representing various ones of a plurality of sounds, different sets having different characteristics scan sequence requirements, by initially storing for each sound a "sequence characteristic" word, and reading from such storage such characteristic word each time a sample is being outputted from the corresponding set, in order to determine, in part, the address of the next sample to be outputted from that set. This enables each of the plural "sounds", which is represented by one set of samples stored in main memory, to have any of the characteristics of (a) last sample repeat or no last sample repeat, (b) scan order reversal or no scan order reversal, and (c) alternate scan sign change or no alternate scan sign change—depending upon the shape of a symmetrical portion of the cyclic analog wave which is represented digitally by the stored set of samples.

As a special advantage, the present invention provides easily implemented methods and apparatus for producing digital signals representing "intercept" tones, i.e., tones which when converted to audible form appear as first and second sounds alternating with a predetermined duty cycle—wherein the first and second sounds may be chosen as those represented by stored sample sets in the main memory.

And yet another object of the invention is to provide a final gate control signal which can be given any one of a plurality of on/off duty cycles (including continuously on or continuously off) without separate timer circuits or complex logic—the apparatus and methods involving storing of on/off schedules in a common memory and reading the words of such memory in a timed rollover sequence.

Other objects and advantages will become apparent as the following description proceeds, taken in conjunction with the Tables I-XII which are located for convenient reference at the end of this specification, and in conjunction with the accompanying drawings.

BRIEF DESCRIPTION OF THE DRAWINGS

FIG. 1 is a generalized block diagram of a portion of an exemplary PCM time multiplex communication system, illustrating by way of background the incorporation therein of a digital tone source embodying the present invention;

FIGS. 2A and 2B, when joined, form a block diagram illustrating apparatus constituting an exemplary, preferred embodiment of the digital tone source, and which operates to carry out the methods of the present invention;

FIG. 3 is a diagram illustrating inner details of a portion of the tone pattern TP ROM which appears in FIG. 2B;

FIG. 4 is a block diagram showing certain details of the timing circuits which appear more generally in FIG. 2A;

FIGS. 8A-8E are illustrations of arbitrarily chosen examples of different types of cyclic analog waves which have different scan sequence requirements for the PCM samples thereof.

Figure 2A:
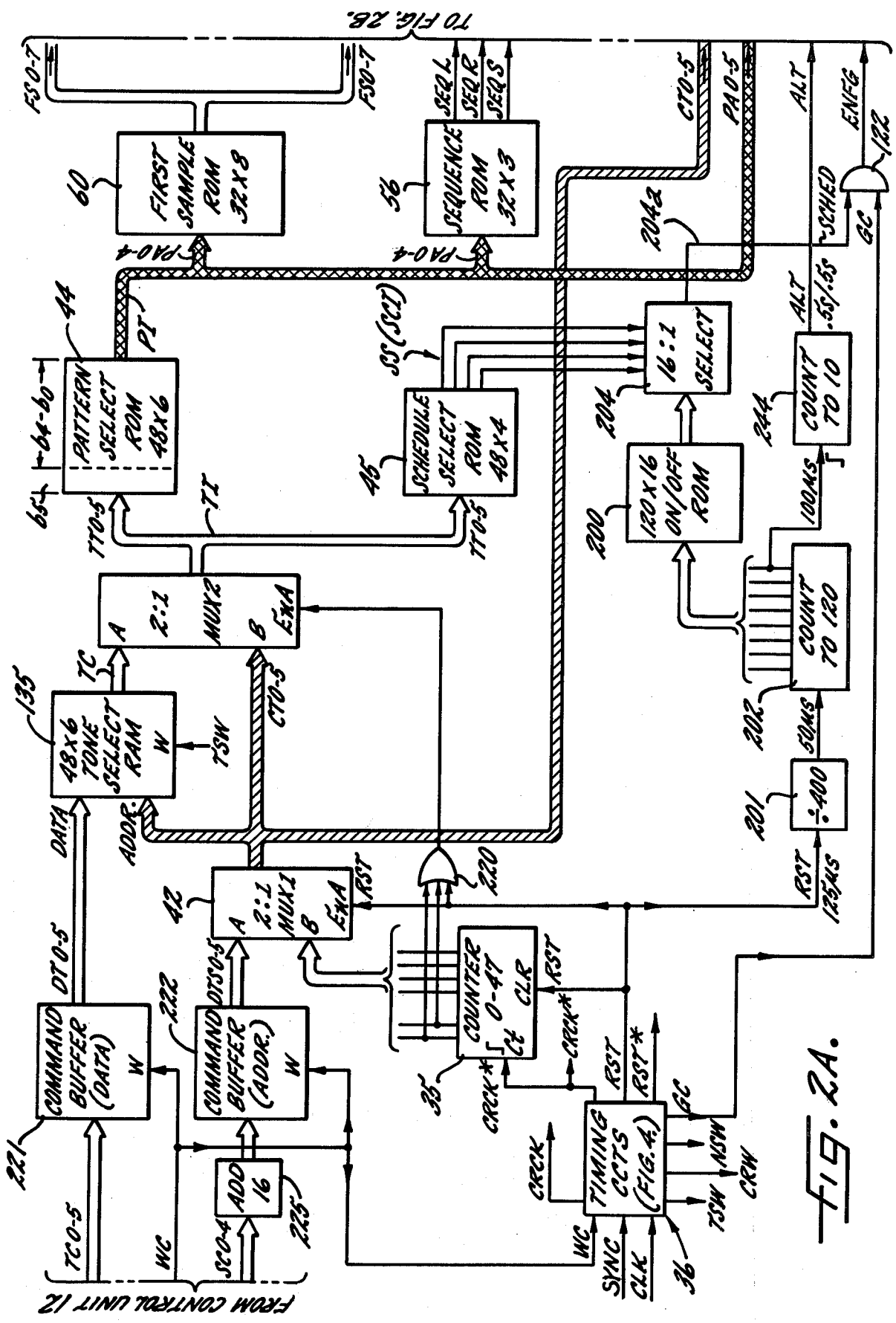

While the invention has been shown and will be described with reference to specific, exemplary embodiments of methods and apparatus, there is no intention that it thus be limited to the particular aspects or details of such embodiments. On the contrary, it is intended here to cover all modifications, alternatives, equivalents and subcombinations which fall within the spirit and scope of the invention as defined in the appended claims.

DETAILED DESCRIPTION

A. Definitions and Symbols

It will be useful to set out generally the definitions of certain terms employed in this specification.

"Sound" means the audibly perceivable sensation to the ear, in pitch, produced by a cyclically recurring analog wave (when converted by a transducer into sound waves) constituted by one, two or more mixed sine waves of predetermined frequencies. In the present exemplary description, reference will be made to a plurality of sounds $SD_0$ through $SN_n$, where "n" is arbitrarily chosen as thirty-one. For example, the "busy tone" sound in a typical telephone system is a combination of two sine waves having frequencies of 480 and 620 Hz.

"Schedule" means the on/off duty cycle imparted to any sound. In the present case reference will be made to a plurality of possible schedules $SCH_o$–$SCH_n$ where "n" is arbitrarily chosen as fifteen. As an example, the schedule $SCH_3$ might be 0.3 seconds on and 0.2 seconds off for an all trunk busy tone. The schedules may include one which is continuously on and one which is continuously off (in the latter case, no sound or tone actually being transmitted so the "quiet tone" is formed).

"Tone" means the combination of any sound with any schedule. In practice, the impression as perceived by the ear of a listener is distinct for each tone and readily recognizable. If there are thirty-two possible sounds and sixteen possible schedules, then there are $32 \times 16 = 512$ theoretically possible tones, but of course, all such tones do not have to be employed. In the embodiment to be described, there are a plurality of possible tones $TN_o \ldots TN_n$ where "n" is arbitrarily chosen to be forty-seven.

"Time slot" denotes each of the successive channel intervals within recurring cycles or frames in a time multiplex system. Typical voice telephone PCM multiplex systems measure off successive cycles or frames of 125$\mu$ sec. duration, with one hundred ninety-three time slots of 0.648$\mu$ sec. in each cycle to form one hundred ninety-two voice channels plus a framing channel. At a lower order level of multiplexing, however, a cycle of 125$\mu$ sec. may be divided into ninety-six time slots or channels each 1.3$\mu$ sec. in duration, plus a period of 0.648$\mu$ sec. for synchronizing. With regard to the exemplary embodiment of a tone source here to be described, forty-eight of those ninety-six time slots are used to carry different desired ones of a large plurality of tones, and thus insofar as the tone source is concerned, it may be viewed as measuring off forty-eight time slots, assigned to tones, in each repetitive cycle of 125$\mu$ sec., with each time slot occupying 1.3$\mu$ sec.

"Cycle" as here used is synonymous with "frame" as the latter term is employed in the telephony art, and means the period spanned by all time slots of a multichannel time multiplexed signal. Each time slot recurs at the cycle rate.

"Fixed tone" means a tone which is transmitted digitally as PCM samples, with successive samples being always transmitted in the same time slot of every cycle (except, of course, during off intervals of the tone schedule). In effect, a channel or time slot is permanently dedicated to each "fixed tone".

"Switched tone" means a tone which, time-wise, is selectively switched for transmission in any desired time slot of successive cycles. The tone can be taken out of that time slot and replaced with another tone in response to command signals from a central call processing control unit.

"Sample" means a multi-bit binary word which represents numerically, according to the chosen code for PCM, the magnitude and polarity of a point of a fictitious analog wave which audibly would produce a given sound. A sample is the multi-bit word which would result if the wave were sampled to produce a PAM pulse and the latter then converted from analog into digital pulse code form, although in the practice of the present invention such samples are preformed and initially stored as separate words (usually of eight bits, seven representing numerically the magnitude and the eighth representing the sign) in a multi-word addressable, readable memory.

"Pattern" or "set" means a plurality of samples which represent the successive magnitudes of a symmetrical portion of a cyclically repeating analog sound wave, assuming that the latter were sampled at a fixed rate, typically 8 KHz. Because symmetry will exist in most multi-frequency sound waves, a limited number of samples may be repeatedly used with repeated scanning to continuously signal the sound in PCM form.

"Scan" means to take and output the samples of a pattern in succession (either in forward or reverse order) until all samples have been used (and after which another scan may begin). In some scans, the last sample is used twice.

"Scan sequence" means the succession in which scans of different types are made through the samples of a set to produce successive output signals which, in digital form, represent the corresponding sound. Depending upon the symmetry of the analog wave, the scan sequence may involve using all samples repeatedly in first-to-last order, using all samples in scans which proceed alternately in first-to-last and last-to-first order, using all samples in scans wherein the signs of the output signals are complemented during alternate scans, or using all samples in successive scans, with the last sample being repeated in certain ones of the scans.

B. A Typical Background Environment of the Invention

Referring now to FIG. 1, one known PCM multiplex communication system typically includes, as a portion thereof, one hundred ninety-two voice inlet ports $P_0$–$P_{191}$ whose analog voice waves are, in effect, to be transmitted to a digital switching network 10 on an eight-conductor bus 11 time-shared to carry corresponding PCM signals in one hundred ninety-two channels or time slots within repetitive cycles of 125$\mu$ sec. Each time slot is typically 0.648$\mu$ sec. long, the 193rd time slot being used for synchronization. Within the digital switching network, selective "connections" are made to route any incoming channel signal to a desired channel of an outgoing time-shared bus (not shown), so that two-way communication may be established between any two telephone sets served by the system, the outgoing signals being decoded to PAM format and reconverted to analog form before reaching a receiving telephone. The details of the digital switching network are known to those skilled in the art, and need not be described. It is also known in the art how a call processing unit 12 is constructed to supply the necessary control signals, via a bus 14, to make the network put up and take down connections.

In an ordinary, all voice setup, the entry ports $P_0$–$P_{191}$ are treated in groups of twenty-four $P_0$–$P_{23}$, $P_{24}$–$P_{47}$ and so on in order to time-share eight analog-to-digital (A/D) converters $15_0$–$15_7$. Taking ports $P_0$–$P_{23}$ as an example, multiplex sampling circuits 18 are timed by signals from a clock 16 such that the signal at each port is sampled at a rate of 8 KHz., with each sample being converted into a PAM voltage, twenty-four such voltages being fed in each repetitive cycle via a conductor 19 to A/D converter $15_0$ whose output is a succession of eight-bit digital samples on a twenty-four channel bus $20_0$. The sampling circuits are so timed that the outputs of the first four A/D converters $15_0$ to $15_3$ are sequentially staggered in time, thereby forming in effect ninety-six channels in a cycle of 125$\mu$ sec., each channel occupying 1.3$\mu$ sec. The sampling of signals arriving at ports $P_{96}$ to $P_{191}$ is carried out in the same fashion with regard to the last four A/D converters $15_4$ to $15_7$.

To further compress in time the one hundred ninety-two voice signals, the outputs of the eight A/D converters are fed into first and second sections 22a, 22b of a first order multiplxer 22 which is timed by signals from the clock 16. In a fashion known in the art, the ninety-six PCM signals (each eight bits wide) on the output lines $20_0$–$20_3$ are fed in sequence over a single conductor 24—each channel occupying a time slot 1.3$\mu$ sec. wide with eight time-serial bits therein occurring at a rate of 162 nanoseconds per bit. Similarly, the PCM samples from converters $15_4$ to $15_7$ are serialized into ninety-six channels on a line 25. The two lines 24 and 25 form inputs to a second order multiplexer 26 also timed by signals from the clock 16. In the second order multiplexer, the two 96 channel serial signals are converted into one hundred ninety-two sequential channels or time slots (plus a 193rd time slot for synchronizing) each 0.648$\mu$ sec. long with eight bits of data appearing on the eight-conductor bus 11, forming one hundred ninety-two channels of input signals (corresponding to ports $P_0$–$P_{191}$) to the switching network 10.

It is beyond the necessary scope of this disclosure to describe the switching network 10, but those skilled in the art will fully understand that a cross connection of any incoming channel to an outgoing channel may be made, the conductors for the outgoing signals, and the components for demultiplexing, D/A converting back to PAM format, and re-converting into analog waves not here being illustrated.

In the processing of calls and in maintenance diagnostic tests, it is often necessary to send into the network 10, and to route therefrom to a given destination or telephone, various tones which have accepted significance to a listener.

The tones fall into categories such as progress tones, DTMF tones (for multi-frequency dialing) or status tones. An elementary example is the familiar busy tone which is a mixture of 480 and 620 Hz. sine waves with a schedule of 0.5 sec. on and 0.5 sec. off. Some tones must always be available (fixed tones); others are required only under certain circumstances (switched tones) and are fed into the network in a channel which is selected or commanded by the control unit 12. A limited list of typical tones, as established by industry convention, follows:

| TONE NAME | FREQUENCIES (Hz.) | SCHED. (Seconds) ON / | OFF |
|---|---|---|---|
| Ring Back 01 | 440 & 480 | 2 | 4 |
| Ring Back 02 | 440 & 480 | 2 | 4 |
| Ring Back 03 | 440 & 480 | 2 | 4 |
| Busy | 480 & 620 | 0.5 | 0.5 |
| All Trunk Busy | 480 & 620 | 0.3 | 0.2 |
| Came On | 350 | Continuous on | |
| Call Waiting | 350 | 0.05 | 1.95 |
| Night Call Waiting | 350 | 0.05 | 0.45 |
| Executive Call Waiting | 350 | 0.05 | 0.95 |
| Assurance | 620 | Continuous on | |
| Entry | 480 | Continuous on | |
| Quiet | — | Continuous off | |
| Test | 1020 | Continuous on | |
| Dial | 350 & 440 | Continuous on | |
| Transfer Dial | 350 & 40 | 0.05 | 0.45 |
| Distinctive Dial | 440 | Continuous on | |
| DTMF Digit 1 | 700 & 900 | Continuous on | |
| DTMF Digit 2 | 700 & 1100 | Continuous on | |
| ⋮ | ⋮ | ⋮ | |

-continued

| TONE NAME | FREQUENCIES (Hz.) | SCHED. (Seconds) ON / | OFF |
|---|---|---|---|
| ⋮ | ⋮ | ⋮ | |
| DTMF Digit 9 | 1100 & 1500 | Continuous on | |
| DTMF Digit 0 | 1300 & 1500 | Continuous on | |

A full listing of MF tones for "tone" dialing is given in Ref. 1 identified above, with an explanation of how a symmetrical quarter of a full cycle of the analog wave for a given tone may be stored in the form of samples. The list here set forth is intended only to be representative and to show that a large number of tones must be generated and made available in a modern PCM telephone system.

C. Introduction to the Invention

In keeping with the practice of the invention and the realization of its advantages, a single—and structurally simple—tone source 30 is provided to create digital signals for all of the tones which may be required or desired in a PCM multiplex communication system. It supplies both fixed and switched tones and enables the available tones to be easily selected or changed.

As shown in FIG. 1, certain ports $P_0$–$P_{47}$ are preempted and not used, the corresponding portion of the sampling circuits 18 thus being omitted, and the A/D converters $15_0$, $15_1$ being removed. This is the significance of the latter being drawn in dotted lines in FIG. 1. The tone source 30 has an eight-conductor output bus OB feeding into the first order multiplexer section 22a to provide tones in forty-eight channels of the one hundred ninety-two channels for the network 10. By connections set up in the network, the tone appearing in any of those forty-eight channels may be connected back out to any desired destination (the output path including, as is well known, conversion to analog waves accepted by a telephone earphone or loud speaker). Of course, the illustrated choice of preempting ports 0–47 and replacing them with the tone source 30 is arbitrary; a different quantity and a different combination of the ports may be so chosen to be preempted for tones.

As indicated in FIG. 1, the tone source 30 is synchronized in its operation by timing signals from the clock 16 and receives commands from the control unit via a command bus CB in order to be synchronized and switch different tones into different time slots. It is to be observed that in the exemplary system here illustrated, the tone source actually supplies PCM signals in forty-eight of the ninety-six time slots within each 125 $\mu$sec. cycle of the signals on conductor 24. Because of time staggering of the A/D converters $15_0$–$15_3$ (if all four were in fact used), such that the signals from the ports are taken in $P_0$, $P_{24}$, $P_{48}$, $P_{27}$, $P_1$, $P_{25}$, $P_{49}$, $P_{73}$... order, the tones show up sequentially in the time slots $TS_0$, $TS_1$, $TS_5$, $TS_6$, $TS_9$, $TS_{10}$... $TS_{92}$, $TS_{93}$ of the successive time slots $TS_0$–$TS_{95}$ for each cycle on conductor 24.

D. The Structure and the Methods of a Preferred Embodiment of the Tone Source

Referring next to FIGS. 2A and 2B, there is shown a main tone pattern memory labeled TP ROM and comprised of eight read-only memory chips $CHP_0$–$CHP_7$ each of which may be configured as containing 1024 words (addresses 0–1023) each eight bits wide. While erasable, reprogrammable PROM or readable/writable RAM memory units may be used, read-only memory ROM will suffice for the main memory because once "burned in" or stored, the contents—consisting of patterns for a plurality of sounds—rarely, if ever, need to be changed. Even then, changes are easily accomplished by substitution of one or more new ROM chips.

The main memory TP ROM is set up initially by storing therein patterns or sets of samples for at least a symmetrical portion recurring cyclic analog waves which, if converted into sound, will produce corresponding sounds. In the present embodiment, thirty-two patterns $PT_0$–$PT_{31}$ for thirty-two such sounds $SD_0$–$SD_{31}$ are so stored, with the successive samples within each pattern or set in adjacent address locations. Specifically, as indicated in FIG. 2B, each of the chips $CHP_0$–$CHP_7$ sotres four patterns. Because each chip contains 1024 word locations, there are a total of 8192 word locations, and thus any sample may be read-out by a unique address applied to an address bus and containing thirteen binary bits. Purely as a matter of choice in the present instance, however, each of the chips $CHP_0$–$CHP_7$ has in common ten address lines $A_0$–$A_9$ formed into a bus, plus a chip read enable or chip select terminal (here labeled $CS_0$–$CS_1$). The combination of 1's and 0's and address lines $A_0$–$A_9$ selects one of the 1024 words of each chip, and an enabling signal to one of the chip select terminals $CS_0$–$CS_7$ selects one of the chips—so that the stored sample at any single word location may be read out to the common eight-line output bus B of the TP ROM.

As is known in the art reflected by the above-identified prior art references, different sounds require different numbers of digital samples. Some sounds may be signaled digitally by scanning through as few as twenty-one samples, and others may require, for example, one hundred one or one hundred seventeen samples. We have found that of the sounds to be digitally signaled from a practical, commercial embodiment of the invention, none requires more than two hundred fifty-six samples. In keeping with one feature of the present invention, each sound pattern, regardless of the quantity of samples therein, is stored in a block of memory words such that the last sample address for any pattern is recognizable by a common characteristic of the multi-bit address word applied to the TP ROM address lines. FIG. 3 makes this clear by way of arbitrary examples. Chips $CHP_0$ and $CHP_1$ of the TP ROM are shown as each constituted by four blocks of words with two hundred fifty-six words in each block, i.e., block $BLK_0$ is formed by address locations 0–255, $BLK_1$ is formed by address locations 256–511, $BLK_2$ is formed by address locations 512–767, and $BLK_3$ is formed by locations 768–1023. Sound pattern $PT_0$, having twenty samples, is stored at locations 236–255; pattern $PT_1$, having one hundred samples, is stored at locations 412–511; pattern $PT_2$, having one hundred twenty samples, is stored at locations 648–767; and pattern $PT_3$, having fifty samples is stored at locations 974–1023. For this example, it will be seen that the last sample of every pattern resides at a location addressable as a binary multiple of 256 (i.e., 255, 511, 767, 1023) and when the eight least significant bits of a ten bit address signal are detected as being all 1's, it is known that the last sample of a pattern is being read out to the bus B. Such detection is easily accomplished in a manner and for a purpose to be explained below.

The illustration of chip $CHP_1$ in FIG. 3 conforms to the specific example of chip $CHP_0$, but is more generalized. It shows that for any of the sound patterns $PT_4$–$PT_7$ stored, the last sample address LSA is 255, 511, 767 or 1023, i.e., identifiable by a common characteristic of lower order bits $A_0$–$A_7$ in a multi-bit address signal on lines $A_0$–$A_9$. The first sample address FSA of any pattern therefore depends upon the quantity of samples in the pattern, but in any event is readily determinable at the time data is initially stored in the TP ROM.

Referring momentarily to FIGS. 8A and 8B, the analog waves there shown are typical for various sounds. The successive samples, and their signs, are represented by the vertical lines spaced at 125$\mu$ sec. intervals (a sampling rate of 8 KHz.). The sound for FIG. 8A is thus representable by twenty-four samples which need to be scanned from left to right repeatedly. The sample on the extreme left (zero) is the first sample FS and that on the extreme right is the last sample LS. They are stored in that order in numerically ascending address locations of a TP ROM block, with the last sample at one of the "common address bit" locations. In FIG. 8B, the wave is a single frequency sinusoid, so that fourteen samples suffice. These may be scanned successively from first-to-last, and then scanned repeatedly with the signs reversed during alternate scans. But in any case, the first sample is usually (although not necessarily) chosen at a zero crossing of the cyclic analog wave, the last sample is chosen at or near a subsequent zero crossing, with the samples of any set being stored in the main readable memory such that the last sample is at a "common binary multiple" address location and the first sample falling where it will at a known first sample address location FSA. Of course, it is within the purview of the invention to store the samples of each set in reverse order of a normal scan, i.e., to store the last sample of a pattern at the lowest address location of its block and the first sample at the highest used location within the block; a normal scan would proceed in numerically descending address order from the location of the first sample to that of the last sample, the last sample address being readily detectable by decoding of the ninth and tenth bits of a ten bit address word when the least significant eight bits are all 0's.

1. Producing Control Signals Identifying Time Slots

With the contents and format of the TP ROM in mind, it may now be explained that the practice of the present invention includes creating control signals which exist during and uniquely identify each of a succession of time slots during successive cycles. The "time slots" here referred to, however, are those in which the tone source is active, and in the example of FIG. 1 correspond to those which would ordinarily be employed to carry signals from ports $P_0$–$P_{47}$. Thus, alternate pairs of the ninety-six time slots in one 125$\mu$ sec. cycle on line 24 form the plurality of tone source time slots which will here be designated as $TS_0$–$TS_{47}$. To produce the corresponding control signals $CT_0$–$CT_{47}$ in sequence, a six-stage binary counter 35 (FIG. 2A) is driven by a signal CRCK* produced by timing circuits 36 driven with a clock signal CLK. The counter counts up in response to a positive-going transition (rising edge) in the bi-level signal CRCK* applied to its count terminal Ct and is cleared to a zero state when and so long as its clear terminal CLR is held at a "1" level by an applied bi-level reset signal RST.

At this point, it will be helpful to indicate that the drawings in this case have been prepared with certain assumptions or conventions to simplify understanding of the apparatus, but which need not be adopted in actual commercial products. First, bi-level voltages are assumed to represent a binary "1" or "0" when at a relatively high or low level. Secondly, any component is assumed to respond or be enabled only when an input signal applied thereto is at a "1" level, except for those input terminals labeled with the symbols ⌐, in which case response occurs to the positive-going wave front or edge. Of course, contrary conventions may be used in actual practice provided corresponding changes are made in logic elements such as AND, OR, NAND, NOR circuits—such changes being readily made as a matter of choice between available equivalents by those skilled in the art. Further, the inverted form or complement of any signal is here designated as an asterisk in the symbol for such signal instead of the more conventional bar. That is, the complement $\overline{CLK}$ of a signal CLK is represented by the symbol CLK*.

Figure 6A:
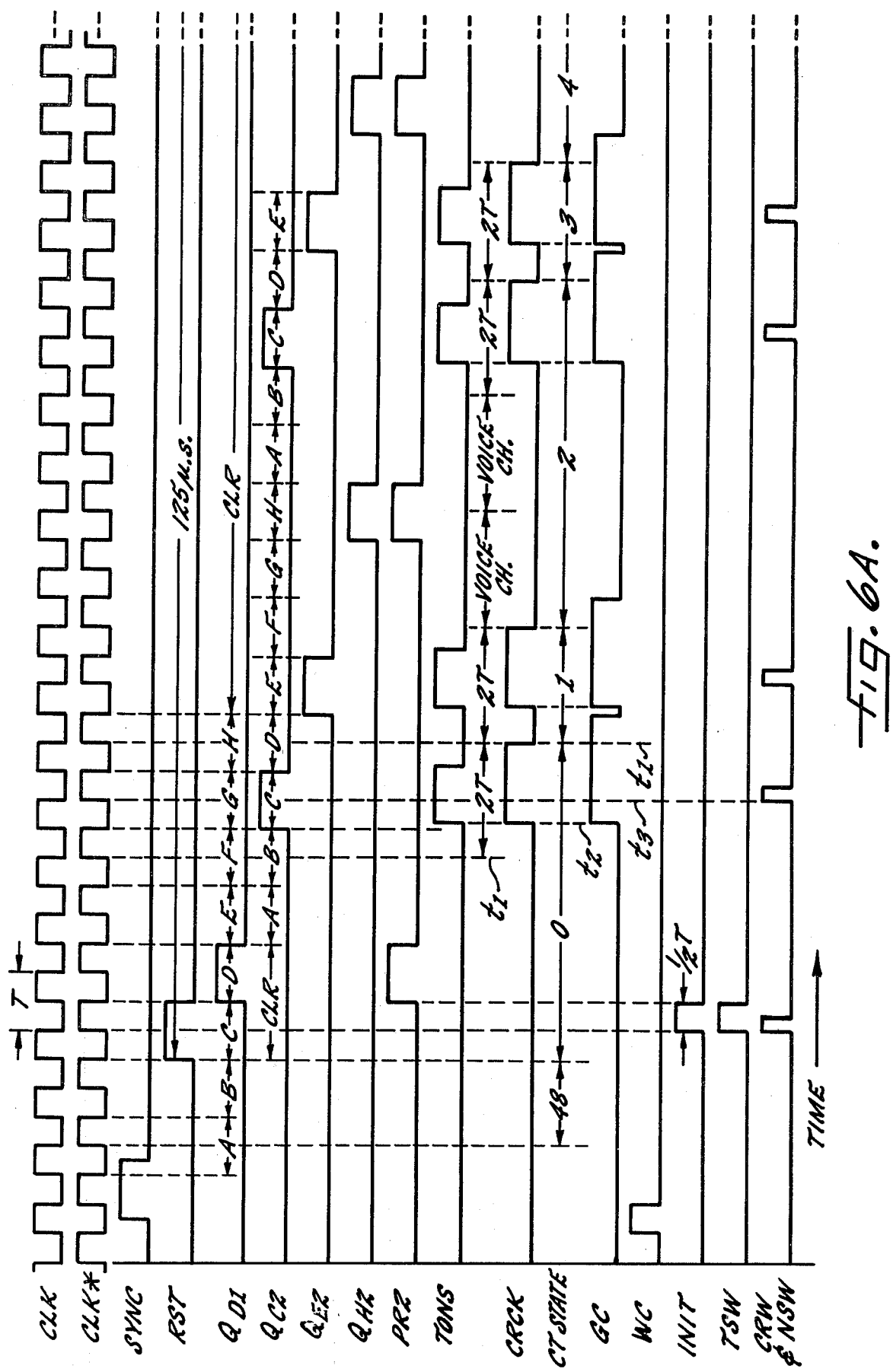
FIGS. 6A and 6B, when joined end-to-end form a diagram which illustrates the wave forms and the relative timing of various signals which are created and utilized, over the span of one cycle or frame, in the operation of the apparatus shown in FIGS. 2A, 2B to practice the methods of the invention in one preferred form.
Figure 6B:
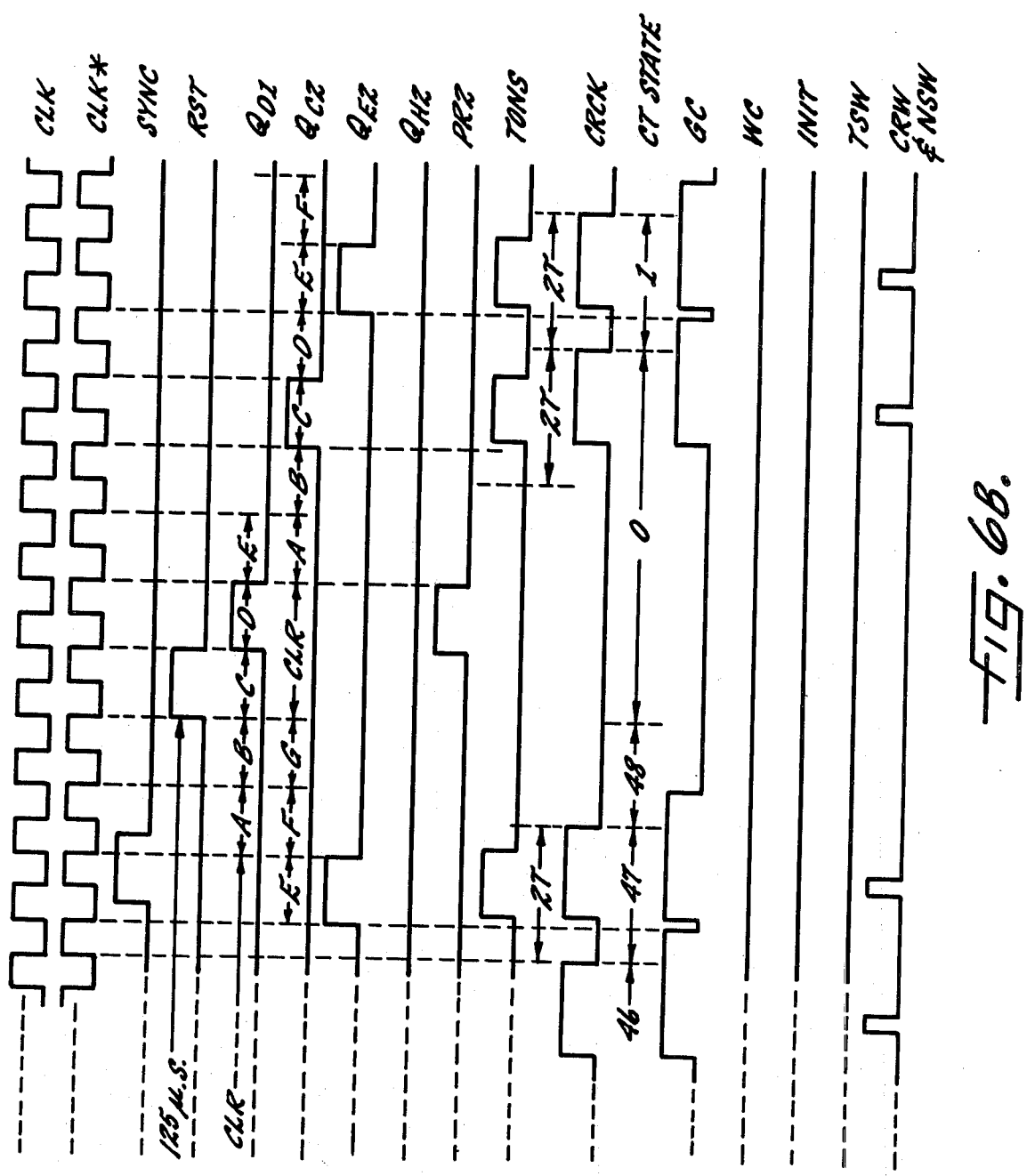

To understand the operation of the counter 35 reference should first be made to the timing circuits 36 as they are set out in detail by FIG. 4 and supplemented by the wave forms shown in FIGS. 6A and 6B. First, it is to be noted that the timing circuits continuously receive from the clock 16 of FIG. 1 a squarewave clock signal CLK which forms the basic timing for the entire system. The CLK signal has a fixed period T which for concreteness in subsequent description will be assumed to be equal to 0.648μsex. Moreover, the control unit 12 and the multiplexing sampling circuits 18 (FIG. 1) create a synchronizing signal SYNC which recurs at the frame rate of once per 125μsec. to lock all parts of the system together. As shown in FIG. 4, when the SYNC pulse arrives (see FIG. 6A) it serves to preset the A stage of an eight place binary shift register R1 (the latter normally being cleared when SYNC arrives) which is shifted in response to positive wave fronts of the CLK signal. Thus, as indicated in FIG. 6A in connection with the signal $Q_{D1}$, the outputs A and B are respectively high for the two successive periods T following the CLK wave front which first appears in coincidence with the SYNC signal. In the third period T, the signal RST at the C terminal of register R1 is high—so that a reset pulse occurs every 125μ sec. and synchronized with CLK each time the SYNC arrives. This starts a cycle of the tone source 30 because the reset signal RST clears the counter 35 as shown in FIG. 2A and simultaneously clears a second shift register R2 (FIG. 4).

As the "1" at terminal C of register R1 gets shifted to the D terminal, the signal $Q_{D1}$ (see FIG. 6A) swings high for one clock period T and passes through an OR circuit 38 (FIG. 4) to the preset terminal PR2 of the second eight-place binary shift register R2. The next rising edge of CLK therefore sets the A terminal of register R1 to a 1 level, that "1" being thereafter repeatedly shifted and recycled through such register by each succeeding rising edge of the clock signal CLK. Thus, as shown in FIG. 6A the signal $Q_{C2}$ goes high for one period T following the elasping of three periods T after the signal RST ends; two periods T thereafter the terminal $Q_{E2}$ goes high for one period T; and two periods thereafter the terminal QH2 goes high for one period. The signal $Q_{H2}$ flows through OR circuit 38 to make signal PR2 high, so that on the next positive edge of CLK, the A stage of register R2 is again set. Thus, after a reset pulse appears, the signals $Q_{C2}$ and $Q_{E2}$ each recur with a time spacing of 8T and are relatively phased apart by 2T, as the waveforms of FIG. 6A indicate.

To signal the existence of the tone slots (which comprise 48 out of 96 in a 125μ sec. cycle) that come in pairs, a tone slot signal TONS is formed by an OR circuit 39 fed with the signals $Q_{C2}$ and $Q_{E2}$. This signal TONS is applied to the preset terminal of a D-type flip-flop 40 to hold the latter in its "1" state (and the signal CRCK at the "1" level) so long as TONS is present. When TONS is at a 0 level, however, the flip-flop 40 is clocked back to, or left in, the "0" state in response to a rising edge in the signal CLK* produced from CLK by an inverter 41. Each time the signal TONS appears, the signal CRCK is driven high and the latter is driven low again when the next positive edge of CLK* arrives following the return of TONS to a "0" level. The complement signal CRCK* is formed at the $\overline{Q}$ terminal of flip-flop 40.

As shown in FIG. 6A, the signal CRCK thus has the form of two "1" level intervals separated by approximately ½ T, such pairs of intervals recurring with a time spacing of 8T. Since the counter 35 (FIG. 2A) responds to the rising edges in the signal CRCK*, it thus signals in binary notation on six output lines (LSB on the right) a number which increments by one essentially at the instant of the negative-going edges in the signal CRCK. This is illustrated in FIGS. 6A and 6B by the line labeled CT STATE, which shows the counter 35 being cleared to the zero state by the signal RST and thereafter incrementing to count states 1, 2, 3, 4 and so on. The counter will ultimately reach the state of forty-eight before being again cleared by the RST pulse which appears at the beginning of the next cycle.

The six bit output of the counter 35 thus forms control signals $CT_0$-$CT_5$ which sequentially change from 0–47 and uniquely identify the successive tone slots $TS_0$ ... $TS_{47}$ within each cycle of ninety-six time slots. Those signals are applied to the B input of a 2:1 multiplexer 42 which passes them to its output except when the signal RST is high. It may be noted in FIG. 6A, that the tone time slots are each 2T wide. Odd-numbered tone slots are coincident with the counter 35 residing in count states 1, 3, 5 ... 47; but even numbered tone slots are, in effect, located in time during the terminal portions of the intervals during which the counter is count states 0, 2, 4 ... 46. This comes about because the counter increments to an even numbered count state at the end of an odd numbered tone slot, remains in that state during two voice channel slots (carrying signals from A/D converters $15_2$ and $15_3$ in FIG. 1), the last 2T interval of an even count state constituting an even numbered tone slot.

2. A Typical Cycle

In keeping with the next step according to the present invention, the control signals $CT_0$–$CT_5$ which increment through values of 0–47 are caused to effect readout from the TP ROM, during each tone time slot $TS_0$–$TS_{47}$, one sample of the pattern for that one of the sounds $SD_0$–$SD_{31}$ preselected for transmission in that particular slot.

A particular sound pattern is selected for each of the tone time slots $TS_0$–$TS_{47}$ by a six-bit signal TT 0–5 which may have any of forty-eight numerical values during eah slot. As will be explained below, the signal TT 0–5 changes from slot to slot to identify one tone $TN_X$ to be transmitted in a given time slot $TS_y$, the tone $TN_X$ being one of a possible forty-eight tones $TN_0$–$TN_{47}$ (each tone being made up by one of the sounds $SD_0$–$SD_{31}$ and one of the schedules $SCH_0$–$SCH_{15}$). That signal TT 0–5 is applied as an address for reading of two memories 44 and 45 here shown as a Pattern Select ROM and a Schedule Select ROM. The latter will be treated hereinafter; the former is simply a 48×6 ROM which is initially constructed to store in its forty-eight locations five bit words which numerically identify one of the sound patterns $PT_0$–$PT_{31}$. The sixth bit $b_5$ of each word in the memory 44 (and which when read-out is signaled on a conductor PA5) is used for a special purpose to be explained later, and may be ignored for the present. Thus, each word which is stored in the memory 44 can represent numerically a value of 0–31, and when read out onto the memory output lines will call for or "select" one of the patterns $PT_0$–$PT_{31}$, as will become clear. When a particular time slot $TS_y$ arrives, the signals TT 0–5 will represent a tone $TN_x$ (one of a possible forty-eight) and thus will cause readout from pattern select ROM 44 signals PA 0–4 which represent a particular pattern $PT_z$ (one of a possible thirty-two) which is the sound portion of the tone $TN_x$. To put this in terms of a concrete example, let it be assumed that the busy tone (see the tone listing set out above) is assigned tone No. 11 and that the sound pattern for 480 Hz. plus 620 Hz. is assigned pattern No. 17; and that it is desired to transmit the busy tone in tone time slot No. 23. For such assumed facts:

(a) The pattern of samples for the busy sound would be initially stored in block $BLK_2$ of TP ROM chip $CHP_4$, with its last sample at the address 511 on the chip, and its first sample thus at a known lower-numbered address on that chip.

(b) The numbered "17" would initially be stored in binary forms as bits $b_0$–$b_4$ at the address 11 in the pattern select memory 44.

(c) Then, during operation of the tone source, and as explained more fully below, the signals TT 0–5 would be created to represent the value "11" during that interval when the control signals CT 0–5 represent the number "23" and thus when tone time slot $TS_{23}$ occurs in each of successive cycles.

(d) When time slot $TS_{23}$ arrives, therefore, the output of memory 44 (from address 11) on lines PA 0–4 will be 10001=17, thereby signifying that one sample of pattern $PT_{17}$ is to be transmitted during that particular time slot.

(e) Of course, during the next time slot $TS_{24}$, the signals TT 0–5 may have a different value representing a different one of the forty-eight possible tones, and the output PA 0–4 from memory 44 will take on a different value to identify that one of the thirty-two sound patterns forming part of the selected tone.

The conductors PA 2–4 lead to a 3:1 gated decoder 46 which has eight output lines connected to enabling chip select terminals CS 0–7 on the respective chips $CHP_0$–$CHP_7$. The simple decoding truth table is set out as Table I (located at the end of this specification). Briefly stated, since it is known that the individual chips $CHP_0$–$CHP_7$ each contain four sound patterns, then as the pattern signals take on values in successive groups of four (0–3, 4–7, etc.) then a successively higher one of the chips ($CHP_0$, $CHP_1$, etc.) should be enabled to effect readout of a sample within the desired pattern. Thus, when the signals PA 0–4 are 10001=17, identifying $PT_{17}$, the signals PA 2–4 are 100=4 and the decoder 46 applies a "1" level voltage to terminal CS4 to enable chip $CHP_4$ (and only $CHP_4$).

The conductors PA0 and PA1 normally feed their signals to lines A8 and A9 in the address bus A0–9 —so that the appropriate block, of the selected chip, containing the selected pattern is addressed. The signal PA0 passes through an EXCLUSIVE OR gate 48 to reach the line A8, but it will be assumed for the moment that such gate passes the signal unchanged. Table II confirms that when the two signals PA0 and PA1 take on four possible combinations 00, 01, 10, 11 and the address signals A8, A9 in a ten bit address word A0–A9 correspond thereto, then the corresponding one of blocks $BLK_{0-3}$ will be the one addressed on the enabled chip—with the particular word location within that block being determined by the address signals A0–A7. To pursue the example set out above, if the signals PA0–4 have values 10001=17, then with PA2–4 having values of 100, chip $CHP_4$ will be enabled, and with PA0, PA1 having values of 01, block $BLK_2$ on that chip will be selected—and the particular sample read out to the bus B will lie between address locations 256–511, i.e., will be one of the samples for pattern $PT_{17}$. Thus, when a selected sound $PT_z$ is identified during any tone time slot $TS_y$ by the signals PA0–4, then readout of a sample from the corresponding pattern $PT_z$ stored in the TP ROM will be enabled.

The particular sample readout from within the selected pattern will be determined, however, by the lower order address signals A0–A7. These signals change from cycle-to-cycle in order that the samples of the preselected sound (always read out in the same time slot) will be scanned, and so that the necessary scan sequences are produced. In keeping with an important feature of the present invention a read/write memory is employed to provide the particular sample address signals during each slot of each cycle —and to change the particular sample address signals appearing in a given time slot from cycle-to-cycle. As shown for the present embodiment, a 48×8 Next Sample RAM 50, when read, produces "next sample address" signals on its eight output lines NS0–7, those signals being taken into a gated input register 51 whose output on lines $SA_0$–$SA_7$ form the eight lower order bits A0–A7 of an address signal applied to the TP ROM chips. The memory 50 is connected such that it always reads out a word, from the address signaled on the conductors CT0–5, unless "writing" is enabled by a "1" level existing in a "next sample write" signal NSW (in which case the multi-bit signals at its date input are written into the address location then signaled on conductors CT0–5). The register 51 is one which functions simply to feed its input signals to its output lines except when a control signal CRCK* is low, in which case the contents of the register, and its output signals, are frozen at their last-gated values, regardless of how the input signals may change.

Now, as the number signaled at CT0–5 changes from 0 through 47, the forty-eight previously stored words in the next sample RAM 44 are successively read out and transmitted through the grating register 51 to conductors SA0–7. During any tone time slot $TS_y$, those signals form eight bits A0–A7 on the address bus A0–A9 leading to the TP ROM chips, and identify the sample address within a block of two hundred fifty-six locations from which a sample is to be read.

To further pursue the example set out above, if during time slot $TS_{23}$ (when signals at CT 0–5 represent the decimal number "23"), the signals previously formed and stored (in a manner to be described) at address location 23 in RAM 50 are read out to conductors NS 0-7. Assuming that such signals pass directly through register 51 to appear at SA 0-7 and A 0-7, and that such signals are 11000001=93 (and recalling that chip CHP4 has been enabled with A8 and A9 address bits of levels 01), then a sample of pattern $PT_{17}$, and specifically the one at address location 449 on CHP4, will be read out to appear on the bus B.

This sort of action occurs during each tone time slot of each cycle —so that signals representing one sample of a sound pattern preselected for each slot appear at the output bus. As will become apparent below, except in the case of fixed tones, which are optional in the practice of the invention, the preselection is unlimited; a sample of any preselected sound may be transmitted during the successive occurrences of any time slot.

As noted above, however, as each time slot recurs during successive cycles, successively different ones of the samples in the preselected sound pattern are to be read out. It is this charging of the PCM coded values each cycle (e.g., every 125μsec.) which later enables the sound to be reproduced as audible sound waves. In a way to be described hereinafter, the "next sample address" signals appearing in a given slot of one cycle are replaced (after they have been used) with a new or next value to be employed during the same slot of the ensuing cycle. This is done by deriving the new sample address through the operation of logic circuits 55 (labeled logic A) cooperating with a sequence memory 56, a read/write control RAM 58, an incrementing or decrementing adder 59, a first sample memory 60, and a 2:1 multiplexer 61 (MUX 3)—all of which cooperate in the forming and writing of the next sample address into the next sample RAM 50 during any given time slot.

3. Forming and Storing Next Sample Addresses

As explained above, when samples are initially stored in the TP ROM, the address of the first sample (within its block, and representable as eight bits A0-A7) for each of the patterns $PT_0$-$PT_{31}$ becomes known. Moreover, during any time slots $TS_y$ the output of memory 44 on lines PA 0-4 represents numerically the pattern $PT_z$ which has been preselected to have its samples transmitted during recurrences of that time slot. In order to produce and make available signals which represent the "first sample address" of any particular pattern $PT_z$, a readable memory in the form of a First Sample ROM 60 is set up by initially storing therein thirty-two eight bit words representing the address (in TP ROM) of the first samples in the thirty-two respective patterns. The memory 60 is "read" by applying the signals PA 0-4 to its address lines —and with the result that during any time slot $TS_y$ when the signals PA 0-4 identify the preselected tone pattern $PT_z$ for that slot, signals appear at the memory output lines FS 0-7 which represent the first sample address of that pattern $PT_z$. In keeping with the invention, such signals are utilized to effect proper scanning of the samples of the selected pattern, as will be explained below. It should be remembered that the signals at FS 0-7 contain eight bits and thus correspond in orders to the address signals on lines A 0-7.

To carry out one aspect of the invention, means and steps are provided to detect when the signals SA 0-7 (and A 0-7), which in any time slot change from cycle-to-cycle, represent the first sample of the preselected pattern. For this purpose, the signals at FS 0-7 and SA 0-7 are fed to the logic circuits 55, the latter being described below. The signals FS 0-7 are also fed to the "B" input of a 2:1 multiplexer 61 here labeled MUX 3. The latter applies to the data inputs of the Next Sample RAM 50 either the signals FS 0-7 or the eight bit output from the adder 59, depending upon whether a signal applied to its $E_nB$ terminal from an OR circuit 64 is respectively high or low. Generally speaking, the logic circuits 55 determine the level of that latter signal by producing a "first sample select" signal FSS. Also the logic circuits create an "adder control" signal AC which, when low or high, causes the adder 59 to product output signals which numerically are one greater or one less than the value represented by the input signals SA 0-7 applied to its input. Recalling that the signals SA 0-7 represent the address of a sample being read during any time slot of the present cycle, it may be seen that if the adder 59 adds one, its output represents the address of the next sample to be read during the next cycle for an ordinary scan of samples in ascending address order.

4. Controlling Scan Sequences

At this point, it will be helpful to explain the nature of the various types of scan sequences which may be required for different sound patterns, depending upon the shape and symmetry of the cyclic analog wave which is to be ultimately reproduced and converted into sound. Generally stated, if a wave has no symmetry within a cycle, samples representing one whole cycle C are included in its pattern, and the samples are repeatedly scanned in first-to-last order. This case is illustrated by the wave 70 in FIG. 8A, where the vertical lines represent the magnitude and signs of the samples of a corresponding stored pattern. The pattern would be scanned from the first to the last sample, and the scan sequence will involve straight repetitions of that scan, as represented by the series of downwardly directed arrows indicating that the TP ROM memory pattern is "scanned down" by numerically ascending address signals. Almost any desired continuous sound may be represented by an integral number of multi-bit samples which are, in effect, taken at 125μ sec. intervals.

FIG. 8B illustrates a cyclic analog wave 71 (which happens to be a single frequency sinusoid) having half-wave, opposite polarity symmetry. In this case only samples for the first half cycle C/2 need be included in the pattern or set of stored samples, thereby reducing the required memory capacity. The wave is signaled digitally by (i) scanning the sample first-to-last, (ii) then scanning the samples first-to-last, but complementing the sign of each sample as it is transmitted, —and repeating that sequence over and over. This characteristic, i.e., that the signs are to be changed during alternate scans, will here be designated by the letter S, standing for "sign change". The alternate arrows of solid and dashed lines in FIG. 8B symbolically designate that the samples of the pattern during each scan are taken by "reading down" through successive addresses (ascending order of address numbers) to scan first-to-last, the solid arrows indicating that the samples are read out as originally stored and the dashed arrows indicating that before reaching the final output of the tone source, the sign bits of the sample signals are complemented to change the sign.

Figure 8C:
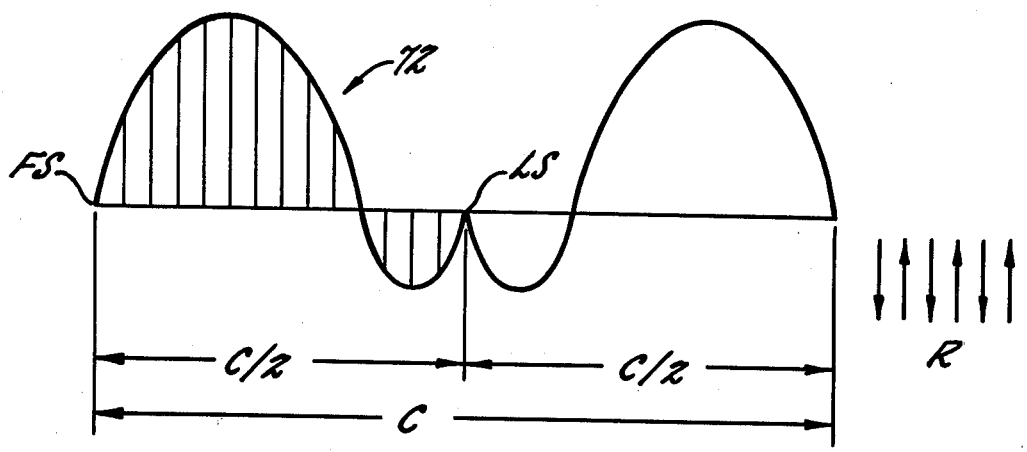

FIG. 8C shows a cyclic analog wave 72 such as might result from the combination of two sine waves. Observe that while a full cycle extends over the period C, the second half cycle C/2 is identical to the first half cycle if the second half cycle is viewed in a "reverse time direction". This means that a plurality of samples for only the first half cycle C/2 may be stored as a sound pattern, and the entire cycle will be represented digitally if the samples are first scanned in first-to-last order, then scanned in last-to-first order, and that sequence repeated. This characteristic is here designated by the symbol R, standing for "reverse directions" for alternate scans. The alternate arrows pointing down and up pictorially represent that sequence.

Figure 8D:
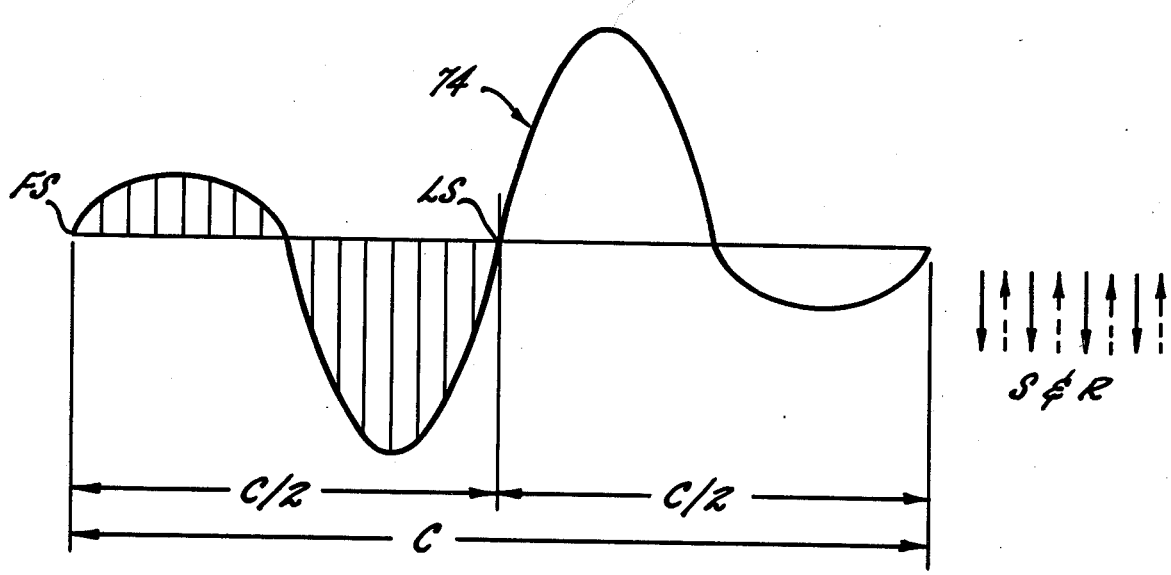

FIG. 8D shows a wave 74 having both the characteristics S and R explained above. That is, samples for the first half wave C/2 may be stored to form a pattern for the wave; but to reproduce the entire cycle C, those samples are to be scanned initially in first-to-last order with stored sample signs, and then in last-to-first order with the sign bit of each sample changed before final outputting. The arrows alternately reversed in direction and alternately dotted symbolically represent this scan sequence, and indicate that any wave may have two or more of the characteristics here noted.

Figure 8E:
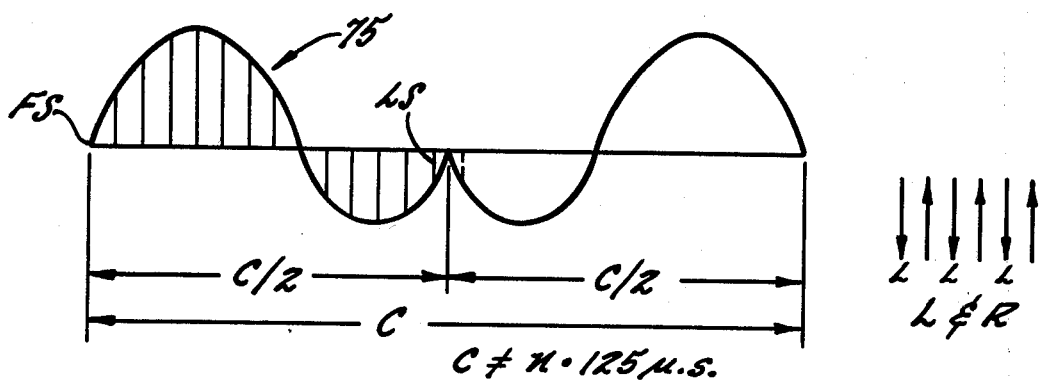

The wave 75 shown in FIG. 8E is intended to illustrate what is called the "last sample repeat" characteristic. Observe that the half cycle duration is such that the zero magnitude at the end of the first half cycle does not coincide with one of the sampling instants which are spaced at 125μ sec. intervals. One may "fudge" the cycle period of a wave such that a zero crossing occurs midway between two sampling instants (with the first sample instant always at a zero crossing) to create a sound whose wave is of almost any frequency and shape, and without exceeding industry-accepted frequency tolerances. In such cases, after the samples representing the first half cycle C/2 have been scanned, the last sample LS may be repeated to form, in effect, the first sample output for the next reverse order scan. The "last sample repeat" characteristic may be designated by the letter "L", and in the symbolic arrow depiction of scan sequences it is shown as an L beneath each downwardly directed arrow. It will be apparent that the wave 75 in FIG. 8E results in a pattern of samples which is to be treated with both the L and R characteristics.

With the foregoing in mind, Table X will be understood as showing that any pattern of samples may have any combination of three sequence characteristics L, R and S—making eight possible composite scan sequences which are symbolically shown by arrows. Of course, when any sound pattern is initially stored in the TP ROM, its sequence characteristics will be known, and they may be represented in a three-bit binary word (having eight possible values) as shown in the second, third and fourth columns of Table X.

In keeping with the present invention, the sequence character of each of the patterns $PT_0-PT_{31}$ is represented by a three-bit data word stored at corresponding addresses of a 32×3 readable memory 56 which in FIG. 2A is labeled "SEQUENCE ROM". The memory is read, during each time slot, by applying the signals PA 0-4 to its address lines, so that its three output lines carry signals SEQ L, SEQ R, SEQ S at "1" levels when the pattern $PT_z$ preselected for that time slot has those respective characteristics. For example, if the pattern $PT_z$ were that for wave 71 of FIG. 8B, the output signals would be 001; and similarly for FIGS. 8C, D, E the output signals would respectively be 010, 011 or 110. During each time slot of each cycle, therefore, the logic circuits 55 receive three signals L, R, S which collectively designate the scanning sequence with which the pattern preselected for that time slot must be treated. Such signals will determine the scan sequences which are executed as a large number of cycles occur—as noted below with reference to FIG. 5.

As treated briefly above, the adder 59 may form a next sample address by incrementing or decrementing the present sample address (signaled at SA 0-7) in the mid-portion of any scan (up or down). But a scan down ends when the last sample of the pattern is read out, and the following scan may require (i) next reading out the first sample, (ii) next reading out the next-to-last sample, or (iii) repeating the last sample and followed by the first or the next-to-last sample—and in any of those cases either with or without a change in the sign of the sample signals as they are ultimately transmitted to the final output bus OB. Moreover, when the first sample is reached at the end of a "scan up", the following scan must begin always with reading of the second sample. In keeping with the invention, the scan conditions are sensed and the correct one of these possibilities is executed.

As a component useful in accomplishing that objective, a 48×3 control RAM 58 is associated with the logic circuits 55. Like the next sample RAM 50, it normally always reads out signals from the address supplied to its address lines via the control signal conductors CT 0-5; but when a "control ram write" signal CRW applied to its write enable terminal W is at the "1" level, then it instead writes the signals WDL, WDR, WDS, then applied to its data inputs, to the address location then signaled at CT 0-5. The data signals WDL, WDR, WDS written are formed by the logic circuits 55, and the output signals RDL, RDR, RDS read from the control RAM 58 are used by the logic circuits 55 as will be described below.

Figure 5:
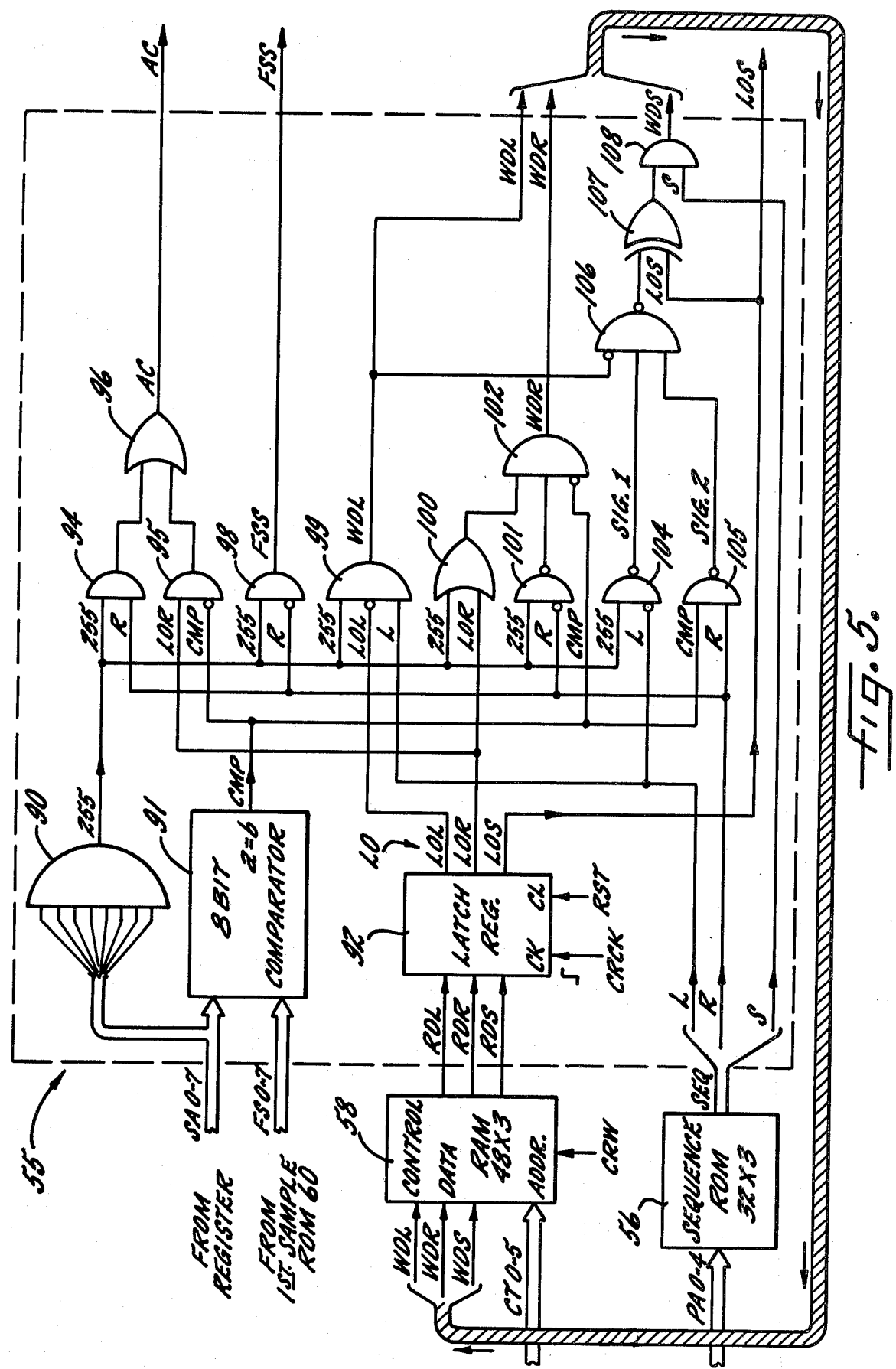
FIG. 5 is a more detailed illustration of the "Logic A" portion of the apparatus shown in FIG. 2B.

(a) Next Sample Logic Circuits (FIG. 5)

Before taking up FIG. 5, reference will again be made to the timing circuits 36 shown in FIG. 4 to explain the timing with which dta is "written" into the Next Sample RAM 50 and the Control RAM 58 by the signals NSW and CRW, respectively. It will be seen that these signals are derived from a one-shot circuit 80 (monostable multivibrator) which is triggered by a voltage rising edge applied to its input terminal Tr, and so that its Q output terminal rises to form an output pulse CRW of predetermined length. The terminal Tr is fed from an AND gate 81 receiving (i) the CLK* signal and (ii) the output of an OR circuit 82 which receives the TONS signal and the signal INIT (to be later discussed below). For the moment, it may be seen from FIGS. 6A and 6B that when signal TONS is high, then the AND gate 81 causes one-shot circuit 80 to be triggered on the next rising edge of CLK*, so that a relatively narrow output pulse CRW is produced beginning substantially at the mid point of each 2T interval which forms one of the tone time slots. See FIG. 6A. The signal NSW is formed by an AND gate 84 fed with CRW and the inversion WDL* of the write data L signal WDL produced in the logic circuits 55. In most situations, the signal WDL* resides at a 1 level, so signals CRW and NSW are identical as shown in FIG. 6A. The point to be observed is that in most time slots, new data is written into memories 50 and 58, the former receiving the output of the multiplexer 61 (FIG. 2B) and the latter receiving the then-existing outputs WDL, WDR, WDS from the logic circuits of FIG. 5—with the data being written into an address location signaled on conductors CT 0-5 and representing the then-current time slot. But such writing occurs only after the first portion of the active time slot (2T wide, as shown in FIG. 6A) has expired.

Referring next to FIG. 5, the logic circuits include means for detecting when the last sample of any pattern is, during any time slot, being read from the TP ROM. As here shown, the detection is easily made by an AND gate 90 receiving the signals at SA 0-7 (the same as A0-7) and producing a signal called "255" when they are all 1's. Since, as noted above, the last sample of each pattern is stored in the last location of its block in a TP ROM chip, the signal 255 will appear only when a last sample is being read, i.e., when address lines A0-7 are receiving an eight bit address number which is equal to the decimal value 255.

Further in keeping with the invention, there is a detection and signaling of the fact when the first sample of any pattern is, during any time slot, being read from the TP ROM. As here shown, an eight bit comparator 91 receives—during each time slot—the signals SA 0-7 and the output FS 0-7 read from the first sample ROM 60. Its comparison output signal CMP goes high only when the two inputs are identical and will thus be high at the beginning of any time slot when the first sample of any pattern is being read out of TP ROM because the first sample ROM 60 is read, during any time slot, by address inputs PA 0-4 (FIG. 2A) which identify the pattern preselected for that time slot.

As also shown in FIG. 5, the output signals RDL, RDR, RDS read from control RAM 48 form inputs to the logic circuits and are "saved" temporarily in a latch register 92. The latch output signals are designated LOL, LOR, LOS—the terminal letters L, R, S carrying the significance explained above. The signals RDL, RDR, RDS are clocked into, and become the output signals LOL, LOR, LOS of, the register 92 once during each time slot by the rising edge of signal CRCK. From FIG. 6A, it will be seen that entry of signals into the register 92 occurs roughly ½ T after each time slot of 2 T width begins.

The output signals SEQ L, SEQ R, SEQ S from the sequence ROM 56 also form inputs to the logic circuits of FIG. 5 and are designated simply L, R, S. As each time slot occurs, the signals PA 0-4 identify the sound pattern preselected for that slot, and the signals L, R, S collectively represent the scan sequence characteristics for that pattern.

There are, of course, two scan directions, up and down, —meaning that the TP ROM addresses for a given pattern are to be taken in numerically ascending or descending order during a given time slot of successive cycles. In such cases, the apparatus of FIG. 5 makes the adder control signal AC a 0 or a 1 during the progress of a single scan—so that when address for sample $S_j$ appears during a given slot of a given cycle $C_i$, the adder output becomes the address for sample $S_{j+1}$ or sample $S_{j-1}$ to be used during the next cycle $C_{i+1}$. That is, the adder/subtractor 59 adds one or subtracts one to its input signals SA0-7 and signals the result at the "A" input of multiplexer 61 (FIG. 2B). To control the adder 59, the signals 255, R, LOR and CMP are applied to logic gates 94, 95, 96 (FIG. 5) which determine the 1 or 0 level of the signal AC according to the truth table set out in Table III. It may be observed that if the R characteristic is absent (and signal LOR remains always 0), then signal AC is always low and successive address from the adder are incremented. If the R characteristic is present, however, then when the last sample in a "downward" scan is reached (and the signal 255="1"), the signal AC becomes a "1", and an upward scan begins. It will continue high (with LOR="1") until the first sample is reached and the signal CMP becomes a "1" (after which LOR reverts to "0")—whereupon a downward scan will begin.

The signal FSS for controlling multiplexer 61 is formed by a single gate 98 which is, in effect, an AND gate receiving 255 and R* inputs. The signal FSS will, as shown in the truth table of Table IV, always be "0" except when the last sample is being read (255="1") and the characteristic R is absent. In the latter case, the signal FSS becomes a "1", and the multiplexer 61 is conditioned to send the signals at FS 0-7 (instead of the adder outputs) to the data inputs of the Next Sample RAM 50 for writing when signal NSW appears.

The signals WDL, WDR, WDS are formed in the apparatus of FIG. 5 according to conditions in a given time slot of one cycle so as to be usable in the same time slot of the next cycle. They control what the next sample address will be, at the start of a new scan, when the end of a given scan is reached; and they are preserved (repeatedly written into and read from the control RAM 58) as each sample is used during a scan.

Consider first the signal WDL. It is formed by a logic gate 99 from the signals 255, LOR, L. As shown by Table V, signal WDL becomes a "1" during the terminal portion of any time slot, if, and only if, (i) the last sample is then being read (so signal 255="1"), (ii) the signal L is "1" (indicating the preselected pattern has the "last sample repeat" characteristic), and (iii) the signal LOL is "0" (indicating that the sample used for the same time slot of the preceding cycle was not the last sample). When WDL does become "1", it signifies that the last sample should be repeated and used again in the same time slot of the ensuing cycle, and thus that the same sample address as that presently signaled at SA 0-7 should be used during that time slot of the ensuing cycle. When WDL is a "1", WDL* in FIG. 4 becomes a "0", and the signal NSW does not appear, so the sample address data in RAM 50 (at the address signaled on CT 0-5) is not changed. It is to be noted that WDL goes to a 1 level during only one cycle when the last sample is reached at the end of a downward scan, because when WDL occurs in a given cycle it is written into the control RAM 58, so that the signal LOL becomes "1" during the next cycle to inhibit re-creation of the signal WDL.

FIG. 5 shows that, during a given time slot of a given cycle, the signal WDR is formed by logic gates 100, 101, 102. The truth table for their operation appears in Table VI. It will be seen that WDR becomes a "1" only if the pattern being scanned has a "reverse directions" characteristic and the signal R is a "1". When the last sample of the pattern is reached in a downward scan or when LOR is a 1, the output of OR circuit 100 is a 1. Only under these conditions can WDR become a 1. But further, if it is the LOR signal which produces a 1 from OR circuit 100, then WDR can be a "1" only if (i) 255="0" and R="1" to make the output of gate 101 have a 1 level and (ii) if CMP=0. Thus, for any pattern having a "reverse direction" characteristic, WDR becomes a "1" when the last sample in a downward scan is reached, remains a 1 during the ensuring upward scan (because WDR is written during each cycle and read to make LOR a 1 during the next cycle), but reverts to a 0 when the first sample is reached at the end of an upward scan (because CMP then becomes a 1).

The signal WDS is created during alternate scans of a pattern having the "alternately change signs" characteristic S. It is formed by gates 104 through 108. Tables VII and VIII contain the simple truth tables for gates 104 and 105 to indicate how signals SIG1 and SIG2 relate to 255, L, CMP and R. Table IX reflects the truth table for WDS as formed by gates 106, 107, 108. One sees immediately that WDS can never be "1" if the S characteristic of the pattern being treated is absent and the signal S is "0". On the other hand, the signal WDS becomes a 1 if signal S is a "1" and the sample being treated is the last sample in a downward scan when LOS is 0, after which WDS and LOS remain at a 1 level in the same time slot of succeeding cycles during the ensuring scan until either the first or last sample is reached in an upward or downward scan.

In a given time slot of a given cycle, the outputs RDL, RDR, RDS from RAM 58 are first latched into the register. They are the same as the signals WDL, WDR, WDS formed during the previous cycle and written into the RAM 58, and in a given cycle they become the new latch register outputs LOL, LOR, LOL. This creates, during the given cycle, the signals AC and FSS at the proper levels, and also forms new (although perhaps unchanged) values of the signals WDL, WDR, WDS which are then written (at an instant approximately mid-way through the time slot) into the RAM 58 without, at that instant, changing the signals LOL, LOR, LOS.

During each time slot when the signal LOS is at a "1" level,—and it will so remain during a given time slot of all the cycles required for one complete scan of the samples for the preselected pattern—it is used to complementally change the sign bit of the eight-bit sample signals read from the TP ROM. As shown in FIG. 2B, the output signal LOS from FIG. 5 is applied to one input of an EXCLUSIVE OR circuit 110 which receives the eighth bit (sign bit) signal from the TP ROM output bus B. If LOS is a 1, the stored sign bit is inverted before being applied to a final eight bit gate 112 whose output leads to the final output bus OB. Thus, the outputs from the TP ROM are applied, when the gate 112 is enabled, to the final bus OB with the sign bit selectively non-inverted or inverted as determined by the signal LOS.

A moment's comparison of Table X with the operation of FIG. 5 will confirm the following:

(a) Once a scan is started (down or up) the signal AC remains the same (0 or 1) during a given time slot of recurring cycles. The output of the adder 59 thus represents an address number which is one greater or one less than the "this cycle" address signals at SA 0-7—and this is written into the next sample RAM to be used during the next cycle.

(b) It is only during scan sequences of a pattern having the R characteristic that samples are scanned in an "upward" (numerically descending address order) direction. But an upward scan begins only after each downward scan ends (the last sample is read and 255="1"), and it ends when the first sample is reached so that the signal CMP becomes "1".

(c) The last sample is repeated at the end of each downward scan of a pattern having the L characteristic.

(d) Absent the R characteristic for a pattern, when the last sample is read, or the last sample is repeated if there is an L characteristic, then after each downward scan is completed (as detected when signal 255 becomes a "1"), a new downward scan is begun by jumping back to the first sample address. This is accomplished when the signal FSS signal becomes a "1" so that multiplexer 61 is conditioned to write the output of the First Sample ROM 60 (rather than the output of the adder 59) into the next sample RAM 50.

(e) When a pattern has the S characteristic and the signal S is a 1, then on alternate scans the signal LOS is a 1 and the EXCLUSIVE OR circuit 110 inverts the sign bits read from the TP ROM. The end of a scan (after which the signal LOS changes) is detected when signal 255 becomes a 1 (in the case of a downward scan) or when the signal CMP becomes a 1 (in the case of an upward scan).

(f) The signal WDL appears as a 1 and recirculates through control RAM 58 for one cycle to cause the last sample to be repeated, by the AND circuit 84 of FIG. 4 inhibiting the writing of a changed sample address into the next sample RAM 50 at the end of each "downward" scan of a sample having the L characteristic.

(g) The signal WDR is created and recirculated through the control RAM 58 to form the signal LOR during "upward" scans of a pattern having the R characteristic. This causes the signal FSS to be "1" and makes the adder 59 form next sample addresses by decrementing.

(h) The signal WDS is recirculated through the control RAM 58 to form the signal LOS during alternate scans of a pattern having the S characteristic.

All of the foregoing is accomplished with respect to scanning of a particular pattern which has been preselected for a given time slot, the one scan occupying as many cycles as there are samples in the pattern. When one scan ends, the next begins on the succeeding cycle—so that the proper samples are outputted at 125μ sec. intervals in a given time slot on a continually repeating basis. Subsequent demultiplexing, decoding and filtering of the samples will therefore produce a counterpart analog wave transducable by an earphone or loud speaker into a counterpart sound.

The different types of scan sequences are illustrated by Table XI which shows how the samples are read out in succession to produce scan sequences for the eight sequence characteristics set out in Table X. Each block within a column represents conditions during the same time slot of one cycle. The first line within a block indicates the active latch output signals LOL, LOR, LOS as a three-bit word. The second line within each block represents the address (within a TP ROM block and as signaled on lines SA 0-7) of the sample being read during that particular cycle, recalling that the last sample is at address 255 and the first sample of the pattern is at some known first sample address FSA. The remaining lines within any block illustrate the values of certain other designated signals.

By way of example, the second column of Table XI depicts the scan sequence for a pattern which has the characteristics LRS=010, designating that the samples are to be scanned alternately up and down. In the first and second blocks of Column #2, addresses 253 and 254 are shown as being read in succession during a downward scan. In the third block, address 255 (last sample) is being read out, so the control signal AC reverts from 0 to 1, and WDR=1 is formed so as to be written into the control RAM 58. In the next cycle (fourth block), therefore, the adder 59 has formed the next address 254 by decrementing and the value 254 is being read from RAM 50 so an upward scan begins with reading of a sample from address 254. The signals AC and WDR remain high in the following cycles as the upward scan proceeds—until the address being read is reduced to that of the first sample address FSA. At that point, the signal CMP becomes high, so that AC and WDR revert to 0—and a downward scan begins.

From the foregoing example, the remainder of Table XI will be fully understandable to one skilled in the art as illustrating the basic steps by which the apparatus of FIGS. 2A and 2B (and as detailed in FIGS. 4 and 5) scans a pattern preselected for any time slot and produces the required scan sequences which are designated by a three bit characteristic word stored in ROM 56 for each of the patterns. Each individual scan, which involves using all of the samples of a pattern, is carried out in one of four fashions, as indicated by Table X. The first fashion scan takes a pass through all samples from first-to-last with true signs; the second fashion scan is the same but involves complementing the sign bits of the samples; the third fashion scan takes all samples last-to-first with true signs; and the fourth fashion is like the third but with complemented signs. The last sample repeat is a special case. But the sequency of scanning produces the proper scan fashions in the correct order according to the characteristics of the stored sound pattern.

5. Operations and Relative Timing Within One Time Slot

As mentioned above with reference to FIGS, 6A and 6B, the counter 35 (FIG. 2A) counts from 0 to 47 during each cycle to measure off forty-eight tone time slots, there being forty-eight voice channels or slots in the same cycle. Although the counter 35 resides in each of the even count states (0, 2, 4, 6 . . . 46) for intervals of 6T, it is only the last 2 T of such intervals which form a tone time slot of $1.3\mu$ sec., as labeled above the CRCK waveform in FIGS. 6A and 6B. Observe from count state 1 in FIG. 6A that odd count states begin with the signal CRCK low for something less than half of the corresponding 2 T interval, and that signal is high during something more than the last half of the time slot duration. This same relationship exists for signal CRCK during the time slot signaled by an even count state, except that CRCK has been driven low at the end of the preceding odd count state and it switches high only after a portion of the 2 T interval for an even numbered time slot has elapsed.

Figure 7A:
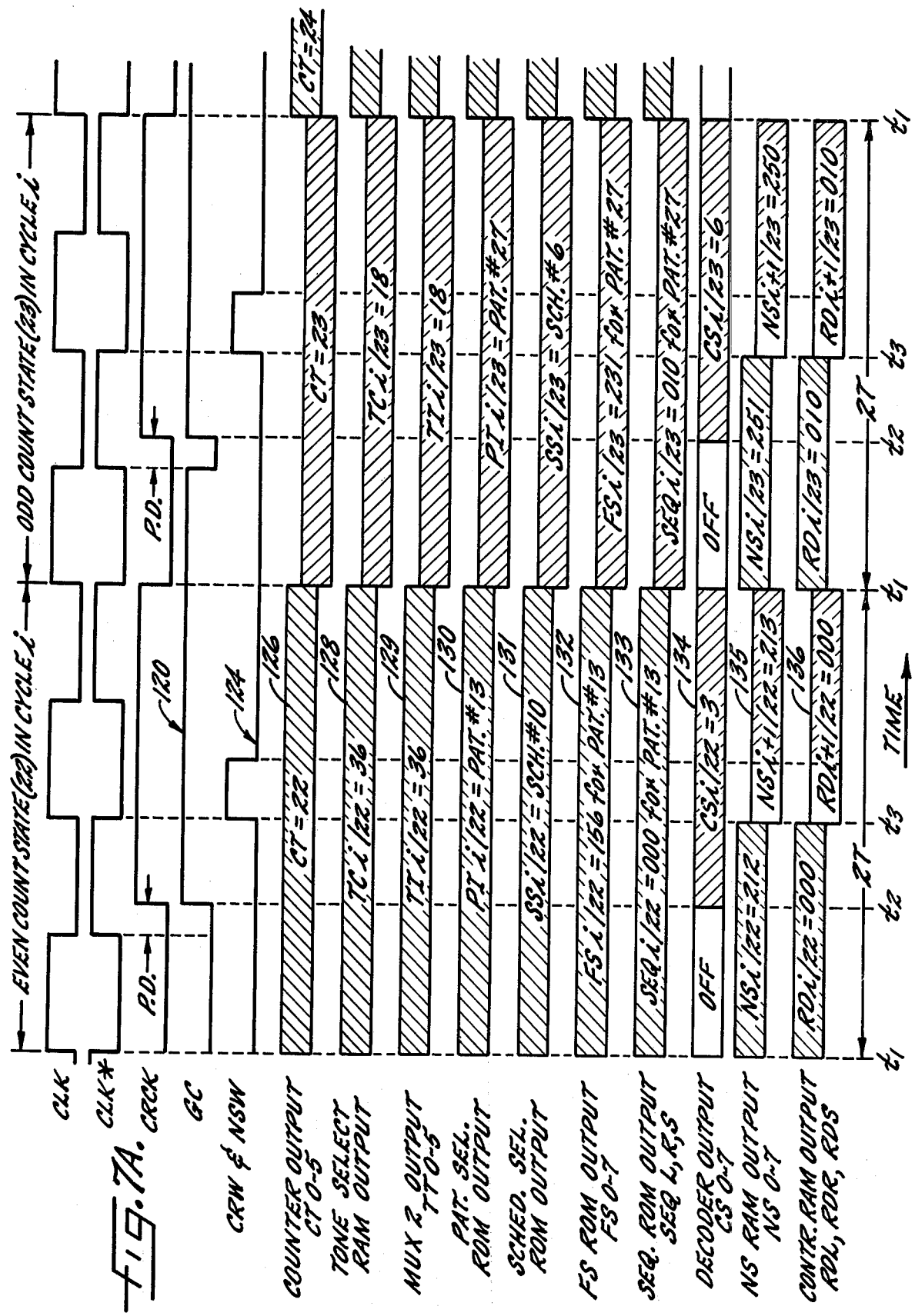
FIGS. 7A and 7B shows a timing chart which shows how certain signals change over the span of two adjacent time slots within a typical cycle, and which aids in understanding the methods of the present invention.
Figure 7B:
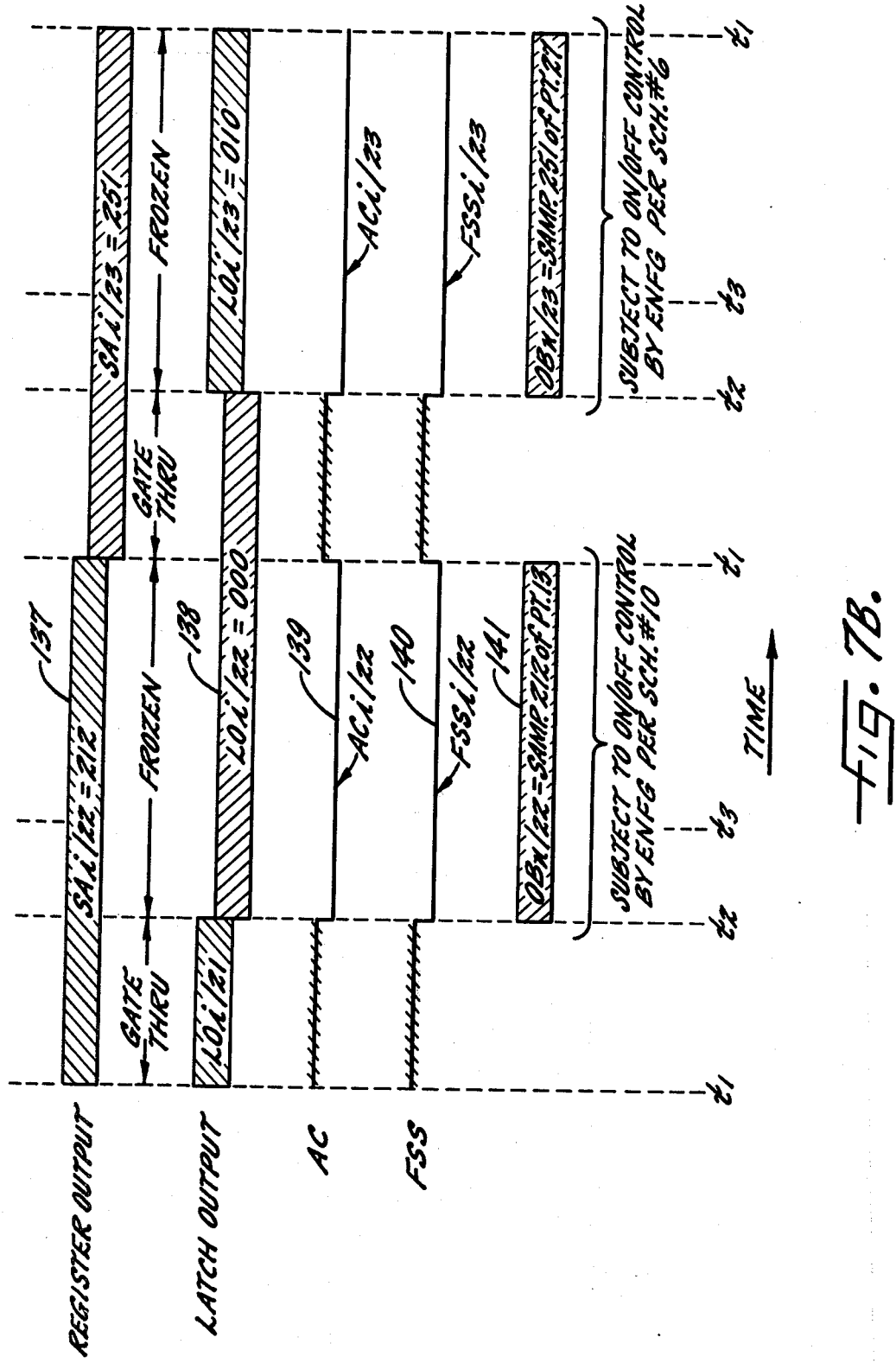

FIGS. 7A and 7B graphically indicate how signals change during even and odd count state time sots, it being assumed for example that they are time slots $TS_{22}$ and $TS_{23}$ out of the series $TS_0$–$TS_{47}$ within a given cycle $C_i$. The timing signals CLK, CLK* and CRCK are shown on a time scale expanded in relation to that of FIG. 6A, each of the slots $TS_{22}$ and $TS_{23}$ being 2T in duration. FIG. 7A makes it more evident that a propagation delay P.D. may exist between the instant when CLK* swings high and the instant $t_2$ when CRCK swings high.

Wave form 120 in FIG. 7A represents the gate control signal GC created in the timing circuits 36. As seen from FIG. 4, this latter signal is formed at the Q output of a D-type flip-flop 121 which is preset to the 1 state so long as the signal TONS is high, but which is clocked to the reset state by the rising edge of the signal CLK appearing when TONS is low. Thus, as shown in both FIGS. 6A and 7A, the signal GC is normally low; when signal TONS goes high at instant $t_2$, GC swings high after the first portion of the 2T interval has elapsed in an even number time slot $TS_{22}$, and it falls for a brief time but rises again at instant $t_2$ in an odd numbered time slot $TS_{23}$. In essence, the gate control signal GC is high over the span of both even and odd time slots, its being low in the eary portion of a time slot having no adverse consequences. Yet the signal GC is low during all or at least the latter portions of voice channels, as shown in FIG. 6A.

The gate control signal GC passes through an AND gate 122 (FIG. 2A), assuming the signal SCHED is high, to become the final gate enabling signal ENFG applied to the control terminal EN of gate 112 (FIG. 2B). Thus, during each tone time slot when one sample is being read from the TP ROM, the output of TP ROM is passed from bus B to final output bus OS—assuming there is no overriding effect of on-off scheduling as hereinafter described, and recalling that the signal bit of a sample may or may not be inverted by the EXCLUSIVE OR gate 110 as noted above. During some interval during the last half of each tone time slot, the first order multiplexer 22 (FIG. 1) picks the sample signals off of the bus OB, as is well known in the art.

Wave form 124 in FIG. 7A shows again the signals CRW and NSW whic are illustrated in FIGS. 6A, B and produced by the flip-flop 80 in FIG. 4. Noteworthy is the fact that these signals exist for a short time beginning at an instant $t_3$ within each time slot, so that if data is newly written into RAMS 50 and 58, such writing occurs roughly midway through each time slot.

The output of the counter 35 is represented as shaded areas which change at the beginning instant $t_1$ of each off tone time slot, and which exist to numerically represent the time slot at the beginning instant of each even numbered time slot. In FIG. 7A, the two shaded areas of the bar 126 show the count state or control signals CT (appearing on conductors CT 0-5 in FIG. 2) as equal to 22 and 23 during time slots $TS_{22}$ and $TS_{23}$, respectively.

The shaded bars at 128–133 in FIG. 7A represent various signals which change from tone slot to tone slot but which remain fixed during one given slot because they are under control of the count state signals CT. Specifically the commanded tone signals TC at the output of a Tone Select RAM 135 (FIG. 2A) are read (as hereinafter described for switched tones) from an address signaled by the control signals CT from the counter 35 and passed through the first multiplexer MUX 1. Thus, as the count states change, and different time slots occur, the signals TC change. As a concrete example to use in considering FIGS. 7A and 7B, it is assumed that there has been stored at address locations 22 and 223 command signals numerically representing tones $TN_{36}$ and $TN_{18}$, respectively, as the preselected tones for time slots $TS_{22}$ and $TS_{23}$. Thus, the bar 128 indicates in FIG. 7A that the output signals TC read from RAM 135 during time slot $TS_{22}$ are equal to 36; and in time slot $TS_{23}$ are equal to 18.

For switched tones (in time slots about $TS_{15}$ as explained below) a second multiplexer MUX 2 (FIG. 2A) is enabled to transmit its A input signals to its output, where they become the signals at TT 0-5 and identify the preselected one of the tones $TN_0$ –$TN_{47}$. Thus, in keeping with the example given above, the shaded bar 129 in FIG. 6A indicates that the output of MUX 2 constituting tone identification signals TI, is also numerically equal to 36 and 18, respectively, during slots $TS_{22}$ and $TS_{23}$. The tone ID signals TI identify the particular tone which is preselected for a particular time slot.

The shaded bar 130 confirms that as the signals TI (at TT 0-5) change from slot-to-slot, the output signals from the Pattern Select ROM 44 also (but need not necessarily) change. Let it be assumed for purposes of discussion that tone $TN_{36}$ is to be formed by sound pattern $PT_{13}$ (out of the plurality of $PT_0$–$PT_{31}$) and schedule $SCH_{10}$ (out of the plurality of $SCH_0$–$SCH_{15}$). Further, assume that tone $TN_{18}$ is formed of sound pattern $PT_{27}$ and schedule $SCH_6$. FIG. 7A in illustrating this example thus confirms that the numerical values of "13" and "27" would have been initially stored at addresses 36 and 18 of the pattern select ROM; and the numerical values of "10" and "6" would have been stored at addresses 36 and 18 of the schedule select ROM 45. Thus, during time slots $TS_{22}$ and $TS_{23}$, the output PI (on lines PA 0-4) from the pattern select ROM 44 will represent "13" and "27" to identify patterns $PT_{13}$ and $PT_{27}$ as the respective preselected sound patterns for those slots.

The shaded bar 131 in FIG. 7A correspondingly indicates that the output signals SS from Schedule Select ROM 45 will numerically represent "10" and "6" during time slots $TS_{22}$ and $TS_{23}$, identifying $SCH_{10}$ and $SCH_6$ as the respective preselected schedules.

Since the pattern identification signals PI applied to the address lines of the first sample ROM 60 change from slot-to-slot to represent the preselected sound pattern for each slot, the shaded bar 132 indicates that the output of that ROM has different values during time slots $TS_{22}$ and $TS_{23}$. It is assumed, to pursue the foregoing example, that patterns $PT_{13}$ and $PT_{27}$ have their first samples located at block addresses of 156 and 231 respectively, these numbers having been initially stored at addresses 13 and 27 of the first sample ROM. Thus, FIG. 7A indicates that during time slots $TS_{22}$ and $TS_{23}$ the output of the ROM 60 at FS 0-7 respectively represents the numerical values of "156" and "231".

The sequence ROM 56 is read by the signals PI applied to its address lines PA 0-4 during each time slot, such signals representing the preselected pattern. Since the latter signals change from slot-to-slot, the output SEQ L, SEQ R, SEQ S from the ROM 56 represents the scan sequence characteristic of the preselected pattern and changes from slot-to-slot as illustrated by the shaded bar 133. It is here further assumed that pattern $PT_{13}$ has the characteristic of FIG. 8A and sequence No. 1 in Table X, whereas pattern $PT_{27}$ has the characteristic of FIG. 8C and sequence No. 2 in Table X. Thus, the output of the sequence ROM is shown in FIG. 7A as being 000 during time slot $TS_{22}$ and as being 010 during slot $TS_{23}$.

The shaded bar 134 in FIG. 7A illustrates the output of the decoder 46 (FIG. 2B). Since the decoder is enabled by signal CRCK, it is turned off between instants $t_1$ and $t_2$ of each time slot, but otherwise enabled. Thus, no reading of the TP ROM occurs until some portion of a time slot has elapsed. Carrying forward the example assumed above, with the preselected patterns for $TS_{22}$ and $TS_{23}$ being $PT_{13}$ and $PT_{27}$, it will be seen from Table I that the decoder outputs become "3" and "6", respectively, and thus chips $CHP_3$ and $CHP_6$ (FIG. 2B) will be respectively enabled during slots $TS_{22}$ and $TS_{23}$—so that one sample of $PT_{13}$ and one of $PT_{27}$ may be read out.

The shaded bars 135 and 136 in FIG. 7A represent the outputs of the Next Sample and Control RAM's 50 and 58, respectively. As the signals CT on lines CT 0-5 change from slot-to-slot, they cause reading of successively higher address locations in these RAM's, so that between instants $t_1$ and $t_3$ of each time slot, data previously written at those locations is read. Thus, the "next sample" output at NS 0-7 during slot $TS_{22}$ is here shown, as an example, as being "212" read from address location "22" (and having been written there during the slot $TS_{22}$ of the previous cycle $C_{i-}$). Likewise, outputs RDL, RDR, RDS of Control RAM 58 is here shown as havng the value 000 read from address location "22" of RAM 58 (and having been written during the previous cycle). But at instant $t_2$ (and before any change in the next sample and control RAM outputs) the signal CRCK* swings from high to low and thus holds or freezes the existing signals at NS 0-7 in the register 51 (FIG. 2B) so that the signals at SA 0-7 cannot change for the remainder of the time slot. This is illustrated by the shaded bar 137 which confirms that the signals SA at SA 0-7 are the same (representing "212") as those at NS 0-7 between instants $t_1$ and $t_3$ but they do not change at instant $t_3$ when new data is written into the next sample RAM 50 by the appearance of an NSW pulse.

Between instants $t_1$ and $t_2$, the logic circuits 55 of FIG. 5 generate outputs AC, FSS, LOS, WDL, WDR, WDS based upon the signals LOL, LOR, LOS (latched into the register 92 during the previous time slot $TS_{21}$). Such signals are meaningless during that interval, but without adverse consequences. At instant $t_2$ when the rising edge of signal CRCK appears, the outputs RDL, RDR, RDS of RAM 58 is clocked into and frozen in the register 92, forming new signals LOL, LOR, LOS here labeled 000 in the shaded bar 138 of FIG. 7B. Thus, from instant $t_2$ of any time slot until it ends, the outputs AC, FSS, LOS, WDL, WDR, WDS of the logic circuits 55 are formed and usable, as indicated by lines 139 and 140 in FIG. 7B. The hatched portions of these lines designate that signals AC and FSS have meaningless values between instants $t_1$ and $t_2$.

Bearing in mind that readout of a sample (whose address is represented at A0-A9) from the TP ROM to the final bus OB can only occur when the final gate 112 (FIG. 2B) is enabled and one of the chips $CPH_0$–$CPH_7$ is enabled, and noting the timing for the signal GC (wave form 120) and the decoder output (represented at 134), the sample signals during each of the time slots $TS_{22}$ and $TS_{23}$ will exist on the bus OB from the instant $t_2$ until the time slot ends—as represented in FIG. 7B by the shaded bars at 141. But this will occur only during the "on" intervals of on/off schedules, as determined by the signal SCHED (FIG. 2A) in the manner explained fully below.

FIGS. 7A and 7B make it clear that after the signals at SA 0-7 are frozen in the register 51 (see bar 138) at instant $t_2$, and the signals RDL, RDR, RDS are clocked into and frozen as LOL, LOR, LOS in the register 92 (FIG. 5), then new and proper values for the signals AC, FSS, LOS, WDR, WDL, WDS are formed by the logic gates of FIG. 5 and are fixed for the remainder of the time slot. These signals determine whether the adder 59 produces its output by adding or subtracting one to or from the numerical value of the "this cycle" address signaled at SA 0-7, and whether the data input lines for RAM 50 receive via MUX 3 the adder output signals (if FSS=0) or the "first sample address" signals at FS 0-7 (if FSS=1). If the signal LOS is 0 or 1, the EXCL. OR gate 110 causes the sign bit of the sample word read from TP ROM to be true or inverted, relative to its value as originally stored, when it reaches the final bus OB. The signals WDL, WDR, WDS are formed and ready for writing into RAM 58 so that they have the proper values to be used as the signals RDL, RDR, RDS during the same time slot of the ensuing cycle $C_{i+1}$.

Then at instant $t_3$, the write-enable signals CRW and NSW go high for a short interval, so that the "next sample address" then signaled at the output of MUX 3 is written into the time slot address (signaled at CT 0–5) of the RAM 50, replacing the previous contents. Similarly, the signals WDL, WDR, WDS are written into the control RAM 58 at the address signaled on CT 0–5, replacing the previous contents. After the "write enable" pulses CRW and NSW end, therefore, the newly written contents at those address locations are read out and form new values at NS 0–7 and RDL, RDR, RDS during the remainder of the time slot. This is illustrated at 135 and 136 in FIG. 7A where such signals are shown as numerically representing "213" and a three-bit word 000, respectively, during the terminal portion of slot $TS_{22}$. Such signals are not used during cycle $C_i$; on the contrary, they have been stored by writing so they can be read again and used during slot $TS_{22}$ of the next cycle $C_{i+1}$. This is the significance of the legends $NS_{i+1/22}=213$ and $RD_{i+1/22}=000$ in FIG. 7A, it being apparent that the next sample address will be formed by the addition $212+1=213$ in the adder 59, and the RD signals will be 000, for a pattern having the characteristics shown in the first line of Table X and the scanning sequence shown in the first column of Table XI.

In the case of time slot $TS_{23}$, however, it has been assumed that the preselected pattern $PT_{27}$ (for tone $TN_{18}$) has the characteristics of the second line in Table X, and that the scan in progress is an "upward" scan as represented by fourth through the seventh blocks shown in the second column of Table XI. Thus, in FIG. 7A, after instant $t_3$ of slot $TS_{23}$ the output of RAM 50 at NS 0–7 is indicated as $NS_{i+1/23}=250$ because the adder 59 has subtracted $(251-1=250)$; and the signals $RD_{i+1/23}=010$ are indicated because WDR and RDR will take on a value of "1" during successive time slots of an "upward" scan.

It wll be understood, therefore, that when cycle $C_{i+1}$ is executed and the RAM's 50 and 58 are read by control signals $CT=22$ and $CT=23$ during slots $TS_{22}$ and $TS_{23}$, the outputs from RAM 50 will be "213" and "250", respectively, whereas the outputs from RAM 58 will be 000 and 010, respectively.

Of course, and for the reasons explained above, when the last sample is reached at the end of a downward scan, or the first sample is reached at the end of an upward scan, then the signals WDL, WDR, WDL change from the values they had during the previous cycle, and the next scan is properly initiated.

In the case of a sample having the L characteristic, the signal WDL becomes high during the cycle when the last sample is read out at the end of a downward scan. As shown in FIG. 4, the AND gate 84 is disabled by the WDL* signal in these circumstances, so the signal NSW is prevented from rising to a "1" level. This prevents writing of new data into the next sample RAM 50 during that cycle, so that during the same time slot of the ensuing cycle the last sample will be "repeated" or read-out again. But when that occurs, signal WDL takes on a "0" value, and so during the folllowing cycle a new scan (either up from the last sample or down starting the first sample) begins.

In review, the method carried out by the apparatus here shown and described includes initialy storing in the TP ROM at least one plurality of samples $S_o–S_n$ constituting a pattern for a cyclic wave; providing preformed address signals (at NS 0–7 and SA 0–7) in a next sample memory 50, during a given cycle $C_i$ and a given time slot thereof reading the preformed address signals from that memory to cause readout of a certain sample $S_i$ from the TP ROM onto an output bus OB; using the preformed address signals to derive a next set of address signals corresponding to a sample $S_{i\pm1}$; storing the derived signals into the next sample memory in place of the original preformed signals, to constitute new preformed signals; and repeating that sequence so that in the succeeding cycle $C_{i+1}$, the new address signals cause the next sample $S_{i\pm1}$ to be fed onto the bus. That procedure is preformed for each of a plurality of time slots with one of the several patterns $PT_0–PT_{31}$ preselected for each slot, so that scanning of all samples within a plurality of patterns occurs as the cycles repeatedly recur. But further, the desired scan sequences for any pattern are obtained by initially storing its scan sequence characteristic as a multi-bit word in the sequence ROM 56, and using the read-out word in the derivation of the "next address" signals.

6. Combining Sound Patterns With Schedules To Form Various Tones

As noted above, the present invention permits any of a plurality of sounds $SD_0–SD_{31}$ represented as sample patterns $PT_0–PT_{31}$ to be transmitted in a desired one of time slots $TS_0–TS_{47}$ with any one of a plurality of on/off schedules $SCH_0–SCH_{15}$ to form any of a plurality of tones $TN_0–TN_{47}$. Of course, one skilled in the art may routinely choose to follow the teachings of the present invention by adopting a greater or lesser number instead of thirty-two sound patterns, sixteen schedules, forty-eight tones and forty-eight time slots, and it has already been explained that the same sound may be preselected to appear in a plurality of the time slots. Indeed, it is possible to designate several of the forty-eight tones as being formed by the same sound and schedule.

In the preferred embodiment here illustrated the forty-eight tones (whether or not some are identical) $TN_0–TN_{47}$ are established by "pairing" of one sound pattern with one schedule at the time the pattern select ROM 44 and the schedule select ROM 45 are "burned" or loaded with stored data. Each such ROM has forty-eight address locations accessible by tone ID signals $TI_0–TI_{47}$ numerically signaled as one of the values 0–47 on lines TT 0–5. For example, one may choose tone $TN_0$ to be formed by pattern $PT_3$ and schedule $SCH_9$; tone $TN_1$ to be formed by $PT_8$ and $SCH_{15}$; tone $TN_2$ to be formed by $PT_{23}$ and $SCH_4$; and so on. It is only necessary that the identification (ID) numbers for the desired pattern and the desired schedule for a given tone be paired by storing them at identical address locations in the ROM's 44 and 45, respectively, so that they will be read when the tone ID signals identify the given tone. To carry forward the arbitrary examples given above, that data initially stored in ROM's 44 and 45 would be arranged as follows:

| TONE | TONE ID SIGNALS | ADDRESS LOCAT. IN ROM'S 44 & 45 | DATA STORED ROM 44 | DATA STORED ROM 45 |
|---|---|---|---|---|
| $TN_0$ | 0 | 0 | 3 | 9 |
| $TN_1$ | 1 | 1 | 8 | 15 |
| $TN_2$ | 2 | 2 | 23 | 4 |

| TONE | TONE ID SIGNALS | ADDRESS LOCAT. IN ROM'S 44 & 45 | DATA STORED ROM 44 | ROM 45 |
|------|-----------------|--------------------------------|--------------------|--------|
| -continued | | | | |
| $TN_x$ | X | X | $PT_y$ | $SCH_z$ |

The sixteen possible on/off schedules may be arbitrarily chosen but will usually include those adopted as standard in the telephone industry. The "continuous on" schedule will be used in many tones; and the "continuous off" schedule will be provided as an easy way of creating no sound, i.e., a quiet tone. But the other schedules might be, for example, on/off intervals (in seconds) of 0.5/0.5, 1/0.5, 1/1, 0.95/0.05, 2/4, and so on. In the practice of the present invention the choice is limitless.

To set up the chosen schedules, another memory chip, preferably an ROM 200 (FIG. 2A), is initially constructed or loaded with data viewable as a predetermined number of words (here 120) each containing a pre-chosen number of bits (here 16) such that as the words are read out cyclically in address sequence there are produced the pre-chosen number of parallel bit streams, each stream corresponding to one of the schedules $SCH_0$–$SCH_{15}$. The readout period for each address location is chosen as some convenient fraction of a second, e.g., the successive address locations are cyclically scanned at a rate of 1/20 of a second (50 m.s.). By stored sequences of predetermined groups of successive 1's and 0's in the same bit place of successive stored words, the recurring high/low or on/off intervals in each bit stream may be given the desired time durations.

To make this clear by way of example, it may first be observed in FIG. 2A that the signal RST (having a frequency of 8 KHz. and a period of 125$\mu$ sec.) is fed through a "divide by 400" frequency divider 201 to create a squarewave (having a frequency of 20 Hz. and a period of 50 m.s.) applied continuously to the input of a rollover counter 202 having eight binary stages interconnected with gating (as is known in the art) to have a count capacity of 120 (count states 0-119). The counter 202 thus occupies each count state for 50 m.s. and counts through one cycle in six seconds. Its eight binary stage outputs are connected to the address lines of the 120×16 ROM 200—so that each of the words there is read for an interval of 50 m.s. and all words are cyclically read out every six seconds.

Table XII shows, partially and as an arbitrary example, the stored contents of the on/off ROM 200 to indicate how different schedules may be established. Bit $b_0$ in all of the words at locations 0-119 is stored as all 0's—so that bit $b_0$ corresponds to the schedule $SCH_0$ to establish a "quiet tone" (continuously off). Bit $b_2$ is stored as a string of 1's from addresses 0 to 19, a string of 0's from addresses 20 to 39, 1's from addresses 40 to 59, 0's from addresses 60 to 79—and so on. Since there are alternate groups of twenty 1's and twenty 0's, the bit $b_2$ output line of the ROM 200 (corresponding to schedule $SCH_2$) will be high and low for alternate on/off periods of one second during the six seconds of the repeating count cycles of the counter 202. Thus, schedule $SCH_2$ is here shown chosen as an on/off duty cycle of 1/1 seconds.

In like fashion, Table XII reveals the following examples:

| SCHEDULE | CORRES. BIT | BIT PATTERN | ON/OFF INTERVALS |
|----------|-------------|-------------|------------------|
| $SCH_0$ | $b_0$ | All 0's | Continuous off |
| $SCH_1$ | $b_1$ | All 1's | Continuous on |
| $SCH_2$ | $b_2$ | Twenty 1's Twenty 0's | 1/1 Sec. |
| $SCH_3$ | $b_3$ | Forty 1's Eighty 0's | 2/4 Sec. |
| $SCH_4$ | $b_4$ | Forty 0's Forty 1's | 2/2 Sec. |
| $SCH_5$ | $b_5$ | Twenty 1's One Hundred 0's | 1/5 Sec. |
| $SCH_{15}$ | $b_{15}$ | Ten 1's Ten 0's | .5/.5 Sec. |

Thus, it will be seen that any recurring on/off schedule may be given to the signal appearing on an output line of the ROM 200, the on/off intervals being p/q where p=n$\Delta$T and Q=m$\Delta$T; $\Delta$T being the period (here 50 m.s.) during which each address is read and n and m being the numbers of 1's and 0's stored in successive alternate groups. If K is the number of words or address locations in the ROM 200, the counter 202 is constructed to "rollover" through K count states, and a full count cycle takes K·$\Delta$T seconds. During each cycle there will be a "on" intervals and b off intervals, where $a(n\Delta T)+b(m\Delta T)=K\Delta T$. The values of a, b, n, m chosen for any schedule are entirely flexible and picked to create the desired schedule. If a schedule $SCH_z$ is desired with an on/off duty cycle of 1.5/0.5 in the present embodiment, then bit $b_z$ of ROM 200 would be stored as a repetitive pattern of thirty 1's followed by ten 0's—and in such case K=6; $\Delta$T=50 m.s.; a=b3; n=30 and m=10.

Since the counter 202 causes continuous cyclical reading of the addresses in the ROM 200, there are always present at the sixteen output lines of that ROM sixteen signals which have the various chosen on/off ratios for schedules $SCH_0$–$SCH_{15}$. The four output lines from the schedule select ROM carry schedule identification signals SS numerically representing, during each time slot, the preselected schedule $SCH_u$ of the preselected tone $TN_x$ then signaled by tone identification signals TI at TT 0-5. Those signals SS are applied to a known type of 16-to-1 selector 204 having its inputs connected to the sixteen output lines of the on/off ROM 200. Thus, when the signals SS have a value of "9", the signal on the output line for bit $b_9$ will be passed through the selector 204 to a single conductor 204a, making the signal SCHED have alternate high/low or on/off timing corresponding to schedule $SCH_9$. The signal SCHED, therefore, during every time slot of every cycle is high or low depending upon the on/off intervals measured off in actual time according to the schedule $SCH_u$ identified by the signals at SS and forming a part of the tone preselected for that particular time slot.

The signal SCHED controls the AND gate 122 which forms the signal ENFG controlling the final gate 112. Thus, the final gate 122 is enabled during each time slot when the gate control signal GC is high, but this occurs only during the "on" periods when signal SCHED is high. Therefore, sound samples actually reach the output bus OB during the "on" intervals of the preselected schedule—and when the sound samples ultimately are converted into sound (after being routed through the switching network and decoded into analog form), a listener will hear the corresponding sound but with the chosen on/off schedule timing.

7. Switching Or Preselecting Tones In Response To Commands

In the concrete embodiment here shown, there are sixteen "fixed tones" which are always transmitted in respective pre-assigned time slots, and the remaining thirty-two time slots may each have any one of the forty-eight available tones "switched into" or preselected for transmission in it. Of course, the invention may be practiced in some of its broader aspects by having all time slots carry fixed tones, or all time slots carry switched or switchable tones. In the present instance, however, time slots $TS_0$-$TS_{15}$ carry fixed tones and time slots $TS_{16}$-$TS_{47}$ carry respective tones which are preselected by command signals received asynchronously via the command bus CB from the central control unit 12 (FIG. 1).

As shown in FIG. 2A, the counter 35 supplies its output signals as successive control signals $CT_0$-$CT_{47}$ to the B input of multiplexer 42 (MUX 1), those signals being transmitted as control signals CT on lines CT 0-5 at all times except when the reset signal RST is high at the beginning of a cycle. The control signals CT exist as respective values $CT_0$-$CT_{47}$ during, and uniquely identify, each of the tone time slots $TS_0$-$TS_{47}$. When the numerical output of the counter 35 is below sixteen (during count states 0-15 and time slots $TS_0$-$TS_{15}$), the output of an OR circuit 220 is low, and such low signal at the EnB control terminal of a second multiplexer MUX 2 causes the tone ID signals TI at TT 0-5 to be the same as the signals CT. Therefore, during time slots $TS_0$-$TS_{15}$ of every cycle, the preselected tone identification signals TI on lines TT 0-5 take on values of 0-15 respectively and call from the transmission of tones $TN_0$-$TN_{15}$ during those corresponding time slots. Thus, the first sixteen address locations of the pattern select ROM 44 and the schedule select ROM 45 contain pattern ID and schedule ID numbers paired for the desired sixteen fixed tones $TN_0$-$TN_{15}$. In the switching network 10 of FIG. 1 a "connection" may be made to one of the channels corresponding to a given one of the tone time slots $TS_0$-$TS_{15}$, and the corresponding fixed tone will be sent via that connection because the fixed tone is pre-assigned to that channel is always present.

To enable "switching" of tones into the remaining time slots, the desired tone for a given time slot is identified by data written (from time-to-time) into the tone select RAM 135 from a command buffer register 221 which is loaded with tone command signals TC received on conductors TC 0-5. The writing of a tone command signal is to an address which is taken from an address command buffer register 222 through MUX 1 during the time of an RST pulse—the register 222 having been loaded by slot command signals SC received on conductors SC 0-4. Loading or "writing" into buffer registers 221 and 222 occurs when a write command signal WC (applied to their terminals W) goes high; otherwise the contained data is always signaled at the outputs of such registers. The conductors TC 0-5, SC 0-4 and WC constitute the command bus CB shown in FIG. 1 as extending from the control unit 12 to the tone source 30.

It may be desirable in some cases for the time slots $TS_{16}$-$TS_{47}$ (which carry switched tones) to be designated numerically in the central control unit 12, and by the signals SC, as channels 0-31 which are available to carry switched tones. For this reason, an adder 225—which always adds sixteen to the number signaled at its input and signals the sum at its output—is interposed between the lines SC 0-4 and the input of buffer register 222. Thus, if the slot command signals take on any of values $SC_0$-$SC_{31}$, then the corresponding output signals DTS from the buffer register 222 will have "desired time slot" values of $DTS_{16}$-$DTS_{47}$, respectively.

One set of commands to change the switched tone being transmitted in one time slot may be accepted and put into effect during one time cycle or frame. It will thus require six cycles if the control unit calls for changing of six switched tones. But the control unit may issue its command (calling for a given tone to be switched into a given slot) at any time during a cycle, and the command will be put into effect during the reset interval at the start of the next cycle. Because a cycle is 125$\mu$ sec., commands are executed almost instantaneously insofar as human reactions are concerned.

When changing of a switched tone is desired, the control unit produces a "tone command" signal on lines TC 0-5 and a "slot command signal" on lines SC 0-4. It simultaneously produces a high level write pulse WC to stobe the signals on those lines respectively into buffers 221 and 222. Assume, as an example, that the control unit 12 sends signals $TC_{26}$ and $SC_{17}$ simultaneously with a WC pulse—calling for tone $TN_{26}$ to be preselected for time slot $TS_{33}$. The write pulse WC causes the numbers "26" and "33" to be written into the registers 221 and 222, recalling that the adder 225 adds "16" to "17" to produce "33". The register outputs for the desired tone and the desired time slot (on lines DT 0-5 and DTS 0-5) thus become $DT_{26}$ and $DTS_{33}$.

The fact that new command data has been written (at any time during a cycle) is recorded in the timing circuits 36. As shown in FIG. 4, the rising edge of the WC pulse "clocks" a D-type flip-flop 230 to the "1" state (cooperating flip-flops 230 and 231 normally being in the cleared or "0" state). The Q terminal of flip-flop 230 thus makes the D terminal of the associated flip-flop 231 swing high, although the second flip-flop is held in its cleared or "0" state by the signal RST* which is high except when the signal RST is momentarily high at the beginning of a cycle (see FIGS. 6A and 6B). When the next cycle begins and RST* swings momentarily low, the coincident rising edge of signal CLK* "clocks" the flip-flop 231 to a "1" state and makes the signal INIT swing high. As shown in FIG. 6A, the signal RST* reverts to a "1" level $\frac{1}{4}$T later, thus clearing the flip-flop 231 so that the INIT pulse is only $\frac{1}{4}$T wide. The INIT pulse clears or resets flip-flop 230 back to its original "0" state,—and it is also fed to the OR circuit 82 and to an AND gate 232. The INIT signal, when it appears, signifies that operations should occur to initialize the apparatus for transmission thereafter of the commanded tone in the commanded time slot.

The operations next to be described all take place during the $\frac{1}{4}$T interval when the signal INIT is high:

1. Because a positive-going edge of CLK* initiates the INIT pulse, the AND gate 232 of FIG. 4 produces a tone select write pulse TSW which is essentially $\frac{1}{4}$T wide and coincident with the last half of the high pulse in the signal RST. See FIG. 6A.

2. The signal TSW is applied to the write enable terminal W of the tone select RAM 135, so that the latter writes the desired tone ID signals DT previously stored in the buffer 221.

3. The address to which such writing occurs in the RAM 135 is determined by the then-existing output of MUX 1 on lines CT 0-5. But since the signal RST is high when the signals INIT and TSW occur, MUX 1 is conditioned to send the output of register 222 to the address lines of RAM 135. The signals DTS previously stored in register 222 thus determine where the desired tone signals are written in the RAM 135. If the command information calls for tone $TN_{26}$ in time slot $TS_{33}$, then "26" will be written into address location "33", and $TN_{26}$ will thereafter be the tone which has been preselected to appear in time slot $TS_{33}$. As soon as the "writing" takes place, the output signals TC immediately represent the newly written value, e.g., "26".

4. Because the RST pule forms one input to the OR circuit 220, the EnA terminal of MUX 2 is high at this time, so the signals TC (in the example, representing "26") are fed to lines TT 0-5, thereby designating $TN_{26}$ as the selected tone, and causing ROM's 44 and 45 to produce readout signals identifying the particular sound pattern and schedule which have been paired for tone $TN_{26}$. To pursue the example, assume that tone $TN_{26}$ is made up of sound pattern $PT_5$ and schedule $SCH_{14}$.

5. Since pattern $PT_5$ is identified by the numerical signals at lines PA 0-4, the first sample ROM is addressed with the pattern number "5" (in the present example) and it produces at FS 0-7 signals identifying the first sample address of pattern $PT_5$.

6. The RST pulse is also applied to the latch register 92 (FIG. 5), clearing the latter and making LOL, LOR, LOS all "0's".

7. The RST pulse is also applied to the OR circuit 64 associated with MUX 3 (FIG. 2B), so the signals at FS 0-7 are applied to the data input of the next sample RAM 50.

8. The signal INIT applied to the OR circuit 82 (FIG. 4) while signal CLK* is high, triggers the one-shot 84 so that high pulses occurin the CRW and NSW signals. These cause "writing" of data into the next sample RAM 50 and the control RAM 58 at addresses then signaled on lines CT 0-5, i.e., corresponding to the commanded time slot. The data written into RAM 50 represent the first sample address of the pattern (here assumed to be $PT_5$) for the commanded tone (assumed to be $TN_{26}$); the data written into the control RAM 58 is 000 (because the signals LOL, LOR, LOS are all 0) even though ROM 56 is then producing characteristic signals SEQ L, SEQ R, SEQ S for the selected pattern ($PT_5$). This is of no consequence, however, because during the ensuing cycle, a downward scan of the selected pattern will begin, starting with the first sample, so the correct all 0's values for WDL, WDR, WDS are written into RAM 58.

Thus, during "initialization" which takes place during the RST pulse interval if an INIT pulse appears, the apparatus is conditioned so that on the next cycle the first sample of the pattern for the commanded tone will be fed, during the commanded time slot, to the final output bus OB. On subsequent cycles, and during the same time slot, the samples of that pattern will be scanned. Since no TONS or CRCK signal "1" levels are produced during this reset interval, no sample signals are fed to the output bus OB during the reset interval. When "new" command data is written into the tone select RAM 135, it destroys the data previously stored at the commanded address location, so the tone previously being transmitted in the command time slot is replaced with the newly commanded tone.

New command signals and a WC pulse may arrive any time during a cycle except during the reset interval. But, of course, if no new command data and a WC pulse are received during a cycle, the INIT pulse does not appear during the next reset interval, and none of the action here described transpires, because the TSW, NSW and CRW signals are not created in coincidence with the RST pulse.

8. Intercept Tones

An intercept sound signal (ISS) is one which to the ear gives the impression of two sounds alternating in time (but even that type of tone may have an overriding on/off schedule). The impression is quite similar to the sound of police sirens commonly used in France and other European countries.

The present invention permits various ones of the available tones $TN_0$–$TN_{47}$ to have ISS characteristics, wherein the two sounds are those formed by two of the initially stored sound patterns. This is accomplished by an extra bit of storage capacity in each word of the select ROM 44, here designated in FIG. 2A as bit $b_5$. When the ROM is initially "burned" or loaded with data, any tone to be given ISS characteristics has the word at the corresponding address formed with a "1" in bit $b_5$; a "0" at bit $b_5$ designates a tone without intercept characteristics.

As an example assume that tone $TN_{43}$ is to be of an intercept type, and that the word stored at address "43" in ROM 44 is loaded as 101101 (least significant bit on the right) for bits $b_0$–$b_5$. The first five bits numerically represent "13", and when read out onto lines PA 0-4 will normally cause reading of samples from sound pattern $PT_{13}$ in the fashion explained above. But the presence of the "1" in bit $b_5$ will cause the transmission of sounds $SD_{13}$ and $SD_{12}$ during predetermined alternate time intervals, the latter typically being 0.5 seconds—in the manner now to be explained.

If tone $TN_{43}$ is preselected to be transmitted in slot $TS_{38}$, then when the control signals at CT 0-5 represent "38", the tone ID signals TI at TT 0-5 will represent "43", and the pattern ID signals at PA 0-5 will be, in binary form, 101101. Assuming that a signal ALT is at a 0 level, the output of an AND gate 240 in an intercept inverter 241 will be disabled (even though the signal at PA 5 is a "1"), so that the signal on line PA0 will pass unchanged through EX-OR circuit 48 to form the address bit on conductor A8. So long as this condition prevails, during each occurrence of slot $TS_{38}$, samples will be outputted by scanning the pattern $PT_{13}$ stored in TP ROM chip $CHP_3$, and specifically in the second block of word locations on that chip.

But in keeping with the present invention, the signal ALT is made to alternate between high and low levels with half periods substantially greater than the sample scanning rate. For this purpose in the present embodiment, the lowest order stage of the counter 202 (on which appears a squarewave having a frequency of 10 Hz. and a period of 100 m.s.), is connected to supply the input to a "count to 10" counter 244 (viewable also as a frequency divider which divides by 10). The latter at its highest order stage produces the signal ALT as a squarewave of 1 Hz. which is alternately 0.5 seconds high and a 0.5 low. Different duty cycles may, of course, be chosen.

During the "high" intervals of the ALT signal, the gate 240 is enabled and transmits the "1" level signal on conductor PA 5 to the EX-OR circuit 48. Therefore, the signal PA0 is applied to the address line A8 for alternately 0.5 seconds "true" and 0.5 seconds "inverted". This means that during the "true" intervals, successive samples of pattern $PT_{13}$ are outputted to the bus OB; but during the "inverted" intervals successive samples of pattern $PT_{12}$ are outputted, because changing of the signals A8 switches the addressing of the TP ROM chips from one block to the adjacent block but without changing the scanning of samples read from within a block.

In the example here chosen and stated above, therefore, if tone $TN_{43}$ is initially chosen to be heard as an ISS, and a "1" is stored in bit $b_5$ of word 43 of the pattern select ROM 44, then when that tone is preselected for transmission in a given time slot (say, $TS_{38}$), the samples from pattern $PT_{13}$ will be put out on the bus OB for alternate periods of 0.5 seconds and the samples from pattern $PT_{12}$ will be put out on the bus for intervening alternate periods of 0.5 seconds. As ultimately heard by a listener, the tone $TS_{43}$ will be two alternating sounds, similar to the effect produced by a French police siren. Any tone which is initially given the ISS characteristic (by storing a "1" in bit $b_5$ of the corresponding word of ROM 44), may also have an overriding longer on/off schedule applied to it by storing appropriate paired data in the schedule select ROM 45, but usually the "continuous on" schedule will be chosen for any ISS tone.

In the present embodiment (but not necessarily in all enbodiments) of the invention, the ISS tones must be such that the two patterns for each are stored in adjacent address blocks of the TP memory—so that alternating of the A8 address signal switches the readout from one block to an adjacent block. Moreover, during transmission of an ISS type tone, the first sample ROM 60, sequence ROM 56, logic circuits 55, next sample RAM 50 and so on, all function as if only the pattern numerically represented by the signals at PA 0-4 were being scanned. Therefore, the two sound patterns employed for an ISS type tone must have the same number of samples and the same scan sequence characteristics. This is not a serious limitation upon the choices of the two sounds used to make up an intercept tone.

9. Summary and Review of Operation

A brief overview of the tone source 30 may now be set out.

Ignoring for the moment the on/off scheduling, each tone $TN_0$-$TN_{47}$ may be considered as made up by one of a plurality of "sounds" $SD_o$-$SD_n$ corresponding to a repeating analog wave, at least a portion of the wave being digitally represented by a set or pattern of samples $S_o$-$S_n$ stored at addressable locations in a readable main memory, here the TP ROM. The main memory holds a plurality of patterns $PT_o$-$PT_n$. A tone $TN_x$ is preselected for a given time slot $TS_y$ (of slots $TS_0$-$TS_{47}$) by ID signals PI appearing at PA 0-4 during every recurrence of that given time slot—and the ID signals in effect are used to create address signals at A8, A9 and CS 1-7 which enable reading of a sample from a preselected pattern $PT_z$ which constitutes a part of or forms the tone $TN_x$. Incidentally, in using the symbolisms $TS_o$-$TS_n$, $TN_o$-$TN_n$, $PT_o$-$PT_n$, it is not intended to indicate that the "n" represents the same quantity in each of the pluralities here referred to. As indicated for the preferred embodiment, for example, there are a plurality of available tones $TN_0$-$TN_{47}$, but a different plurality of available sounds $SD_o$-$SD_{31}$ represented by patterns $PT_0$-$PT_{31}$; also, one pattern may contain twenty-one samples $S_0$-$S_{20}$ and another one hundred-fifty samples $S_0$-$S_{149}$.

The particular sample, within the preselected pattern, read in any given cycle $C_i$ is, however, determined by address signals at A0-A7 during that given time slot. The signals A0-A7 form "this cycle" address numbers corresponding to a sample $S_j$; and during the given slot of the cycle $C_i$ they are not only applied to the TP ROM address lines, but they are also used to derive the next cycle address signals to be used in the same slot of the ensuing cycle so that the samples of the preselected pattern are scanned. Thus, as cycles $C_i$, $C_{i+1}$, $C_{i+2}$... transpire samples $S_j$, $S_{j+1}$, $S_{j+2}$... of the preselected pattern $PT_z$ for the given time slot are read out to the bus OB, where the symbols $j, j+1, j+2$ do not necessarily mean that samples are always taken in ascending or descending numerical address order. The next sample address for $S_{j+1}$ is written into the Next Sample RAM 50 during cycle $C_i$ and then read from RAM 50 and used during cycle $C_{i+1}$. In this way, the samples of a preselected pattern are scanned seriatim in a pass—but the scan fashion of successive passes may be different and the sequence of successive scans may have different characteristics for different patterns. An important key to this advantageous result lies in the use of present sample address signals to derive the proper sample address signals for reading out the next sample during the next cycle. As those skilled in the art will appreciate from the present teachings, the invention in its broader aspects may also be practiced by saving the address for sample $S_j$ used during cycle $C_i$ until cycle $C_{i+1}$, and then in cycle $C_{i+1}$ deriving the address $S_{j+1}$ and using it in cycle $C_{i+1}$.

The beauty of the apparatus and its method is not only that the samples of a preselected pattern are scanned in a given time slot by progressively changing the reading addresses fed to the TP ROM during that time slot in successive cycles, but also that any pattern may be preselected for any time slot to provide easy switching of different sounds into different time slots by commands received from a control unit. Because the samples are stored in a main memory which is selectively read only during each time slot, rather than for a whole cycle, it is a simple matter to change the "preselection" assignments as to which sound will be transmitted in the slot.

Indeed, and as here described, some of the time slots ($TS_0$-$TS_{15}$) may have certain respective tones or sound patterns permanently assigned to them—giving what are known as fixed tones. But others of the time slots ($TS_{16}$-$TS_{47}$) may carry any desired one of the available plurality of tones or sound patterns.

Each of those latter time slots is identified by a control signal $CT_{16}$-$CT_{47}$ created by the counter 35; and it causes the commanded pattern (that is, one sample of the commanded pattern) to be outputted because it is utilized to read the ID number of the pre-assigned tone $TN_x$ from the tone select RAM 135 whose contents are changeable in response to commands loaded into that RAM from the buffer 221 at a "time slot" address signaled by the buffer 222. The tone ID number $TI_x$ identifies the preassigned tone during a time slot; and by working through the ROM's 44 and 45, pattern ID signals $PI_z$ and schedule ID signals SS are produced during that same time slot;—with the samples of the preselected pattern being scanned in successive cycles, and the final output being given an on/off schedule generated at the ROM 200 and selected according to the values of the schedule ID signals SS.

Any of a plurality of sounds $SD_0$–$SD_{31}$ represented by stored patterns $PT_0$–$PT_{31}$ may be paired with any of a plurality of schedules $SCH_0$–$SCH_{15}$ stored as the bit sequences in the on/off ROM 200 —to provide any of a large plurality of available tones (here $TN_0$–$TN_{47}$). All schedules are always available as on-going real time on/off signals at the sixteen outputs of the ROM 200; but as each time slot appears in real time, the signal representing the preselected schedule $SCH_u$ for the preselected tone $TN_x$ exerts its overriding control at the final gate 112 so that all or any number of the transmitted tones are eventually heard by a listener with a desired on/off effect.

A tone is easily predesignated to have the intercept sound; the extra ID bit $b_5$ in the Pattern Select ROM permits a pattern ID number (in bits $b_0$–$b_4$) to result in alternate outputting (here on a 0.5/0.5 sec. basis) of one sound corresponding to the identified pattern and a second sound corresponding to the pattern stored in an adjacent block of the TP ROM. A simple alternating of the single address bit signal at A8 results in the changing from one sound to the other.

While preferred embodiments of the method and apparatus have here been disclosed with reference to specific binary signal levels, gates, memories and the like, it is to be understood that many changes in detail may be made as a matter of engineering choices without departing from the scope of the invention as defined by the appended claims. Indeed, those skilled in the art may prefer to embody the apparatus in an iterating microprocessor or digital computer form, and in the light of the present description they will find it easy to implement that choice. Also, it is not necessary to adopt all of the various advantageous features of the present disclosure into a single composite tone source in order to realize their individual advantages. Accordingly, such features are individually defined as sub-combinations in some of the claims which follow.

As the last portion of the present specification, the Tables I–XII referred to above appear below in one place for convenient reference.

TABLE I

| PA4 | PA3 | PA2 | PA0–4 VALUE | TP CHIP ENABLED | CONTENTS OF CHIP |
|---|---|---|---|---|---|
| 0 | 0 | 0 | 0 to 3 | 0 | Contains PATS. 0–3 |
| 0 | 0 | 1 | 4 to 7 | 1 | Contains PATS. 4–7 |
| 0 | 1 | 0 | 8 to 11 | 2 | Contains PATS. 8–11 |
| 0 | 1 | 1 | 12 to 15 | 3 | Contains PATS. 12–15 |
| 1 | 0 | 0 | 16 to 19 | 4 | Contains PATS. 16–19 |
| 1 | 0 | 1 | 20 to 23 | 5 | Contains PATS. 20–23 |
| 1 | 1 | 0 | 24 to 27 | 6 | Contains PATS. 24–27 |
| 1 | 1 | 1 | 28 to 31 | 7 | Contains PATS. 28–31 |

TABLE II

| SOUND PATTERN CALLED FOR BY PA0–4 | PA1 A9 | PA0 A8 | VALUE OF A8 & A9 in A0–9 | GROUP BLK. |
|---|---|---|---|---|
| 0 | 0 | 0 | 0 | 0 |
| 1 | 0 | 1 | 256 | 1 |
| 2 | 1 | 0 | 512 | 2 |
| 3 | 1 | 1 | 768 | 3 |
| 4 | 0 | 0 | 0 | 0 |
| 5 | 0 | 1 | 256 | 1 |
| 6 | 1 | 0 | 512 | 2 |
| 7 | 1 | 1 | 768 | 3 |
| 8 | 0 | 0 | 0 | 0 |
| 9 | 0 | 1 | 256 | 1 |
| 10 | 1 | 0 | 512 | 2 |
| 11 | 1 | 1 | 768 | 3 |
| 12 | 0 | 0 | 0 | 0 |
| 13 | 0 | 1 | 256 | 1 |
| 14 | 1 | 0 | 512 | 2 |
| 31 | 1 | 1 | 768 | 3 |

TABLE III

| 255 | R | LOR | CMP | AC |
|---|---|---|---|---|
| 0 | 0 | 0 | 0 | 0 |
| 0 | 0 | 0 | 1 | 0 |
| 0 | 0 | 1 | 0 | 1 |
| 0 | 0 | 1 | 1 | 0 |
| 0 | 1 | 0 | 0 | 0 |
| 0 | 1 | 0 | 1 | 0 |
| 0 | 1 | 1 | 0 | 1 |
| 0 | 1 | 1 | 1 | 0 |
| 1 | 0 | 0 | 0 | 0 |
| 1 | 0 | 0 | 1 | 0 |
| 1 | 0 | 1 | 0 | 1 |
| 1 | 0 | 1 | 1 | 0 |
| 1 | 1 | 0 | 0 | 1 |
| 1 | 1 | 0 | 1 | 1 |
| 1 | 1 | 1 | 0 | 1 |
| 1 | 1 | 1 | 1 | 1 |

TABLE IV

| 255 | R | FSS |
|---|---|---|
| 0 | 0 | 0 |
| 0 | 1 | 0 |
| 1 | 0 | 1 |
| 1 | 1 | 0 |

TABLE V

| 255 | LOL | L | WDL |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 1 |
| 1 | 1 | 0 | 0 |
| 1 | 1 | 1 | 0 |

TABLE VI

| CMP | 255 | LOR | R | WDR |
|---|---|---|---|---|
| 0 | 0 | 0 | 0 | 0 |
| 0 | 0 | 0 | 1 | 0 |
| 0 | 0 | 1 | 0 | 1 |
| 0 | 0 | 1 | 1 | 1 |
| 0 | 1 | 0 | 0 | 0 |
| 0 | 1 | 0 | 1 | 1 |
| 0 | 1 | 1 | 0 | 0 |
| 0 | 1 | 1 | 1 | 1 |
| 1 | 0 | 0 | 0 | 0 |
| 1 | 0 | 0 | 1 | 0 |
| 1 | 0 | 1 | 0 | 0 |
| 1 | 0 | 1 | 1 | 0 |
| 1 | 1 | 0 | 0 | 0 |
| 1 | 1 | 0 | 1 | 0 |
| 1 | 1 | 1 | 0 | 0 |
| 1 | 1 | 1 | 1 | 0 |

TABLE VII

| 255 | L | SIG₁ |
|---|---|---|
| 0 | 0 | 1 |
| 0 | 1 | 1 |
| 1 | 0 | 0 |
| 1 | 1 | 1 |

TABLE VIII

| CMP | R | SIG₂ |
|---|---|---|
| 0 | 0 | 1 |
| 0 | 1 | 1 |
| 1 | 0 | 1 |
| 1 | 1 | 0 |

TABLE IX

| S | LOS | SIG₂ | SIG₁ | WDL | WDS |
|---|---|---|---|---|---|
| 0 | 0 | 0 | 0 | 0 | 0 |
| 0 | 0 | 0 | 0 | 1 | 0 |
| 0 | 0 | 0 | 1 | 0 | 0 |
| 0 | 0 | 0 | 1 | 1 | 0 |
| 0 | 0 | 1 | 0 | 0 | 0 |
| 0 | 0 | 1 | 0 | 1 | 0 |
| 0 | 0 | 1 | 1 | 0 | 0 |
| 0 | 0 | 1 | 1 | 1 | 0 |
| 0 | 1 | 0 | 0 | 0 | 0 |
| 0 | 1 | 0 | 0 | 1 | 0 |
| 0 | 1 | 0 | 1 | 0 | 0 |
| 0 | 1 | 0 | 1 | 1 | 0 |
| 0 | 1 | 1 | 0 | 0 | 0 |
| 0 | 1 | 1 | 0 | 1 | 0 |
| 0 | 1 | 1 | 1 | 0 | 0 |
| 0 | 1 | 1 | 1 | 1 | 0 |
| 1 | 0 | 0 | 0 | 0 | 1 |

TABLE IX-continued

| S | LOS | SIG₂ | SIG₁ | WDL | WDS |
|---|---|---|---|---|---|
| 1 | 0 | 0 | 0 | 1 | 1 |
| 1 | 0 | 0 | 1 | 0 | 1 |
| 1 | 0 | 0 | 1 | 1 | 1 |
| 1 | 0 | 1 | 0 | 0 | 1 |
| 1 | 0 | 1 | 0 | 1 | 1 |
| 1 | 0 | 1 | 1 | 0 | 0 |
| 1 | 0 | 1 | 1 | 1 | 1 |
| 1 | 1 | 0 | 0 | 0 | 0 |
| 1 | 1 | 0 | 0 | 1 | 0 |
| 1 | 1 | 0 | 1 | 0 | 0 |
| 1 | 1 | 0 | 1 | 1 | 0 |
| 1 | 1 | 1 | 0 | 0 | 0 |
| 1 | 1 | 1 | 0 | 1 | O |
| 1 | 1 | 1 | 1 | 0 | 1 |
| 1 | 1 | 1 | 1 | 1 | 0 |

TABLE X

EIGHT PATTERN SEQUENCES

| SEQ. NO. | SEQUENCE CONTROL BITS L | R | S | SAMPLE SEQUENCE |
|---|---|---|---|---|
| 1 | 0 | 0 | 0 | ↓ ↓ ↓ ↓ ↓ ↓ ↓ ↓ |
| 2 | 0 | 1 | 0 | ↓ ↑ ↓ ↑ ↓ ↑ ↓ ↑ |
| 3 | 0 | 0 | 1 | ↓ ↓ ↓ ↓ ↓ ↓ ↓ ↓ |
| 4 | 1 | 0 | 0 | ↓ ↓ ↓ ↓ ↓ ↓ ↓ ↓ <br> L L L L L L L L |
| 5 | 0 | 1 | 1 | ↓ ↑ ↓ ↑ ↓ ↑ ↓ ↑ |
| 6 | 1 | 1 | 0 | ↓ ↑ ↓ ↑ ↓ ↑ ↓ ↑ <br> L L L L |
| 7 | 1 | 0 | 1 | ↓ ↓ ↓ ↓ ↓ ↓ ↓ ↓ <br> -L -L -L -L -L -L -L -L |
| 8 | 1 | 1 | 1 | ↓ ↑ ↓ ↑ ↓ ↑ ↓ ↑ <br> -L -L -L -L |

CONTROL WORDS STORED IN ROM

| #1 | #2 | #3 | #4 | #5 | #6 | #7 | #8 |
|---|---|---|---|---|---|---|---|
| L R S | L R S | L R S | L R S | L R S | L R S | L R S | L R S |
| 0 0 0 | 0 1 0 | 0 0 1 | 1 0 0 | 0 1 1 | 1 1 0 | 1 0 1 | 1 1 1 |
| 000 | 000 | 000 | 000 | 000 | 000 | 000 | 000 |
| 253 | 253 | 253 | 253 | 253 | 253 | 253 | 253 |
| 000 | 000 | 000 | 000 | 000 | 000 | 000 | 000 |
| 254 | 254 | 254 | 254 | 254 | 254 | 254 | 254 |
| 000 | 000 | 000 | 000 | 000 | 000 | 000 | 000 |
| 255 | 255 | 255 | 255 | 255 | 255 | 255 | 255 |
| FSS=1 | AC=1 | WDS=1 | WDL=1 | WDR=1 | WDR=1 | WDL=1 | WDL=1 |
| 000 | WDR=1 | FSS=1 | 100 | WDS=1 | WDL=1 | WDS=1 | WDS=1 |
| FSA | 010 | 001 | 255 | AC=1 | AC=1 | 101 | WDR=1 |
| 000 | 254 | FSA | FSS=1 | 011 | 110 | 255 | AC=1 |
| FSA+1 | AC=1 | LOS=1 | WDL=0 | 254 | 255 | WDS=1 | 111 |
| 000 | WDR=1 | WDR=1 | 000 | AC=1 | WDR=1 | LOS=1 | 255 |
| FSA+2 | 010 | 001 | FSA | 011 | AC=1 | FSS=1 | WDL=0 |
|  | 253 | FSA+1 | 000 | 253 | 010 | 001 | WDS=1 |
|  | AC=1 | LOS=1 | FSA+1 | AC=1 | 254 | FSA | WDR=1 |
|  | WDR=1 | WDS=1 |  | WDR=1 | WDS=1 | AC=1 |
|  |  |  |  | AC=1 | LOS=1 | 011 |
|  |  |  |  | 010 | 001 | 254 |
|  |  |  |  | 253 | FSA+1 | AC=1 |
|  |  |  |  | 011 | WDR=1 | WDS=1 | LOS=1 |
| 000 |  | 001 |  | FSA+1 | AC=1 | LOS=1 |
| 253 | 010 | 255 | 000 | AC=1 |  |  | 011 |
|  | FSA+1 | LOS=1 | 253 | 011 |  |  | FSA+1 |
|  | AC=1 | WDS=0 |  | FSA |  |  | AC=1 |
|  | WDR=1 | FSS=1 |  | CMP=1 |  |  | 011 |
|  | 010 | 000 |  | AC=0 | 010 | 001 | AC=1 |
|  | FSA | FSA |  | WDR=0 | FSA+1 | 255 | 011 |
|  | CMP=1 | 000 |  | WDL=0 | AC=1 | WDS=0 | FSA |
|  | AC=0 | FSA+1 |  | 000 | 010 | WDL=1 | CMP=1 |

-continued

| CONTROL WORDS STORED IN ROM | | | | | | | | | | | | | | | | | | | | | | | | |
|---|---|---|---|---|---|---|---|---|---|---|---|---|---|---|---|---|---|---|---|---|---|---|---|---|
| #1 | | | #2 | | | #3 | | | #4 | | | #5 | | | #6 | | | #7 | | | #8 | | | |
| L | R | S | L | R | S | L | R | S | L | R | S | L | R | S | L | R | S | L | R | S | L | R | S | |
| 0 | 0 | 0 | 0 | 1 | 0 | 0 | 0 | 1 | 1 | 0 | 0 | 0 | 1 | 1 | 1 | 1 | 0 | 1 | 0 | 1 | 1 | 1 | 1 | |
| | | | WDR=0 | | | | | | | | | FSA+1 | | | FSA | | | LOS=1 | | | AC=0 | | | |
| | | | 000 | | | | | | | | | 000 | | | CMP=1 | | | 100 | | | WDR=0 | | | |
| | | | FSA+1 | | | | | | | | | FSA+2 | | | 000 | | | 255 | | | WDL=0 | | | |
| | | | 000 | | | 000 | | | | | | | | | FSA+1 | | | WDS=0 | | | 000 | | | |
| | | | FSA+2 | | | 253 | | | | | | | | | | | | WDL=0 | | | FSA+1 | | | |
| | | | | | | | | | | | | | | | | | | LOS=0 | | | AC=0 | | | |
| | | | | | | | | | | | | | | | 000 | | | FSS=1 | | | | | | |
| | | | | | | | | | | | | 000 | | | 253 | | | 000 | | | | | | |
| | | | | | | | | | | | | 253 | | | | | | 000 | | | | | | |
| | | | | | | | | | | | | | | | 000 | | | FSA | | | | | | |
| | | | 000 | | | | | | | | | | | | 253 | | | | | | 000 | | | |
| | | | 253 | | | | | | | | | | | | | | | | | | 253 | | | |
| | | | | | | | | | | | | | | | | | | 000 | | | | | | |
| | | | | | | | | | | | | | | | | | | 253 | | | | | | |

TABLE XII
EXEMPLARY SCHEDULE ROM CONTENTS

| ADDRESS IN DECIMAL NOS. | STORED DATA | | | | | | | | |
|---|---|---|---|---|---|---|---|---|---|
| | b15 | b14 | b7 | b6 | b5 | b4 | b3 | b2 | b1 b0 |
| 0 | 1 | | | 1 | 1 | 1 | 1 | 1 | 0 |
| 1 | 1 | | | 1 | 1 | 1 | 1 | 1 | 0 |
| 2 | 1 | | | 1 | 1 | 1 | 1 | 1 | 0 |
| 3 | 1 | | | 1 | 1 | 1 | 1 | 1 | 0 |
| 4 | 1 | | | 1 | 1 | 1 | 1 | 1 | 0 |
| 5 | 1 | | | 1 | 1 | 1 | 1 | 1 | 0 |
| 6 | 1 | | | 1 | 1 | 1 | 1 | 1 | 0 |
| 7 | 1 | | | 1 | 1 | 1 | 1 | 1 | 0 |
| 8 | 1 | | | 1 | 1 | 1 | 1 | 1 | 0 |
| 9 | 1 | | | 1 | 1 | 1 | 1 | 1 | 0 |
| 10 | 0 | | | 1 | 1 | 1 | 1 | 1 | 0 |
| 18 | 0 | | | 1 | 1 | 1 | 1 | 1 | 0 |
| 19 | 0 | | | 1 | 1 | 1 | 1 | 1 | 0 |
| 20 | 1 | | | 0 | 1 | 1 | 0 | 1 | 0 |
| 21 | 1 | | | 0 | 1 | 1 | 0 | 1 | 0 |
| 38 | 0 | | | 0 | 1 | 1 | 0 | 1 | 0 |
| 39 | 0 | | | 0 | 1 | 1 | 0 | 1 | 0 |
| 40 | 1 | | | 0 | 0 | 0 | 1 | 1 | 0 |
| 41 | 1 | | | 0 | 0 | 0 | 1 | 1 | 0 |
| 78 | 0 | | | 0 | 0 | 0 | 1 | 1 | 0 |
| 79 | 0 | | | 0 | 0 | 0 | 1 | 1 | 0 |
| 80 | 1 | | | 0 | 1 | 0 | 1 | 1 | 0 |
| 81 | 1 | | | 0 | 1 | 0 | 1 | 1 | 0 |
| 97 | 0 | | | 0 | 1 | 0 | 1 | 1 | 0 |
| 98 | 0 | | | 0 | 1 | 0 | 1 | 1 | 0 |
| 99 | 0 | | | 0 | 1 | 0 | 1 | 1 | 0 |
| 100 | 1 | | | 0 | 1 | 0 | 0 | 1 | 0 |
| | 0 | | | 0 | 1 | 0 | 0 | 1 | 0 |
| 118 | 0 | | | 0 | 1 | 0 | 0 | 1 | 0 |
| 119 | 0 | | | 0 | 1 | 0 | 0 | 1 | 0 |

We claim:

1. The method of digitally signaling different ones of a plurality of sounds $SD_o$-$SD_n$ in different ones of a plurality of successive time slots $TS_o$-$TS_n$ of repeating cycles in a PCM multiplex communication system, said method comprising
   (a) for each sound $SD_o$-$SD_n$ initially storing in addressable, readable main memory—as multi-bit digital numerical words—a pattern of successive samples representing the sampled magnitudes of at least a symmetrical portion of an analog wave corresponding to the desired sound,
   (b) during and only within the duration of each time slot, applying address signals to said main memory to effect readout to a common bus of one sample of a preselected pattern for that slot, and
   (c) as each cycle transpires, changing the address signals so applied during each time slot so that the samples of the preselected pattern are scanned with the passage of on-going cycles.

2. The method set out in claim 1, further characterized in that during and within the duration of each time slot an on/off control signal is created at a first or second level, and readout to said common bus during predetermined ones of said time slots, corresponding to those in which the control signal is at its second level, is prevented, the control signal during a given slot existing at said second level during that same slot over a span of several cycles to define an "off" interval for the sound otherwise carried in that given slot, the "off" intervals of alternate on/off periods of time exceeding the cycle time by at least two orders of magnitude.

3. The method set out in claim 1 further including
   (d) from time-to-time changing the preselected pattern of which a sample is read-out by the performance of said step (c), whereby different sounds are switched into a given time slot.

4. The method set out in claim 2 wherein different ones of a plurality of on/off schedules $SCH_o$-$SCH_n$ are put into effect for different time slots.

5. The method set out in claim 1 further characterized by the additional procedures of
   (d) producing during and only within the duration of the respective time slots tone ID signals identifying one of a plurality of tones $TN_o$-$TN_n$, each tone being characterized by a predesignated one of said sounds $SD_o$-$SD_n$ paired with a predesignated one of a plurality of on-off schedules $SCH_o$-$SCH_n$, and
   (e) utilizing said tone ID signals existing during any given time slot
     (i) to make the preselected pattern referred to in said step (b) correspond to the predesignated sound of the identified tone, and
     (ii) to prevent readout to said common bus during said given time slot during "off" intervals of an alternating on/off schedule which corresponds to the predesignated schedule of the identified tone.

6. The method set out in claim 1 wherein said step (c) includes using the address signals so applied during a given slot of a cycle $C_i$ to derive the address signals so applied during the same slot of the next cycle $C_{i+1}$ to cause scanning and scan sequences of the samples in the pattern preselected for the given slot.

7. The method set out in claim 1 wherein said step (c) includes
   (c') addressing a multi-word read/write memory according to the sequence of time slots to read said address signals, previously formed, to the address lines of said main memory, and
   (c") before the next occurrence of the same time slot, writing into the word location so read signals representing the next address to be read in main memory during the next occurrence of the same time slot.

8. The method of digitally signaling a sound on an output bus in a PCM time multiplex system for transmission in a given one of successive time slots of repetitive time frames or cycles, the sound corresponding to a repeating analog wave, said method comprising
   (a) initially storing in respective word locations of an addressable, readable main memory—as multi-bit digital numerical values—successive magnitude samples $S_o$–$S_n$ of said wave,
   (b) applying to the address lines of said main memory, during said given time slot of given cycle $C_i$, signals representing the address of one sample $S_j$ and placing the readout signals from the main memory onto the output bus,
   (c) using said address signals so applied to derive a next sample set of address signals, and
   (d) repeating said steps (b) and (c) once for each of succeeding cycles $C_{i+1}$, $C_{i+2}$ . . . with the next sample set of address signals $S_{j+1}$, $S_{j+2}$ formed by step (c) employed as the signals applied in step (b) to said address lines.

9. The method of digitally signaling a sound on an output bus in a PCM time multiplex system for transmission in a given one of successive time slots of repetitive time frames or cycles, the sound corresponding to a repeating analog wave, said method comprising
   (a) initially storing in respective word locations of an addressable, readable main memory—as multi-bit digital numerical values—successive magnitude samples $S_o$–$S_n$ of said wave,
   (b) providing in storage preformed sample address signals,
   (c) during a given cycle $C_i$ and a given time slot therein
      (i) pulling from storage the preformed sample address signals and applying them to the address lines of said main memory to read out to said bus signals representing one of said samples $S_j$,
      (ii) using the signals previously pulled from storage, and representing the address in main memory of a sample $S_j$, to derive and put into storage newly formed sample address signals representing the address of the next sample $S_{j+1}$ to be used, and
   (d) repeating said step (c) during the same time slot of successive cycles $C_{i+1}$, $C_{i+2}$ . . . using successively for sub-step (i) the newly formed sample address signals created by sub-step (ii), so that the samples $S_o$–$S_n$ are scanned and outputted in a desired sequence.

10. The method set out in claim 9 wherein said step (a) includes
    (a') initially storing said successive samples at numerically ascending or descending addresses in said main memory,
    and said sub-step (ii) includes
    (ii') numerically changing by one the signals previously pulled from storage to derive the newly formed sample address signals,
    whereupon the samples $S_o$–$S_n$ are serially scanned in one of (1) first-to-last order or (2) last-to-first order.

11. The method set out in claim 9 further including
    (e) detecting when the signals pulled from storage represent the address in main memory of the last sample in the plurality of samples $S_o$–$S_n$,
    and in response to such detection, carrying out said sub-step (ii) by deriving said newly formed sample address signals to make them represent the address in main memory of one of the following:
    (x) the first sample
    (y) the next-to-last sample
    (z) the last sample.

12. The method set out in claim 9 further including
    (a) detecting when the signals pulled from storage represent the address in main memory of the first sample in the plurality of samples $S_o$–$S_n$,
    and in response to such detection, carrying out said sub-step (ii) by deriving newly formed sample address signals to make them represent the address in main memory of the second sample.

13. The method set out in claim 9 further characterized in that said step (a) includes
    (a') initially storing said successive samples at respective numerically ascending addresses in said main memory,
    and said sub-step (ii) includes deriving said newly formed sample address signals by adding one to the signals previously pulled from storage.

14. The method of digitally signaling a sound on an output bus in a PCM time multiplex system for transmission in a given one of successive time slots of repetitive time frames or cycles, the sound corresponding to a repeating analog wave, said method comprising
    (a) storing in respective word locations of an addressable, readable main memory, as multi-bit digital numerical values, successive magnitude samples $S_o$–$S_n$ of said wave,
    (b) providing preformed address signals in a next sample memory,
    (c) during a given cycle $C_i$, and during a given time slot therein, reading said preformed address signals from said next sample memory onto the address lines of said main memory to cause readout of one sample $S_j$ onto said output bus,
    (d) using said address signals read out during said given cycle $C_i$ to derive a next set of address signals which designate the main memory address of the next sample $S_{j+1}$ to be read,
    (e) storing such next set in said next sample memory in place of the previous preformed address signals, whereby such next set becomes a new set of preformed address signals, and
    (f) repeating said steps (c), (d) and (e) as recurring cycles transpire.

15. The method set out in claim 14 further characterized in that said steps (d) and (e) include
    (e') detecting when the said address signals read-out from said next sample memory during the given time slot of any cycle represent the word location in said main memory of the last sample $S_n$, and in response to such detection deriving the next set of address signals to initiate a new scan of the stored samples.

16. The method set out in claim 14 further characterized in that said steps (d) and (e) include (e') detecting when the said address signals read-out from said next sample memory during the given time slot of any cycle represent the word location in said main memory of the first sample $S_o$, and in response to such detection deriving the next set of address signals to represent the second sample $S_1$.

17. The method of digitally signaling different ones of a plurality of sounds $SD_o$–$SD_n$ on a common output bus during different ones of time slots $TS_o$–$TS_n$ within repeating cycles in a PCM time multiplex communication system, each sound corresponding to a different repeating analog wave, said method comprising (a) storing in individual multi-word blocks of addressable, readable main memory—and as multi-bit digital numerical values—a pattern of successive magnitude samples $S_o$–$S_n$ of respective ones of said waves, (b) providing a read/write memory with a plurality of addressable word locations respectively corresponding to said time slots $TS_o$–$TS_n$, and storing in such word locations preformed address signals corresponding to the addresses of said main memory at which are located a given sample $S_j$ of a pattern preselected to be signaled during the respective timeslots $TS_o$–$TS_n$, (c) creating control signals $CT_o$–$CT_n$ which exist during and identify successive time slots of each cycle, and which correspond to the different word locations of said read/write memory, (d) applying said control signals to the address inputs of said read/write memory to cause readout therefrom of the respective preformed address signals during respective ones of the time slots in a given cycle $C_i$, (e) applying the readout signals from said read/write memory to the address lines of said main memory to cause readout of one sample onto said output bus, a sample $S_j$ of the pattern preselected for each time slot being outputted to the bus during that time slot within cycle $C_i$, (f) prior to the occurrence of each time slot in the succeeding cycle $C_{i+1}$, utilizing the preformed address signals existing during each time slot of cycle $C_i$ to derive new address signals representing the location in main memory of the next sample $S_{j+1}$ to be outputted for the pattern preselected to be signaled in that time slot, (g) prior to the occurrence of each time slot in the succeeding cycle $C_{i+1}$, writing and storing into said read/write memory the new address signals derived by step (e), such that the previous preformed address signals are replaced by the new address signals in the word locations of read/write memory corresponding to the respective time slots $TS_o$–$TS_n$, and (h) continuing said step (c) and repeating said steps (d) through (g) so that the samples for each sound to be signaled in each time slot $TS_o$–$TS_n$ are successive outputted with scanning as recurring cycles transpire.

18. The method set out in claim 17 further including (g') from time-to-time writing—to a location corresponding to a given time slot in said read/write memory—address signals designating the location of the first sample of a different sound, whereby the preselected sound signaled in the given time slot may be changed.

19. The method set out in claim 17 further characterized in that said step (f) includes (f') detecting when the address signals read from said read/write memory during any given time slot represent the location in main memory of the last sample $S_n$ for the sound being signaled in that time slot, and in response to such detection deriving the new address signals to initiate a new scan of the stored samples for that sound.

20. The method set out in claim 17 further characterized in that said step (f) includes (f') detecting when the address signals read from said read/write memory during any time slot represent the address in main memory of the first sample $S_o$ for the sound being signaled in that time slot, and in response to such detection deriving, the new address signals to initiate a new scan of the stored samples for that sound.

21. The method set out in claim 20 further characterized in that said step (f') includes (f'') storing in a readable first-sample memory address signals representing the first sample location in said main memory for each of the sounds $SD_o$–$SD_n$, (f''') applying to the address lines of said first-sample memory, during each time slot, signals which cause readout of the first sample address signals for the sound being signaled in that time slot, and (f'''') comparing said readout of the first sample address signals with the address signals read from said read/write memory to detect when the address signals read from said read/write memory represent the location in main memory of the first sample $S_o$.

22. The method of signaling different ones of a plurality of sounds $SD_o$–$SD_n$ on a bus in desired ones of a plurality of time slots $TS_o$–$TS_n$ in a PCM time multiplex communication system, said method comprising (a) for each of said sounds $SD_o$–$SD_n$, initially storing in addressable main memory, as multi-bit numerical values, a pattern $PT_o$–$PT_n$ of samples of at least a symmetrical portion of an analog wave representing that sound, each sample having a unique memory address location, and said main memory having a common output bus, (b) producing in time sequence different control signals $CT_o$–$CT_n$ which respectively exist during and uniquely identify different ones of said time slots, such control signals recurring in repetitive cycles, and (c) utilizing each of said control signals $CT_o$–$CN_n$ to create one set of address signals SAO-7 which respectively exist only during and within duration of each of said time slots, each set of address signals being applied to said main memory to cause reading from said memory onto said output bus one sample of one pattern $PT_z$, the pattern $PT_z$ being preselected for digital transmission in the respective time slot identified by that control signal.

23. The method set out in claim 22, wherein there are a plurality of sounds $SD_o$–$SD_n$ each represented by a pattern $PT_o$–$PT_n$ of stored samples $S_o$–$S_n$ in main memory and further including (d) utilizing each control signal during successive cycles $C_i, C_{i+1}, C_{i+2} \ldots$ to cause reading from main memory onto said bus successive samples $S_j, S_{j+1}, S_{j+2}\ldots$ of a preselected pattern $PT_z$ such that as a given control signal $CT_y$ for a given slot $TS_y$ recurs, the samples $S_o-S_n$ of the preselected pattern are successively applied to said bus.

24. The method set out in claim 23, further characterized in that the plurality of samples $S_o-S_n$ in the pattern $PT_z$ are repeatedlyscanned and applied to said bus in a predetermined scan sequence as the number of repeating cycles exceeds the quantity of stored samples $S_o-S_n$ in the preselected pattern.

25. The method set out in claim 23 further including
    (e) producing an on/off signal which during the existence of each control signal has first and second values over extended time intervals of p and q seconds, where p and q form a preselected one of a plurality of on/off schedules $SCH_o-SCH_n$, and
    (f) gating or blocking sample signals from said main memory to or from said bus when said on/off signal respectively has said first or second value.

26. The method set out in claim 25 further including
    (g) generating a plurality of schedule signals each corresponding to one of said schedules $SCH_o-SCH_n$ and having a different high/low, on/off time duty cycle, and
    (h) during the existence of each of the control signals $CT_o-CT_n$, utilizing a preselected one of said schedule signals as said on/off signal to control gating of signals from the output of the main memory.

27. The method set out in claim 25, wherein any one of the sounds $SD_o-SD_n$ with any one of the schedules $SCH_o-SCH_n$ forms one of a plurality of tones $TN_o-TN_n$ which may be transmitted in any one of the time slots $TS_o-TS_n$, and further characterized by
    (g) storing in pattern-select memory at addressable locations digital words respectively identifying predetermined ones of the patterns $PT_o-PT_n$,
    (h) storing in schedule-select memory at addressable locations digital words respectively identifying predetermined ones of the individual schedules $SCH_o-SCH_n$,
the pattern and the schedule identifications $PT_z$ and $SCH_u$ stored at the same address locations in said two select memories forming in combination a particular one $TN_x$ of the tones $TN_o-TN_n$,
    (i) applying to both said pattern-select and schedule-select memories the same address signals, designating a preselected tone $TN_x$, during the existence of one control signal corresponding to a particular time slot $TS_y$ to read out the stored words from such memories,
    (j) utilizing said readout word from said schedule-select memory to make said on/off signal have corresponding p and q times according to the schedule $SCH_u$, and
    (k) utilizing the readout word from said pattern-select memory during each time slot $TS_y$ to cause application of a sample of the pattern $PT_z$ to said bus under the gating control of said on/off signal.

28. The method set out in claim 22, further characterized in that said step (c) includes
    (c′) applying said control signals $CT_o-CT_n$ as address signals to a random access memory (RAM) to read out therefrom, as an address input to said main memory, a representation of the main memory location of the sample, within a preselected pattern, to be outputted during each time slot of a given cycle; and during each such time slot, writing into the same address location of said RAM a multi-bit word representing the main memory address of the next sample, within the preselected pattern, to be outputted during the same time slot of the following cycle.

29. The method set out in claim 28, further characterized in that the preselected pattern $PT_z$ to be transmitted digitally in any given time slot is preselected by writing into said RAM, at the address corresponding to said time slot, the main memory address number of a sample within the pattern $PT_z$.

30. The method set out in claim 29, further including
    (d) initially storing the main memory address number for the first sample of each pattern $PT_o-PT_n$ in an auxiliary readable memory (FS ROM) at an address which corresponds to an ID number for that pattern, and when a particular pattern $PT_z$ is to be preselected for transmission in a given time slot, applying to the address lines of said auxiliary memory signals representing the corresponding ID number during the existence of said control signals representing the given time slot, and
    (e) writing into said RAM the output of said auxiliary memory at an address corresponding to the control signals.

31. The method set out in claim 22, further characterized in that said control signals are produced by a counter and including driving the counter to increment its count states during each of said time slots, said counter executing one repetitive counting cycle for each cycle.

32. The method of signaling any of various ones of a plurality of sounds $SD_o-SD_n$ in any of a plurality of time slots $TS_o-TS_n$ of successive cycles in a PCM multiplex communications system, said method comprising
    (a) for each of the sounds $SD_o-SD_n$, initially storing, in addressable word locations of a main readable memory, the successive digital multi-bit samples which represent that sound,
    (b) creating control signals $CT_o-CT_n$ which exist during and uniquely identify each of the time slots $TS_o-TS_n$ in a cycle,
    (c) from time-to-time, creating paired command signals in which each pair represents (i) a commanded one of the plurality of sounds $SD_o-SD_n$ and (ii) a commanded one of the time slots $TS_o-TS_n$ in which that commanded one sound is to be signaled,
    (d) in response to the appearance of a pair of command signals, storing the commanded sound signal in a read/write sound-select memory at an address corresponding to and determined by the commanded time slot signal,
    (e) applying said control signals to the address lines of said sound-select memory to read out therefrom during successive time slots the respective commanded sound signals previously stored,
    (f) utilizing said readout commanded sound signals to form, during each time slot when commanded sound signals exist, address signals representing the location in said main memory of one sample of the multiple samples for the sound that corresponds to the commanded sound signals,
    (g) applying said address signals to said main memory, and (h) changing the address signals so formed during any given slot from cycle to cycle to scan the samples representing the commanded sound for that slot.

33. The method of signaling various ones of a plurality of tones in different desired ones of a plurality of time slots of successive cycles in a PCM multiplex communication system, said method comprising
 (a) initially storing in addressable main memory, for each of a plurality of tones, successive multi-bit digital samples representing successive magnitudes of the tone sound,
 (b) creating control signals $CT_o$-$CT_n$ which respectively exist during and uniquely identify a plurality of time slots in a cycle,
 (c) from time-to-time, creating paired command signals which respectively represent (i) a commanded one of a plurality of tones $TN_o$-$TN_n$ and (ii) a commanded one of the time slots $TS_o$-$TS_n$ in which the commanded tone is to be signaled,
 (d) storing the commanded tone signals in a read/write tone select memory at an address location represented and determined by the paired commanded time slot signals, said tone select memory having an addressable word location for each of the time slots,
 (e) applying said control signals to the address lines of said tone select memory to read therefrom during different time slots of each cycle the respective previously stored commanded tone signals for respective ones of the time slots,
 (f) utilizing the readout commanded tone signals to create, during each of said time slots, address signals which represent the address in said main memory of one of the samples there stored for the tone sound called for by said commanded tone signals, and
 (g) thereafter incrementing or decrementing the address signals applied to said main memory during the respective time slots of each cycle, so that the successive samples for a commanded sound are scanned and outputted during the same, commanded time slot of successive cycles.

34. The method of digitally signaling fixed and switchable sounds in a PCM multiplex communication system, comprising
 (a) producing control signals $CT_o$-$CT_n$ which exist respectively during and uniquely identify each of successive time slots $TS_o$-$TS_n$ of repeating cycles,
 (b) initially storing a pattern of samples for each of a corresponding plurality of sounds $SD_o$-$SD_n$ in addressable, readable main memory, each pattern of samples representing, as multi-bit digital words, the successive sample magnitudes of a recurring analog wave which corresponds to a desired sound,
 (c) utilizing a first sub-plurality of said control signals $CT_o$-$CT_n$ to cause readout, from main memory to a common bus, of one sample of respective pre-assigned sounds, with the samples for a given sound being progressively scanned during the same time slot of successive cycles, whereby the respective pre-assigned sounds are transmitted in the time slots corresponding to said first sub-plurality of control signals in every cycle,
 (d) utilizing a second sub-plurality of said control signals as address inputs to a read/write memory to cause readout of sound ID signals from memory locations respectively corresponding to the values of said control signals during the corresponding time slots,
 (e) from time-to-time, producing pairs of command signals with each pair comprising (i) sound command sound ID signals and (ii) time slot command signals equal to one of said second sub-plurality; and applying the sound command ID signals to the input data lines with application of said time slot command signals to the address lines of said read/write memory to cause writing into the latter, and
 (f) utilizing the readout sound ID signals, as produced according to said step (d), to cause readout, from main memory to said common bus, during the time slot when said readout sound ID signals appear, of one sample for the sound identified by such ID signals, with the samples for a given sound being progressively scanned during the same time slot of successive cycles, whereby any one of the sounds may be carried in any one of the channel time slots which correspond to said second sub-plurality of control signals, as determined by the writing of command sound ID signals into locations of said read/write memory at addresses represented by the paired time slot command signals.

35. The method of forming and digitally transmitting on an output bus any one of a plurality of tones $TN_o$-$TN_n$, where each tone is constituted by one of a plurality of sounds $SD_o$-$SD_n$ modulated with any one of a plurality of on/off schedules $SCH_o$-$SCH_n$, in a PCM time multiplex system, said method comprising
 (a) for each of said sounds $SD_o$-$SD_n$, initially storing in addressable main memory, as multi-bit numerical values, a pattern of successive samples of at least a symmetrical portion of an analog wave representing that sound, each numerical sample having a unique memory address location,
 (b) storing in sound-select memory at addressable locations preselected ones of ID words $PI_o$-$PI_n$ respectively identifying the sounds $SD_o$-$SD_n$,
 (c) storing in schedule-select memory at addressable locations preselected ones of schedule ID words $SCI_o$-$SCI_n$ respectively identifying the schedules $SCH_o$-$SCH_n$,
the pairing of a sound ID $PI_x$ word with a schedule ID word $SCI_x$ at corresponding address locations in said two select memories designating a particular tone $TN_x$,
 (d) applying during different time slots $TS_o$-$TS_n$ of repetitive cycles different ones of tone ID signals $TI_o$-$TI_n$ to the address lines of both said sound and schedule select memories, whereby during different time slots different predetermined pairs of ID words $PI_x$ and $SCI_x$ are signaled at the outputs of such memories,
 (e) utilizing the $SCI_x$ word signals existing during any of said time slots to create a gating signal which exists at on and off levels respectively during that slot over intervals of p and q seconds and which form an on/off schedule $SCH_x$ corresponding to the identification word $SCI_x$,
 (f) utilizing said $PI_x$ word signals existing during any of said time slots to create and apply, to the address inputs of said main memory, signals which cause readout from main memory one sample forming part of the representation of the sound $SD_x$ identified by said $PI_x$ word signals, and
 (g) applying or blocking the sample signals so readout respectively to or from an output bus when the gating signal contemporaneously is on or off, respectively.

36. The method set out in claim 35 wherein said step (f) includes reading out successive samples of the sound $SD_x$ during the same time slot of successive cycles, with repetitive scanning of all such samples taken one at a time.

37. The method set out in claim 35 wherein said step (d) includes
(d1) selectively changing the tone ID signals applied during different time slots to the address lines of said sound and schedule select memories, thereby to preselect and "switch" different desired tones into particular time slots.

38. The method set out in claim 35 further including
(h) storing in on/off memory strings of bits each corresponding to one of said schedules $SCH_o$–$SCH_n$, said stored bits of each string being a different combination of 1's and 0's, with any given string containing n 1's in succession when an "on" interval of $n\Delta T$ is desired, and m 0's in succession when an "off" interval of $m\Delta T$ is desired, in the schedule corresponding to that given string,
(i) reading said on/off memory in a repetitive rollover sequence of its addresses at a rate of one address per interval $\Delta T$, to produce at its output bi-state signals respectively corresponding to the strings of stored bits, and
(j) utilizing any of said signaled schedule ID words $SCI_o$–$SCI_n$ to select the corresponding one of the bi-state signals for use as said gating signal.

39. The method of digitally transmitting different sounds on an output bus in a PCM time multiplex communication system, said method comprising
(a) for each of said sounds, storing in an addressable memory block—as multi-bit numerical values—successive samples of at least a symmetrical portion of an analog wave representing that sound,
(a1) the stored samples for each sound constituting a set,
(a2) the quantities of samples in at least some of said sets being unequal,
(a3) each of said blocks having a quantity of word locations which is equal to or greater than the quantity of samples stored in that block, and all blocks having output lines coupled to a common output bus,
(a4) said sets being stored in their respective blocks such that the last sample of every set is stored at the same, common addressable word location within a block, and with the samples of each set in sequential rollover order,
(b) enabling the reading from one preselected block during the same given time slot within every repetitive cycle of time slots,
(c) applying to the address line inputs of all blocks sample select signals which represent, during the same time slot of successive cycles, successive sample addresses within the enabled block, to read out onto said bus signals corresponding to successive samples of a selected sound during a selected time slot of successive cycles, the samples of a set thus being read out in a scanned sequence,
(d) monitoring the sample select signals to detect when they represent said common addressable word location, and
(e) in response to such detection, changing the sample select signals produced during the ensuing cycle to begin a new scan of the samples in the preselected block during the given time slot of later cycles.

40. The method set forth in claim 39, further including
(f) during the given time slot of any cycle said detection does not occur, changing said sample select signals to represent the word address of the next sample in a seriatim scan of the samples.

41. The method set forth in claim 39 wherein the samples in any given block are scanned in different fashions during successive passes, and said step (e) includes
(e') in response to said detection, changing the sample select signals produced during the given time slot of following cycles to produce the desired scan fashion for the following pass.

42. The method set forth in claim 39 wherein said step (d) includes
(d') during every time slot of every cycle, applying the sample select signals to common decoding apparatus which produces a signal (255) indicating that such sample select signals represent said common addressable word location and that the last sample of a set is being read.

43. The method set out in claim 39 wherein said step (a) is further characterized in that the last sample of every set is stored in the last (highest address) word location (255) of its memory block, and the samples in a set are normally scanned seriatim from the first sample word location to last sample word location of a memory block.

44. The method set out in claim 39 wherein step (e) includes
(e') in response to such detection, changing the sample select signals, produced during the given time slot of the ensuing cycle, to represent the address of the first sample stored in the selected block so that the new scan is in the normal first-to-last sample fashion.

45. The method set out in claim 39 wherein said step (e) includes
(e') changing the sample select signals, produced during the selected time slot of the ensuing cycle, to represent the address of the next-to-last sample stored in the selected block, and in the same time slot of following cycles changing the sample select signals successively to cause readout of the samples in reverse sequence during the given time slot of successive cycles until the first sample has been read out, thereby making the new scan a reverse order scan.

46. The method set out in claim 39 wherein said step (e) includes
(e') in response to such detection, making the sample select signals produced during the given time slot of the ensuing cycle following such detection the same as those produced during the cycle in which such detection occurs, so that the output of the last sample is repeated at the beginning of the new scan.

47. The method set out in claim 39 wherein said step (e) includes
(e') in response to such detection, complementing the sign bit of all samples read out to said bus during the new scan.

48. The method set out in claim 44 further including complementing the sign bit of all samples read out to said bus during the new scan.

49. The method set out in claim 45 further including complementing the sign bit of all samples read out to said bus during the new scan.

50. The method set out in claim 46, further including reading the samples of the selected block in reverse address order after the last sample has been repeated at the beginning of the new scan.

51. The method set out in claim 39 wherein said step (a) is further characterized in that the last sample of every set is stored in the first (lowest address) word location (000) of its memory block, and a normal scan of the samples in a set is from the first sample location (at the highest address used in the block) through progressively lower address locations to the first word location.

52. In the digital signaling of sounds in a PCM multiplex communication system, the method of outputting successive digital samples of a sound, said method comprising
- (a) initially storing in successive address locations of addressable, readable main memory—as multi-bit digital words—successive samples $S_o$–$S_n$ representing successive sampled magnitudes of at least a symmetrical portion of a cyclic analog wave corresponding to the desired sound,
- (b) producing character signals which represent the characteristic of the necessary sequences of successive scans of said samples which will recreate the analog wave in PCM form,
- (c) during a given time slot in recurring cycles, applying to the address lines of said main memory address signals to effect readout of one sample $S_j$,
- (d) changing said address signals prior to the next occurrence of the given time slot, to represent the address of the next sample to be read out, so that the samples are scanned seriatim,
- (e) detecting when said address signals represent the address of the last sample $S_n$, and
- (f) in response to such detection, using said character signals to determine the succeeding value to be given to said address signals for readout of the next sample at the beginning of a new scan.

53. The method set out in claim 52, wherein said character signals designate that the samples are to be repeatedly scanned in first-to-last order, and said step (f) includes
- (f') making the succeeding value of said address signals represent the address of the first sample.

54. The method set out in claim 52, wherein said character signals designate that the samples are to be scanned alternately in read-up and read-down address order, and said steps (f) and (d) include
- (f') making the succeeding value of said address signals represent the address of the next-to-last sample $S_{n-1}$, and
- (d') during the ensuing scan of the samples decrementing said address signals to scan in read-up address order.

55. The method set out in claim 52 wherein said character signals designate that the last sample is to be repeated after having been read out once, and said step (f) includes
- (f') making the succeeding value of said address signals represent the same last sample address, and thereafter prior to the next occurrence of the given time slot forming the next-succeeding value to be given to said address signals to proceed with a new scan.

56. The method set out in claim 52 wherein said character signals designate that the samples are to be read-out with alternately changed signs during successive scans, and said step (f) includes
- (f') complementing the sign bit of the sample read-out signals during the ensuing scan of samples.

57. The method set out in claim 54 further including the step of
- (g) during a scan of the samples in read-up address order, detecting when said address signals represent the address of the first sample $S_o$, and
- (h) in response to such detecting making the address signals during the subsequent occurrences of said given time slot progressively increment until they represent the address of the last sample $S_n$ and the last sample is read out.

58. The method of digitally signaling different ones of sounds $SD_o$–$SD_n$ in different time slots $TS_o$–$TS_n$ successive cycles in a PCM time multiplex system, said method comprising
- (a) for each sound $SD_o$–$SD_n$, initially storing in a group of successive addressable word locations of addressable, readable main memory—as multi-bit digital words—successive samples $S_o$–$S_n$ representing the successive sample magnitudes of at least a symmetrical portion of a cyclic analog wave corresponding to the sound to be reproduced,
- (b) producing control signals $CT_o$–$CT_n$ which respectively exist during and uniquely identify different time slots within each recurring cycle,
- (c) during different time slots, using said control signals to create address signals applied to said main memory to effect readout onto a common bus of one sample of a preselected one of said sounds assigned to the respective time slots,
- (d) from cycle-to-cycle changing the address signals created during each of said different time slots to successively scan the samples of the sound preselected for that time slot, some of sounds $SD_o$–$SD_n$ being represented by stored sample patterns in said main memory which require different scan sequences, such for example as (i) first-to-last; (ii) first-to-last, last-to-first, first-to-last; (iii) last sample repeat; and (iv) sample-signs-true, sample-signs-complemented,
- (e) storing, in separate word locations of addressable, readable SEQ memory, scan sequence characteristic signals for each of the respective sounds $SD_o$–$SD_n$,
- (f) applying to the address lines of saidm SEQ memory, during each of said different time slots, call signals which will effect read-out of the cahracteristic signals for the particular sound preselected for that time slot, and
- (g) utilizing said characteristic signals to govern the changing of the address signals in order to produce scan sequences which conform to the requirements of the sound preselected for each of said different time slots.

59. The method set out in claim 58 wherein the scan sequence characteristics of certain ones of the sounds $SD_o$–$SD_n$ require that the sound samples be repeatedly scanned in first-to-last order, and in any time slot when any such sound is the preselected sound, the output from said SEQ memory causes said step (g) to include
- (g') changing the address signals in first-to-last order until they represent the address of the last sample $S_n$ of the preselected sound, then changing the address signals to represent the address of the first sample $S_o$, and then resuming the changing in first-to-last order.

60. The method set out in claim 58 wherein the scan sequence characteristics of certain ones of the sounds $SD_o$-$SD_n$ require that the sound samples be scanned alternately in first-to-last and last-to-first order, and in any time slot when any such sound is the preselected sound, the output from said SEQ memory is utilized to cause said step (g) to include (g') changing the address signals in first-to-last order until they represent the address of the last sample $S_n$ of the preselected sound, then changing the address signals in last-to-first order until they represent the address of the first sample $S_o$.

61. The method set out in claim 58 wherein the scan sequence characteristics of certain ones of the sounds $SD_o$-$SD_n$ require that the sound samples be scanned, with the last sample repeated following a first-to-last scan, and in any time slot when any such sound is the preselected sound, the output from said SEQ memory is utilized to cause said step (g) to include (g') changing the address signals in first-to-last order until they represent the address of the last sample $S_n$ of the preselected sound, maintaining the address signals unchanged during the next succeeding occurrence of the given time slot, and thereafter changing the address signals to proceed with the next scan in conformance with the requirements of the sound preselected for that time slot.

62. The method set out in claim 58 wherein the scan sequence characteristics of certain ones of the sounds $SD_o$-$SD_n$ require that the sound samples be scanned with the samples being applied to said common bus with changed signs during alternate ones of successive scans, and in any time slot when any such sound is the preselected sound, the output from said SEQ memory is utilized to cause said step (g) to include (g') detecting when said address signals represent the address of the last sample $S_n$ at the end of a first-to-last scan or when they represent the address of the first sample $S_o$ at the end of a last-to-first scan, and (g'') in response to such detection, complementing the sign bit of the sample read-out signals before they are applied to said common bus during the ensuing scan of the samples.

63. The method of digitally signaling an intercept type tone in a PCM multiplex communication system wherein a given time slot appears in each of on-going cycles recurring at a given rate (e.g., every 125 μ sec.), said method comprising (a) initially storing in at least two blocks of a readable main memory at least two respective patterns $P_a$ and $P_b$ each made up of an equal plurality of samples $S_o$-$S_n$ which digitally represent numerically the successive magnitudes of at least two respective sounds $SD_a$ and $SD_b$, (b) during and only within the duration of each occurrence of the given time slot, normally applying to the address lines of said memory signals which represent the address of a sample $S_j$ in the pattern $P_a$, and in successive cycles $C_i$, $C_{i+1}$, $C_{i+2}$ . . . changing such signals such that the samples $S_o$-$S_n$ are read out in a scanned order $S_j$, $S_{j+1}$, $S_{j+2}$ . . . , and (c) during alternate ones of successive time intervals occurring in succession at a rate substantially lower than said given rate, converting the address-representing signals produced according to step (b) so that they represent a sample $S_j$ in the pattern $P_b$, and so that the samples $S_o$-$S_n$ of the pattern $P_b$ are read out in a scanned order.

64. The method of digitally signaling an intercept tone in a PMC multiplex communication system, comprising (a) initially storing, in addressable main memory as multi-bit digital words, successive samples for two sounds, the samples for both sounds being equal in quantity and being stored in respective corresponding words within each block being addressable by a first plurality of lower order bit signals and the two blocks being individually addressable by a 0 or 1 level in a higher order bit signal, (b) producing a periodically recurring time slot signal $CT_x$, (c) producing lower order bit signals representing an address number for a word within a block, and during each recurrence of said time slot signal $CT_x$
  (i) applying said address number signals to the address lines of both of said memory blocks,
  (ii) modifying said address number signals to call for the next word location in a scanning sequence, and (d) producing an alternating signal which alternates between 0 and 1 level with a periodicity substantially greater than that of said time slot signal, and (e) applying said alternating signal to said memory as a higher order address bit to alternately address the adjacent blocks, whereby the output signals from said main memory represent successive samples of a first sound for a first time interval and the successive samples of a second sound for a second time interval, the first and second intervals recurring alternately, to form a digital signaling of an "intercept" sound.

65. The method set out in claim 64 further characterized by the step of holding said alternating signal steadily at a 0 or 1 level when it is desired to make the output signals from said memory represent only the first or the second sound.

66. The method set out in claim 64 wherein each memory block is part of a memory having plural blocks of 256 words, the words within each block being addressable by lower binary address signals xxxxxxxx representing decimal values of 0 to 255, and the blocks are addressable by higher order bit values y in a complete address signal yyy₁xxxxxxxx, said alternating signal forming the higher order address bit signal $y_1$.

67. The method of digitally signaling different sounds in different time slots of recurring frame cycles in a PCM multiplex communication system, comprising (a) initially storing, in addressable, readable main memory as multi-bit digital words, successive samples $S_o$-$S_n$ in each of a plurality of patterns $PT_o$-$PT_n$ corresponding to a plurality of sounds $SD_o$-$SD_n$, the samples of each pattern being stored in respective blocks of N memory words such that sample $S_i$ of pattern $PT_z$ is addressable by lower order address bits of a certain combination, with a higher order address bit $b_n=0$, and sample $S_i$ of pattern $PT_{z+1}$ is addressable by the same certain combination of lower order address bits with the higher order address bit $b_n=1$, (b) initially storing, in respective word locations of addressable readable pattern-select memory, different desired ones of a plurality of pattern ID signals $PI_o$–$PI_n$ represented by a predetermined number (n-1) of bits, with certain ones of said stored ID signals containing a 1 in an nth bit place, (c) producing control signals $CT_o$–$CT_n$ which exist respectively during and uniquely identify successive time $TS_o$–$TS_n$ of repeating frame cycles, (d) during the presence of each control signal $CT_o$–$CT_n$, reading out one of the stored pattern ID signals from said sound-select memory, (e) utilizing the (n−1) bits of a pattern ID signal $PI_z$ so read-out to create, and apply to the address lines of said main memory, multi-bit address signals which cause read-out, from main memory, of a sample $S_j$ in the pattern $PT_z$, and changing said address signals incrementally from cycle to cycle so that the samples of pattern $PT_z$ are scanned, and (f) in response to the presence of a 1 in the nth bit place of any pattern ID signal $PT_z$ so read out from said sound-select memory, periodically complementing the higher order address bit $b_n$ in said multi-bit address signals so that samples from two patterns $PT_z$ and $PT_{z+1}$ are read from main memory in a given time slot but in alternate ones of a succession of time intervals determined by the periodic complementing of the higher order address bit.

68. The method of creating different on/off schedules for a plurality of information signals which are ordinarily transmitted in respective time slots of successive cycles in a multiplex communication system, said method comprising (a) initially storing strings of 0 and 1 bits in an addressable memory for each of a plurality of on/off schedules, each string containing N bits and being characterized by n 1's in succession followed by m 0's in succession, where n and m are integers including zero but not exceeding N, (b) reading out from said memory simultaneously on plural output lines one bit of each string, and continuing such reading to cyclically scan at a predetermined rate (e.g., one readout per 50 m.s.) all the successive bits of all the stored strings, (c) during certain time slots within successive cycles selecting from the output lines of said memory one readout string of signals, and (d) gating to or blocking from a common output bus the information signals arriving in any given time slot only when the selected readout string of signals has respectively one or the other of its two possible states during that time slot.

69. The method set out in claim 68 further characterized in that said cycles have a duration on the order of 125 μ seconds and the successive reading-out from said memory occurs for intervals on the order of 50 m.s. with negligible spacing between such intervals.

70. The method set out in claim 68 further characterized in that said memory contains N addressable word locations, with each word containing one bit of each string, and the cylical scanning of said step (d) is carried out by driving a digital rollover counter from regularly recurring clock pulses, said counter having N possible count states, and applying the multi-bit output of said counter to the address input lines of said memory.

71. The method set out in claim 68 wherein said step (c) includes (c') initially storing a schedule select code in each word location of an addressable schedule-sheet memory, (c'') applying to the address inputs of said schedule-select memory during each of certain time slots within successive cycles address signals which correspond to the particular code for the desired schedule to be created in that time slot, and (c''') using the output of said schedule select memory during each time slot to select one string of output signals read out from said string-storing memory.

72. Apparatus for digitally signaling different ones of a plurality of sounds $SD_o$–$SD_n$ in different ones of a plurality of successive time slots $TS_o$–$TS_n$ of repeating cycles in a PCM multiplex communication system, said apparatus comprising, in combination (a) a multi-word addressable, readable main memory storing—as multi-bit digital numerical words—patterns $PT_o$–$PT_n$ corresponding to each sound, with each pattern formed by a plurality of successive samples at successive addresses and representing the sampled magnitudes of at least a symmetrical portion of an analog wave corresponding to the desired sound, (b) means for applying to the address lines of said main memory, during and only within the duration of certain time slots, address signals to effect readout to a common bus of one sample of a preselected pattern for that slot, and (c) means for changing from cycle-to-cycle, the address signals so applied during each time slot so that the samples of the preselected pattern are scanned with the passage of on-going cycles.

73. The combination defined in claim 72 further including (d) means for producing during and within the duration of some of said certain time slots a control signal at a first or second level, the control signal during a given slot existing at said second level over a span of several cycles to define an "off" interval for the sound otherwise carried in that given slot, and (d) means responsive to the control signal for preventing readout to said common bus during those time slots in which the control signal is at its second level, the "off" intervals of alternate on/off periods of time exceeding the cycle time by at least two orders of magnitude.

74. The combination defined in claim 72 further including (d) means for changing, from time-to-time, the preselected pattern of which a sample is read out by means (c), thereby to switch different sounds into a given time slot.

75. The combination set out in claim 73 wherein said means (d) includes (d') means for changing, from time-to-time, the schedule of the on/off intervals of said on/off periods to conform to a preselected one of a plurality of on/off schedules $SCH_o$–$SCH_n$.

76. The combination defined in claim 72 further including (d) means for producing, during and only within the duration of the said certain time slots, tone ID signals identifying one of a plurality of tones $TN_o$–$TN_n$, each tone being characterized by a predesignated one of said sounds $SD_o$–$SD_n$ paired with a predesignated one of a plurality of on-off schedules $SCH_o-SCH_n$, and (e) means responsive to said tone ID signals existing during any given time slot (i) to make said means (d) apply to the address lines of said main memory, address signals to effect readout of one sample of the pattern corresponding to the characterized sound of the identified tone, and (ii) to prevent readout to said common bus during said given time slot during "off" intervals of an alternating on/off schedule which corresponds to the characterized schedule of the identified tone.

77. The apparatus defined in claim 72, wherein said means (c) includes (c') means responsive to the address signals applied to said main memory during any given slot of a cycle $C_i$ to derive new address signals to be so applied during the same slot of the next cycle $C_{i+1}$, to cause scanning and scan sequences of the samples in the pattern preselected for the given slot.

78. The combination set out in claim 72, wherein said means (c) includes (c') a multi-word read/write memory, (c'') means for addressing said read/write memory according to the sequence of time slots to read therefrom said address signals, previously formed, to the address lines of said main memory, and (c''') means for writing, before the next occurrence of the same time slot, into said read/write memory at the word location so read, signals representing the next address to be read from main memory during the next occurrence of the same time slot.

79. For use in a PCM time multiplex system, apparatus for digitally signaling a sound on an output bus during a given one of successive time slots of repetitive time cycles, the sound corresponding to a repeating analog wave, said apparatus comprising in combination (a) a multi-word addressable main memory formed to store and hold in respective word locations—as multi-bit digital numerical values—successive magnitude samples $S_o-S_n$ of said wave, (d) means for feeding to the address lines of said main memory, during said given slot of a given cycle $C_i$, address signals representing the address of one stored sample $S_j$ which is then signaled at the main memory output bus, (c) means responsive to said address signals so applied to derive a next sample set of address signals, and (d) means for causing said means (b) to use and feed the next sample address signals during the given slot of the next cycle $C_{1+1}$, so that said samples are outputted in succession.

80. For use in a PCM time multiplex system, apparatus for digitally signaling a sound on an output bus during a given one of successive time slots of repetitive cycles, the sound corresponding to a repeating analog wave, said apparatus comprising, in combination (a) an addressable, readable main memory storing in respective word locations—as multi-bit digital numerical values—successive magnitude samples $S_o-S_n$ of said wave, (b) storage means for holding address signals, (c) means operative during the given time slot of any cycle $C_i$ for applying said address signals to the address lines of said main memory to read to the output bus signals representing one of said samples $S_j$, and (d) means responsive to and operative to use the address signals so applied during any cycle $C_i$, and representing the address in main memory of the sample $S_j$, to derive and place in said storage means (b) newly formed address signals representing the address of a next sample $S_{j+1}$ to be next read out to said bus in a scan of the samples, whereby during the given slot of cycles $C_i$, $C_{i+1}$, $C_{i+2}$ ... samples $S_j$, $S_{j+1}$, $S_{j+2}$ ... are successively read out to the bus.

81. The combination defined in claim 80 further characterized in that (a') said main memory stores said successive samples at numerically ascending or descending address locations, and said means (d) includes (d') means for deriving the newly formed address signals by adding or subtracting one to the address signals so applied during any cycle $C_i$.

82. The combination defined in claim 80, further including (e) means for producing a detection signal when the address signals so applied during any cycle $C_i$ represent the address of the last sample in the plurality of samples $S_o-S_n$, (f) means responsive to said detection signal to cause said means (d) to derive the newly formed address signals to represent the address of one of the following:

(i) the first sample,
(ii) the next-to-last sample,
(iii) the last sample,

83. Apparatus for use in signaling different ones of a plurality of sounds $SD_o-SD_n$ on a bus in desired ones of a plurality of time slots $TS_o-TS_n$ in a PCM time multiplex communication system, said apparatus comprising in combination (a) an addressable, readable main memory storing, for each of said sounds $SD_o-SD_n$ a pattern of $PT_o-PT_n$ each constituted of successive binary samples of at least a symmetrical portion of an analog wave representing that sound, each sample having a unique memory address location, and said main memory having a common output bus, (b) means for producing in time sequence different control signals $CT_o-CT_n$ which exist respectively during and uniquely identify different ones of said time slots, such control signals recurring in repetitive cycles, and (c) means responsive to each of said control signals $CT_o-CT_n$ to apply to the address lines of said main memory address signals which cause reading onto said output bus one sample of one pattern $PT_z$, the pattern $PT_z$ being preselected for digital transmission in the respective time slot identified by that control signal.

84. The combination defined in claim 83, wherein there are a plurality of sounds $SD_o-SD_n$ respectively represented by patterns $PT_o-PT_n$ of stored samples $S_o-S_n$ in said main memory, and further including (d) means responsive to each control signal during successive cycles $C_i$, $C_{i+1}$, $C_{i+2}$ ... to cause said means (c) to apply to the address lines of said main memory address signals which cause reading onto said bus of successive samples $S_j$, $S_{j+1}$, $S_{j+2}$ ... of a preselected pattern $PT_z$, such that as a given control signal $CT_y$ recurs during successive cycles the samples $S_o$-$S_n$ of the preselected pattern are successively applied to said bus.

85. The combination defined in claim 84, wherein said means (d) includes
   (d') means for changing the address signals applied to the address lines of said main memory, during a given slot of successive cycles, so that the samples $S_o$-$S_n$ of the preselected pattern $PT_z$ for that slot are repeatedly scanned and applied to said bus in a predetermined scan sequence as the number of repeating cycles exceeds the quantity of stored samples in the preselected pattern.

86. The combination defined in claim 84 further including
   (e) means producing an on/off signal which, during the existence of each control signal $CT_o$-$CT_n$ and time slot $TS_o$-$TS_n$, has first and second values over extended time intervals of p and q seconds, where p and q form a preselected one of a plurality of on/off schedules $SCH_o$-$SCH_n$, and
   (f) means for respectively gating or blocking sample output signals from said main memory to or from said bus when said on/off signal respectively has said first or second value.

87. The combination defined in claim 86 further including
   (g) means for generating continuously a plurality of schedule signals each having a different high/low on/off time duty cycle corresponding to one of a plurality of schedules $SCH_o$-$SCH_n$, and
   (h) said means (f) includes means responsive to each of the control signals $CT_o$-$CT_n$ for controlling the application of output signals from said main memory to said bus according to the high/low timing of a preselected one of said schedule signals.

88. The combination defined in claim 86, wherein any one of the sounds $SD_o$-$SD_n$ with any one of the schedules $SCH_o$-$SCH_n$ forms one of a plurality of tones $TN_o$-$TN_n$ which may be transmitted in any one of the time slots $TS_o$-$TS_n$, and further including
   (g) a readable pattern-select memory storing at addressable locations digital words respectively identifying predetermined ones of the patterns $PT_o$-$PT_n$,
   (h) a readable schedule-select memory storing at addressable locations digital words respectively identifying predetermined ones of the individual schedules $SCH_o$-$SCH_n$,
the pattern and the schedule identifications $PT_z$ and $SCH_u$ stored at the same address locations in said two select memories forming in combination a particular one $TN_x$ of the tones $TN_o$-$TN_n$,
   (i) means for applying to the address lines of both said pattern-select and schedule-select memories the same address signals, designating a tone $TN_x$, during the existence of one control signal corresponding to a particular time slot $TS_y$ to read out the stored words from such memories,
   (j) means responsive to the output from said schedule select memory to make said on/off signal have a corresponding p and q times according to the schedule $SCH_u$, and
   (k) means responsive to the output from said pattern-select memory during each time slot $TS_y$ to cause application of a sample of the pattern $PT_z$ to said bus under the gating control of said on/off signal.

89. In apparatus for signaling any of various ones of a plurality of sounds $SD_o$-$SD_n$ in any of a plurality of time slots $TS_o$-$TS_n$ of successive cycles in a PCM multiplex communication system, the combination comprising
   (a) an addressable, readable main memory storing, for each of the sounds $SD_o$-$SD_n$, in addressable word locations, the successive digital multi-bit samples which represent that sound,
   (b) means for producing control signals $CT_o$-$CT_n$ which exist during and uniquely identify each of the time slots $TS_o$-$TS_n$ in a cycle,
   (c) means for creating, from time to time, paired command signals in which each pair represents (i) a commanded one of the plurality of sounds $SD_o$-$SD_n$ and (ii) a commanded one of the time slots $TS_o$-$TS_n$ in which that commanded one sound is to be signaled,
   (d) a read/write sound-select memory having a plurality of addressable word locations,
   (e) means responsive to the appearance of a pair of command signals for writing the commanded sound signal into said sound select memory at an address corresponding to and determined by the commanded time slot signal,
   (f) means for applying said control signals to the address lines of said sound-select memory to read out therefrom during successive time slots the respective commanded sound signals previously stored, and
   (g) means responsive to said read-out commanded sound signals to create, only during each time slot when such commanded sound signals exist, address signals representing the location in said main memory of one sample of those samples which correspond to the sound represented by the read-out commanded sound signals,
   (h) means for applying said address signals to said main memory, and
   (i) means for changing the address signals so created and so applied, during any given slot, from cycle to cycle, to scan the samples representing the commanded sound for that slot.

90. In apparatus for signaling various ones of a plurality of tones in different desired ones of a plurality of time slots of successive cycles in a PCM multiplex communication system, the combination comprising
   (a) an addressable, readable main memory storing, for each of a plurality of tones, successive multi-bit digital samples representing successive magnitudes of the tone sound,
   (b) means for producing control signals $CT_o$-$CT_n$ which respectively exist during and uniquely identify a plurality of time slots in a cycle,
   (c) means for creating, from time-to-time, paired command signals which respectively represent (i) a commanded one of a plurality of tones $TN_o$-$TN_n$ and (ii) a commanded one of the time slots $TS_o$-$TS_n$ in which te commanded tone is to be signaled,
   (d) a read/write tone-select memory having a plurality of addressable word locations,
   (e) means responsive to the appearance of a pair of command signals for writing the commanded tone signal into said tone-select memory at an address location represented and determined by the paired commanded time slot signals, said tone select memory having an addressable word location for each of the time slots, (f) means for applying said control signals during each time slot to the address lines of said tone-select memory to read therefrom during different time slots of each cycle the respective previously stored commanded tone signals for respective ones of the time slots.

(g) means responsive to read out commanded tone signals, during each of said different time slots, to read from said main memory one of the samples there stored for the tone sound called for by said commanded tone signals, and (h) means for thereafter incrementing or decrementing the address signals applied to said main memory during the respective time slots of said successive cycles, so that the successive samples for a commanded sound are scanned and outputted during the same, commanded time slot of successive cycles.

91. Apparatus for digitally signaling fixed and switchable sounds in a PCM multiplex communication system, comprising in combination (a) means for producing control signals $CT_o$-$CT_n$ which exist respectively during and uniquely identify each of successive time slots $TS_o$-$TS_n$ of repeating cycles, (b) an addressable, readable main memory storing a pattern of samples for each of a corresponding plurality of sounds $SD_o$-$SD_n$, each set of samples representing, as multi-bit digital words, the successive sample magnitudes of a recurring analog wave which corresponds to a desired sound, (c) means responsive to a first sub-plurality of said control signals $CT_o$-$CT_n$ to cause read out, from main memory to a common bus, of one sample of respective pre-assigned sounds, with the samples for a given sound being progressively scanned during the same time slot of successive cycles, whereby the respective pre-assigned sounds are transmitted in the time slots corresponding to said first sub-plurality of control signals in every cycle, (d) a read/write memory having a plurality of addressable word locations, (e) means responsive to a second sub-plurality of said control signals fed to the address lines of said read/write memory to cause read out of sound ID signals from memory locations respectively corresponding to the values of said control signals during the corresponding time slots, (f) means for producing, from time-to-time, pairs of command signals with each pair comprising (e) sound command sound ID signals and (ii) time slot command signals equal to one of said second sub-plurality; and for applying the sound command ID signals to the input data lines, with application of said time slot command signals to the address lines, of said read/write memory, to write the sound command ID signals, (g) means responsive to the read-out sound ID signals, as produced by said means (e), to cause read out, from main memory to said command bus, during the time slot when said read-out sound ID signals appear, of one sample for the sound identified by such ID signals, with the samples for a given sound being progressively scanned during the same time slot of successive cycles, whereby any one of the sound may be carried in any one of the channel time slots which correspond to said second sub-plurality of control signals, as determined by the writing of command sound ID signals into locations of said read/write memory at addresses represented by the paired time slot command signals.

92. Apparatus forming and digitally transmitting on an output bus any one of a plurality of tones $TN_o$-$TN_n$, where each tone is constituted by one of a plurality of sounds $SD_o$-$SD_n$ modulated with any one of a plurality of on/off schedules $SCH_o$-$SCH_n$, in a PCM time multiplex system, said apparatus comprising in combination (a) an addressable, readable main memory storing, for each of said sounds $SD_o$;14 $SD_n$, as multi-bit numerical values, a pattern of successive samples of at least a symmetrical portion of an analog wave representing that sound, each numerical sample having a unique memory address location, (b) a sound-select memory storing at addressable locations preselected ones of ID words $PI_o$-$PI_n$ respectively identifying the sounds $SD_o$-$SD_n$, (c) a schedule-select memory storing at addressable locations preselected ones of schedule ID words $SCI_o$-$SCI_n$ respectively identifying the schedules $SCH_o$-$SCH_n$, the pairing of a sound ID word with a schedule ID word at corresponding address locations in said two select memories designating a particular tone $TN_x$, (d) means for applying, during different time slots $TS_o$-$TS_n$ of repetitive cycles, preselected ones of tone ID signals $TI_o$-$TI_n$ to the address line of both said sound and schedule select memories, whereby during different time slots different predetermined pairs of ID words $PI_x$ and $SCI_x$ are signaled at the outputs of such memories, (e) means responsive to the $SCI_x$ word signals existing during any of said time slots to create a gating signal which exists at on and off levels respectively during that slot over intervals of p and q seconds and which form an on/off schedule $SCH_x$ corresponding to the identification word $SCI_x$, (f) means responsive to said $PI_x$ word signals existing during any of same time slots to create and apply, to the address inputs of said main memory, signals which cause read out from main memory one sample forming part of the respresentation of the sound $SD_x$ identified by said $PI_x$ word signals, and (g) means applying or blocking the sample signals so read-out from main memory respectively to or from an output bus when said gating signal contemporaneously is on or off, respectively.

93. The combination set out in claim 92 wherein said means (f) includes means for reading out successive samples of the sound $SD_x$ during the same time slot of successive cycles, with repetitive scanning of all such samples taken one at a time.

94. The combination set out in claim 92 wherein said means (d) includes (d1) means for selectively changing the tone ID signals applied during different time slots to the address lines of said sound and schedule select memories, thereby to "switch" different desired tones into particular time slots.

95. Apparatus for digitally transmitting different sounds on an output bus in a PCM time multiplex communication system, said apparatus comprising, in combination (a) an addressable, readable main memory storing, for each of said sounds, in an addressable memory block—as multi-bit numerical values—successive samples of at least a symmetrical portion of an analog wave representing that sound,
  (a1) the stored samples for each sound constituting a set,
  (a2) the quantities of samples in at least some of said sets being unequal,
  (a3) each of said blocks having a quantity of word locations which is equal to or greater than the quantity of samples stored in that block, and all blocks having output lines coupled to a common output bus,
  (a4) said sets being stored in their respective blocks such that the last sample of every set is stored at the same, common addressable word location within a block, and with the samples of each set in sequential rollover order,
(b) means for enabling the reading from one preselected block during the same given time slot within every repetitive cycle of time slots,
(c) means for applying to the address line inputs of all blocks sample select signals which represent, during the same time slot of successive cycles, successive sample addresses within the enabled block, to read out onto said bus signals corresponding to successive samples of a selected sound during a selected time slot of successive cycles, the samples of a set thus being read out in a scanned sequence,
(d) means for detecting when the sample address signals represent said common addressable word location, and
(e) means responsive to detection by said means (d) for changing the sample address signals applied by said means (c) during the ensuring cycle to begin a new scan of the samples in the selected block during the selected time slot of later cycles.

96. Apparatus for outputting successive digital samples of a sound in a PCM multiplex system, said apparatus comprising in combination
  (a) an addressable, readable memory storing in successive address locations—as multi-bit digitable words—successive samples $S_o$–$S_n$ representing successive sample magnitudes of at least a symmetrical portion of a cyclic analog wave corresponding to the desired sound,
  (b) means for producing character signals which represent the characteristic of the necessary sequences of successive scans of said samples which will recreate the analog wave in PCM form,
  (c) means, operative during a given time slot in recurring cycles, for applying to the address lines of said main memory address signals to effect read out of one sample $S_j$,
  (d) means for changing said address signals prior to the next occurrence of the given time slot to represent the address of the next sample to be read-out, so that the samples are scanned seriatim,
  (e) means for detecting when said address signals represent the address of the last sample $S_n$, and
  (f) means responsive to detection by said means (e) and controlled by said character signals to form the succeeding value to be given to said address signals for read-out of the next sample at the beginning of a new scan.

97. The combination set out in claim 96 wherein said character signals designate that the samples are to be repeatedly scanned in first-to-last order, and said means (f) includes
  (f') means for making the succeeding value of said address signals represent the address of the said sample.

98. The method set out in claim 96, wherein said character signals designate that the samples are to be scanned alternately in read-up and read-down address order, and said means (f) and (d) include
  (f') means for making the succeeding value of said address signals represent the address of the next-to-last sample $S_{n-1}$, and
  (d') means operative in a scan which follows a read-down scan orderfor decrementing said address signals to scan in read-up address order.

99. The combination defined in claim 96 wherein said character signals designate that the last sample is to be repeated after having been read-out once, and said means (f) includes
  (f') means for making the succedding value of said address signals represent the same last sample address, and thereafter prior to the next occurrence of the given time slot forming the next-succeeding value to be given to said address signals to proceed with a new scan.

100. The apparatus defined in claim 96 wherein said characteristic-representing signals designate that the samples are to be read-out with alternately changed signs during successive scans, and said means (f) includes
  (f') means for complementing the sign bit of the sample read-out signals during the ensuing scan of samples.

101. The combination set out in claim 98, further including
  (g) means, operative during a scan of the samples in read-up address order, for detecting when said address signals represent the address of the first sample $S_o$, and
  (h) means responsive to detection by said means (g) for making the address signals during the subsequent occurrences of said given time slot progressively increment until they represent the address of the last sample $S_n$ and the last sample is read out.

102. Apparatus for digitally signaling different ones of sound $SD_o$–$SD_n$ in different time lots $TS_o$–$TS_n$ of successive cycles in a PCM time multiplex system, said method comprising
  (a) an addressable, readable main memory storing in a group of successive addressable word locations—as multi-bit digital words—successive samples $S_o$–$S_n$ representing the successive sample magnitudes of at least a symmetrical portion of a cyclic analog wave corresponding to the sound to be reproduced,
  (b) means for producing control signals $CT_o$–$CT_n$ which respectively exist during and uniquely identify different time slots within each recurring cycle,
  (c) means responsive to each of said control signals to apply address signals to the address lines of said main memory to effect read-out onto a common bus of one sample of a preselected one of said sounds,
  (d) means for changing, from cycle-to-cycle, the address signals created during each of said different time slots to successively scan the samples of the sound preselected for that time slot, some of sounds $SD_o$–$SD_n$ being represented by stored sample patterns in said main memory which require different scan sequences such for example as (i) first-to-last; (ii) first -to-last, last-to-first, first-to-last; (iii) last sample repeat; and (iv) sample-signs-true, sample-signs-complemented, (e) an auxiliary readable memory storing, in separate word locations, scan sequence characteristic signals for each of the respective sounds $SD_o$–$SD_n$, (f) means for applying to the address lines of said auxiliary memory, during each of said different time slots, call signals which will effect read-out of the characteristic signals for the particular sound preselected for that time slot, and (g) means responsive to the characteristic signals read from said auxiliary memory to control the operation of said means (d) and make address signals change to produce scan sequences which conform to the requirememts of the sound preselected for each of said different time slots.

103. Apparatus for digitally signaling an intercept type tone in a PCM multiplex communication system wherein a given time slot appears in each of on-going cycles recurring at a given rate (e.g. every 125 $\mu$ sec.), said apparatus comprising, in combination (a) an addressable, readable main memory storing in at least two blocks of words at least two patterns $P_a$ and $P_b$ each made up of an equal plurality of samples $S_o$–$S_n$ which digitally represent numerically the successive magnitudes of at least two respective sounds $SD_a$ and $SD_b$, (b) means normally operative during and only within the duration of each occurrence of the given time slot for applying to the address lines of said memory signals which represent the address of sample $S_j$ in the pattern $P_a$, and in successive cycles $C_i$, $C_{i+1}$, $C_{i+2}$... changing such signals progressively to read out the samples $S_o$–$S_n$ in a scanned order $S_j$, $S_{j+1}$, $S_{j+2}$..., and (c) means, effective during alternat ones of successive time intervals occurring in succession at a rate substantially lower than said given rate, for modifying the operation of said means (b) so that it acts with reference to the samples of the pattern $P_b$ rather than those of the pattern $P_a$.

104. Apparatus for digitally signaling an intercept tone in a PCM multiplex communication system, said apparatus comprising in combination (a) an addressable, readable main memory storing as multi-bit digital words, successive samples for two sounds, the samples for both sounds being equal in quantity and being stored in respective corresponding word locations of adjacent blocks of the memory, the individual words within each block being addressable by a first plurality of lower order bit signals and the two blocks being individually addressable by a 0 or 1 level in a higher order bit signal, (b) means for producing a periodically recurring time slot signal $CT_x$, (c) means for producing lower order bit signals representing an address number for a word within a block, (c1) means for applying said address number signals to the address lines of both of said memory blocks during each recurrence of said time slot signal, (c2) means for modifying said address number signals to call for the next word location in a scanning sequence to form the next address number signals to be produced by said means (c) during the ensuing cycle, (d) means for producing an alternating signal which alternates between a 0 and 1 level with a periodicity greater than that of said time slot signal, and (e) means for applying said alternating signal to said memory as said higher order address bit to alternately address the adjacent blocks, whereby the output signals from said memory represent successive samples of a first sound for a first time interval and the successive samples of a second sound for a second time interval, the first and second intervals recurring alternately.

105. Apparatus for turning a gate on or off according to any one of a plurality of schedules during certain ones of a plurality of time slots in successive cycles in a multiplex communication system, said apparatus comprising, in combination (a) a readable addressable memory storing strings of 0 and 1 bits of data, one string for each of a plurality of schedules $SCH_o$–$SCH_n$, each string containing N bits and being characterized by a different combination of n 1's in succession following by m 0's in succession, where n and m are integers including zero but not exceeding N, (b) means for reading out from said memory simultaneously on plural output lines one bit of each string, and cyclically scanning the reading through the N bits of the strings at a predetermined rate, and (c) means for applying the gate, as its control signal, during each occurrence of said certain ones of time slots of every cycle, the signal appearing on a respective preselected one of said output lines.

106. The combination set out in claim 105 further characterized in that said cycles have a duration on the order of 125 $\mu$sec. and said predetermined rate is on the order of 50 m.s. per bit.

107. The combination set out in claim 105 further characterized in that (a') said memory contains N addressable word locations with each word storing one bit of all of said strings and including (d) a rollover counter driven by clock pulses occurring at a predetermined rate and having N count states per counter cycle, the output lines of the counter being connected to the address lines of said memory.

108. The combination set out in claim 105 further including (d) a second readable memory storing at different word locations therein different ones of a plurality of schedule ID signals, (e) means for applying to the address lines of said second memory, during each time slot of every cycle, address signals which correspond to the location of the ID signals representing the particular schedule $SCH_u$ desired to be created in that time slot, and (f) means responsive to output signals from said second memory during each time slot for selecting and applying to said gate the corresponding one of the output signals from the first-named memory.

109. For use in a PCM multiplex system, apparatus for signaling different ones of a plurality of sounds $SD_o$–$SD_n$ on a common output bus during different ones of time slots $TS_o$–$TS_n$ within repeating cycles, each sound corresponding to a different repeating analog wave, said apparatus comprising in combination (a) an addressable, readable main memory holding in individual multi-word blocks respective patterns $PT_n$-$PT_n$ each of which is formed by a plurality of successive multi-bit word samples $S_0$₁₄$S_n$, —the patterns corresponding to the respective sounds, (b) a read/write memory (RAM) with a plurality of addressable word locations respectively corresponding to said time slots $TS_o$-$TS_n$, said RAM being initially loaded with preformed address signals corresponding to the addresses in said main memory at which are a sample of a pattern respectively preselected to be signaled in the different time slots, (c) means for creating a succession of control signals $CT_o$-$CT_n$ which respectively exist during and uniquely identify the time slots $TS_{o-TSn}$ of each cycle, (d) means for applying said control signals to the address lines of said RAM to cause readout therefrom of the respective preformed address signals, during the respective time slots of any cycle $C_i$, (e) means for applying the address signals read from said RAM to the address lines of said main memory to cause readout from the latter to an output bus a sample of the pattern preselected for each of the time slots, (f) means responsive to the address signals so applied during each given time slot of any cycle $C_i$ for deriving new address signals representing the next sample to be outputted from the pattern preselected for that time slot, and (g) means for writing into said RAM, at the address corresponding to each given time slot, the new address signals created by said means (f), whereby the samples of a pattern preselected for any given time slot are successively transmitted to the bus during that same time slot in successive cycles.

110. The combination defined by claim 109 further including (h) means operative on command from time-to-time for writing into said RAM, at an address location corresponding to a desired time slot, the address of the first sample in a commanded pattern $PT_{,z}$, whereby the commanded pattern becomes the new preselected pattern for that given slot.

* * * * *